United States Patent
Miyake

(10) Patent No.: US 11,258,142 B2
(45) Date of Patent: Feb. 22, 2022

(54) SECONDARY BATTERY AND ELECTRONIC DEVICE

(71) Applicant: SEMICONDUCTOR ENERGY LABORATORY CO., LTD., Atsugi (JP)

(72) Inventor: Hiroyuki Miyake, Ohsaka (JP)

(73) Assignee: SEMICONDUCTOR ENERGY LABORATORY CO., LTD., Kanagawa-ken (JP)

(*) Notice: Subject to any disclaimer, the term of this patent is extended or adjusted under 35 U.S.C. 154(b) by 0 days.

(21) Appl. No.: 16/809,047

(22) Filed: Mar. 4, 2020

(65) Prior Publication Data
US 2020/0203674 A1 Jun. 25, 2020

Related U.S. Application Data

(63) Continuation of application No. 15/019,530, filed on Feb. 9, 2016, now Pat. No. 10,629,857.

(30) Foreign Application Priority Data

Feb. 12, 2015 (JP) .................................. 2015-025680

(51) Int. Cl.
*H01M 50/543* (2021.01)
*H01M 10/04* (2006.01)
*H01M 50/557* (2021.01)

(52) U.S. Cl.
CPC ..... *H01M 50/543* (2021.01); *H01M 10/0436* (2013.01); *H01M 50/557* (2021.01); *H01M 2220/30* (2013.01)

(58) Field of Classification Search
None
See application file for complete search history.

(56) References Cited

U.S. PATENT DOCUMENTS

| 6,106,973 A | 8/2000 | Sonozaki et al. |
| 8,785,030 B2 | 7/2014 | Ueda |
| 2003/0118900 A1 | 6/2003 | Otohata |

(Continued)

FOREIGN PATENT DOCUMENTS

| JP | 10-214606 A | 8/1998 |
| JP | 11-233075 A | 8/1999 |

(Continued)

*Primary Examiner* — Carmen V Lyles-Irving
(74) *Attorney, Agent, or Firm* — Nixon Peabody LLP; Jeffrey L. Costellia

(57) ABSTRACT

A secondary battery with a novel structure that can be bent repeatedly is provided. In the secondary battery, an exterior body includes a front surface, a back surface, a first sealing portion, and a second sealing portion. The front surface includes a first long side, a second long side, a third side, and a fourth side. The third side and the fourth side face each other. The third side and the fourth side are substantially perpendicular to the first long side. The front surface includes a third sealing portion. The first sealing portion is along the third side. The second sealing portion is along the fourth side. The third sealing portion includes a region overlapping with the first sealing portion and a region overlapping with the second sealing portion. At least one of the first terminal and the second terminal overlaps with the first sealing portion.

14 Claims, 46 Drawing Sheets

(56) References Cited

U.S. PATENT DOCUMENTS

| | | | |
|---|---|---|---|
| 2012/0040235 A1* | 2/2012 | Cho | H01M 2/345 |
| | | | 429/156 |
| 2013/0101884 A1* | 4/2013 | Ueda | H01M 10/052 |
| | | | 429/127 |
| 2013/0224562 A1 | 8/2013 | Momo | |
| 2015/0099161 A1 | 4/2015 | Hitotsuyanagi et al. | |
| 2015/0147626 A1 | 5/2015 | Tajima et al. | |

FOREIGN PATENT DOCUMENTS

| | | |
|---|---|---|
| JP | 11-260327 A | 9/1999 |
| JP | 2000-090975 A | 3/2000 |
| JP | 2000-100396 A | 4/2000 |
| JP | 2003-187762 A | 7/2003 |
| JP | 2004-079464 A | 3/2004 |
| JP | 2005-079081 A | 3/2005 |
| JP | 2005-108747 A | 4/2005 |
| WO | WO-2012/140709 | 10/2012 |

\* cited by examiner

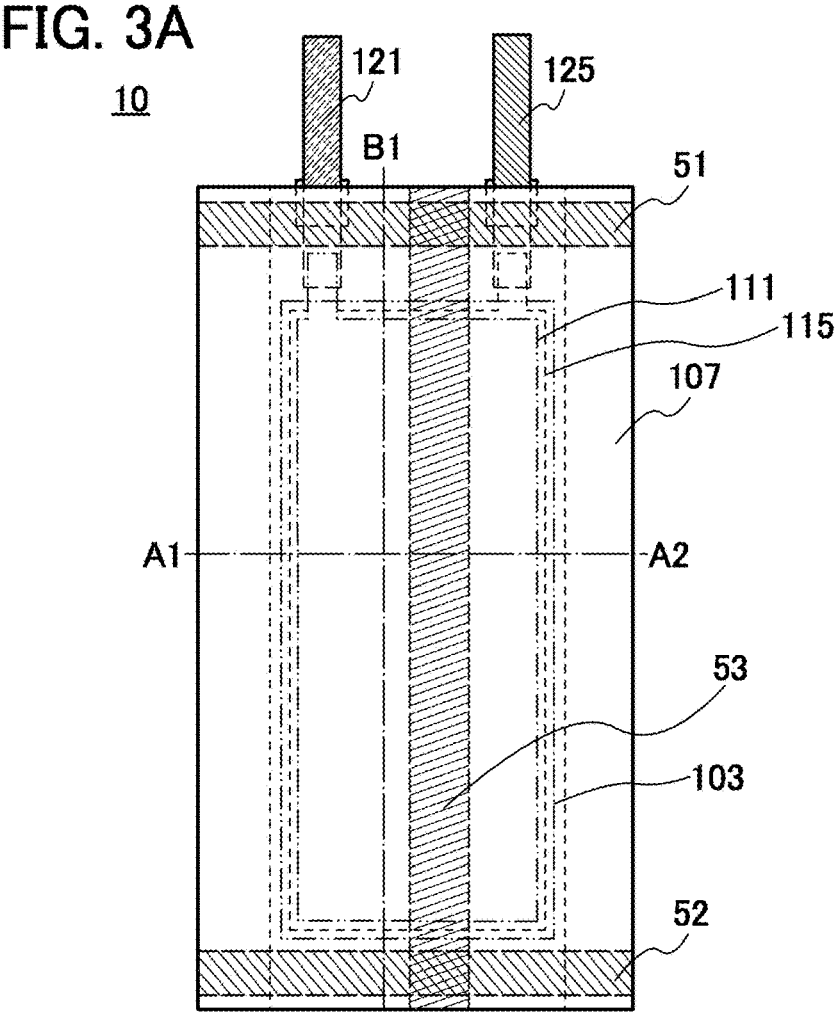
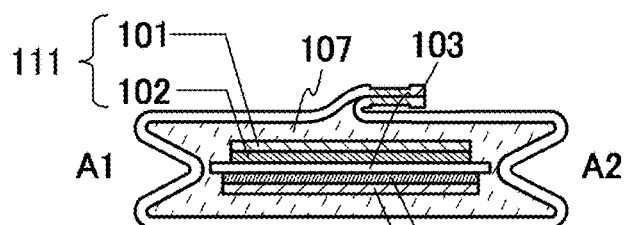
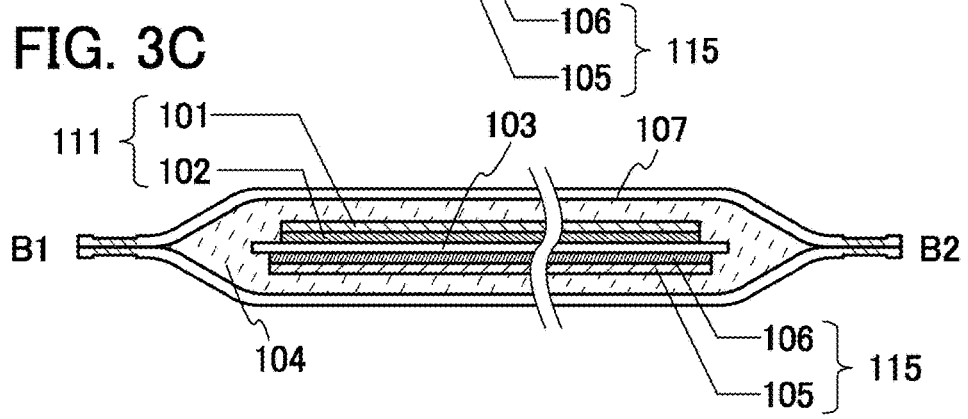
FIG. 3A
FIG. 3B
FIG. 3C

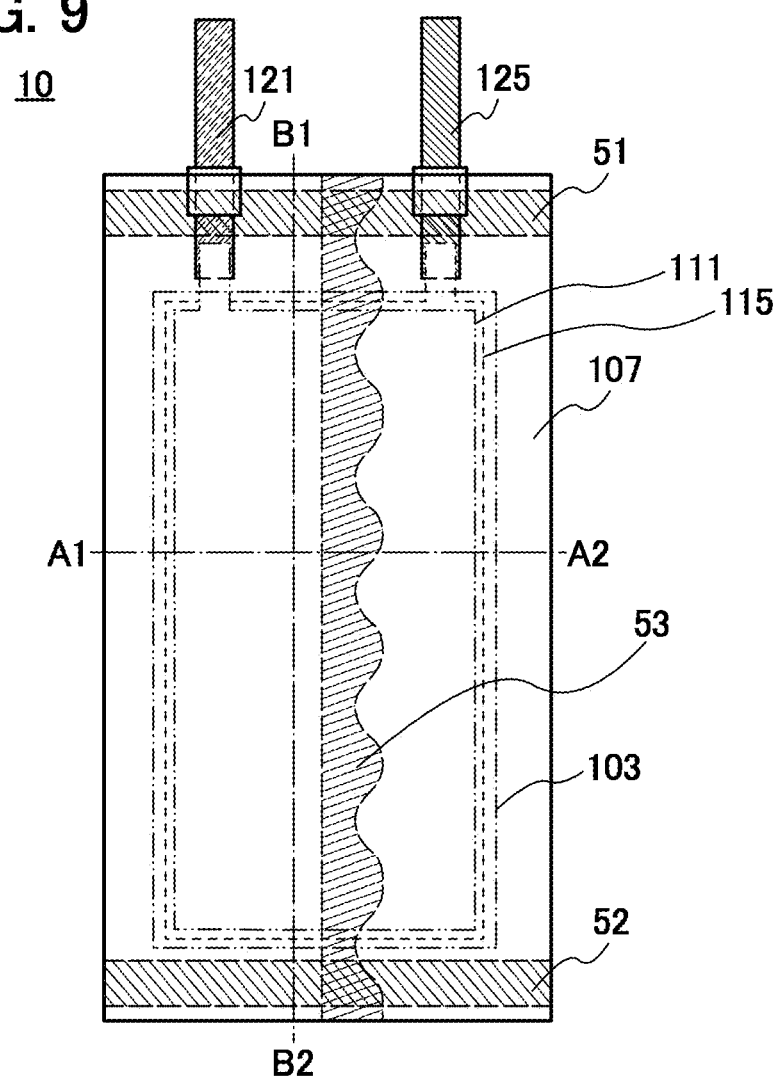

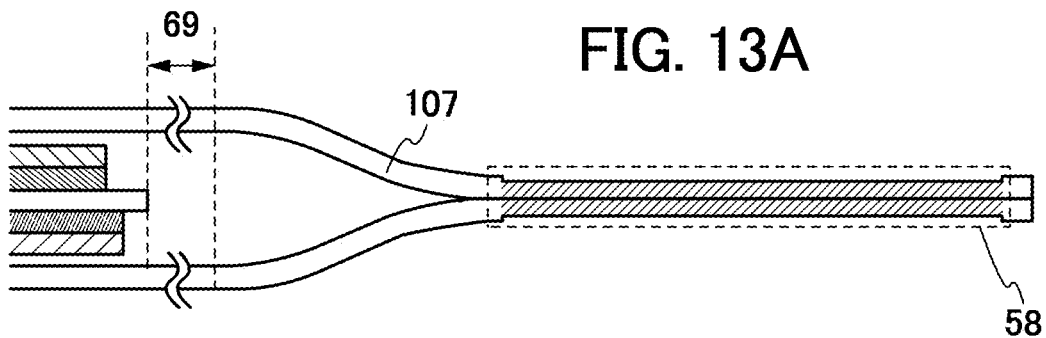
FIG. 13A
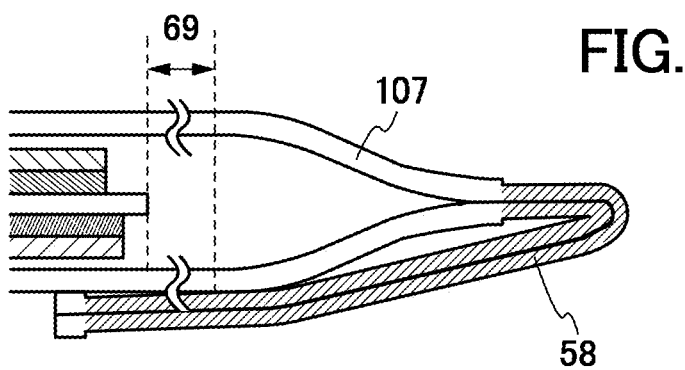
FIG. 13B
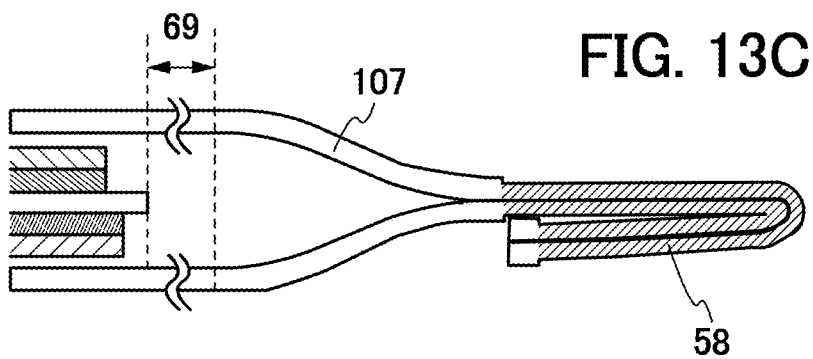
FIG. 13C
FIG. 13D
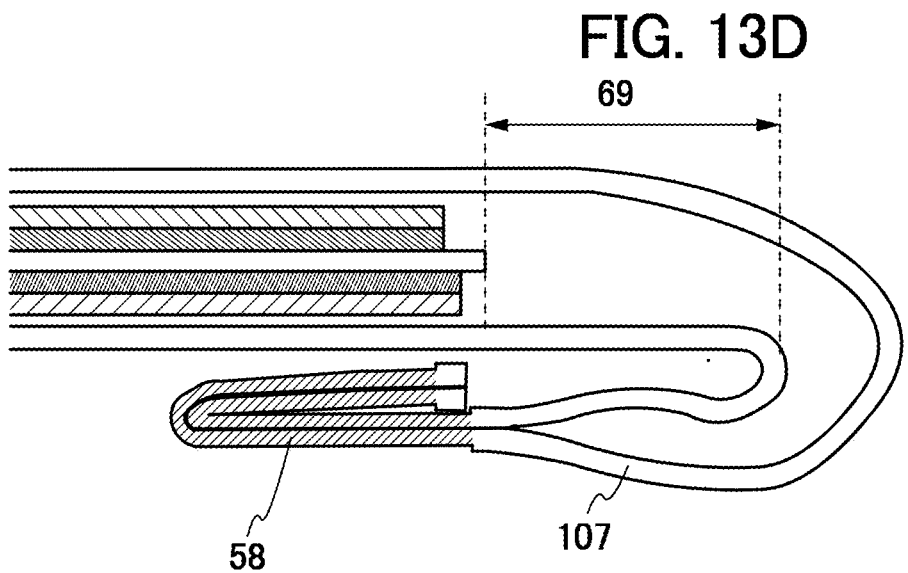

FIG. 31A
FIG. 31B
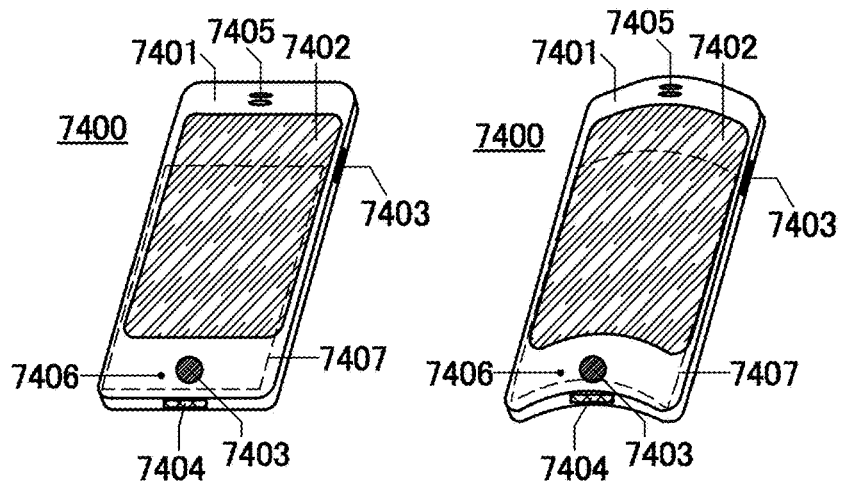
FIG. 31C
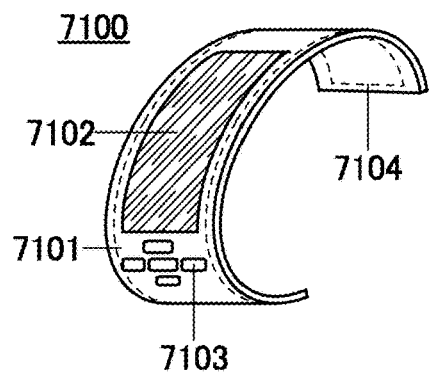
FIG. 31D
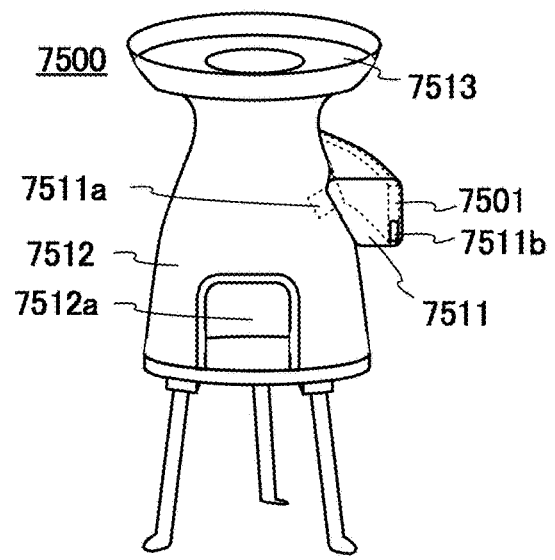

SECONDARY BATTERY AND ELECTRONIC DEVICE

BACKGROUND OF THE INVENTION

1. Field of the Invention

The present invention relates to an object, a method, or a manufacturing method. In addition, the present invention relates to a process, a machine, manufacture, or a composition of matter. In particular, one embodiment of the present invention relates to a semiconductor device, a display device, a light-emitting device, a power storage device, an imaging device, a driving method thereof or a manufacturing method thereof. In particular, one embodiment of the present invention relates to a secondary battery and a method for manufacturing the secondary battery.

2. Description of the Related Art

In recent years, wearable devices have been under active development. Since wearable devices are worn on one's body, it is preferable that they have shapes curved along a curved surface of the body or they are curved according to the movement of the body. Therefore, secondary batteries used in wearable devices also preferably have flexibility like displays and other housings therein.

Furthermore, the hermeticity of an exterior body of a secondary battery should be high. For example, Patent Document 1 discloses an example of a secondary battery having a laminate exterior body with high hermeticity.

REFERENCE

Patent Document

[Patent Document 1] Japanese Published Patent Application No. 2003-187762

SUMMARY OF THE INVENTION

An object of one embodiment of the present invention is to provide a secondary battery with high capacity per unit volume. Another object of one embodiment of the present invention is to provide a flexible secondary battery with a novel structure.

Another object of one embodiment of the present invention is to provide a secondary battery that can be bent repeatedly. Another object of one embodiment of the present invention is to provide a highly reliable secondary battery. Another object of one embodiment of the present invention is to provide a long-life secondary battery.

Another object of one embodiment of the present invention is to provide a secondary battery with a novel structure. Another object of one embodiment of the present invention is to provide an electronic device or the like including a novel power storage device or a novel secondary battery.

Note that the descriptions of these objects do not disturb the existence of other objects. In one embodiment of the present invention, there is no need to achieve all the objects. Other objects will be apparent from and can be derived front the description of the specification, the drawings, the claims, and the like.

One embodiment of the present invention is a secondary battery including an exterior body, a first terminal, and a second terminal. The exterior body includes a front surface, a back surface, a first sealing portion, and a second sealing portion. The front surface includes a first long side, a second long side, a third side, and a fourth side. The third side and the fourth side face each other. The third side and the fourth side are substantially perpendicular to the first long side. The front surface includes a third sealing portion. The first sealing portion is along the third side. The second sealing portion is along the fourth side. The third sealing portion includes a region overlapping with the first sealing portion and a region overlapping with the second sealing portion. At least one of the first terminal and the second terminal overlaps with the first sealing portion.

In the above structure, the exterior body preferably includes a first side portion including the first long side and a second side portion including the second long side. One member preferably forms the front surface, the first side portion, the second side portion, and the back surface. In the above structure, the exterior body preferably includes a first side portion including the first long side and a second side portion including the second long side. The first side portion preferably includes a first folded portion, and the second side portion preferably includes a second folded portion. In the above structure, the secondary battery preferably further includes a positive electrode and a negative electrode. The third, sealing portion preferably includes a region overlapping with the positive electrode and the negative electrode. In the above structure, the exterior body preferably has a shape in which depressions or projections are repeatedly provided. In the above structure, the secondary battery is preferably configured to be repeatedly bent along the first long side.

Another embodiment is a secondary battery including an exterior body, a positive electrode, and a negative electrode. The exterior body includes a first surface, a second surface, and a first sealing portion. In a cross section of the secondary battery, the second surface is positioned over the first surface, the first sealing portion is positioned above the second surface, and the positive electrode and the negative electrode are positioned between the first surface and the second surface.

Another embodiment of the present invention is a secondary battery including an exterior body, a positive electrode, and a negative electrode. The exterior body includes a first surface, a second surface, and a first sealing portion. The first sealing portion includes a third surface and a fourth surface. The third surface and the fourth surface are attached to each other. In a cross section of the secondary battery, the second surface is positioned over the first surface, the third surface is positioned above the second surface, the fourth, surface is positioned over the third surface, and the positive electrode and the negative electrode are positioned between the first surface and the second surface.

Another embodiment of the present invention is an electronic device including any of the secondary batteries.

According to one embodiment of the present invention, a secondary battery with high capacity per unit volume can be provided. According to one embodiment of the present invention, a flexible secondary battery with a novel structure can be provided. According to one embodiment of the present invention, a secondary battery that can be bent repeatedly can be provided. According to one embodiment of the present invention, a highly reliable secondary battery can be provided. According to one embodiment of the present in a long-life secondary battery can be provided.

According to one embodiment of the present invention, a secondary battery with a novel structure can be provided. According to one embodiment of the present invention, an electronic device or the like including a novel power storage device or a novel secondary battery can be provided.

Note that the description of these effects does not disturb the existence of other effects. One embodiment of the present invention does not necessarily achieve all the effects listed above. Other effects will be apparent from and can be, derived from the description of the specification, the drawings, the claims, and the like.

BRIEF DESCRIPTION OF THE DRAWINGS

FIGS. 3A to 3C are a top view and cross-sectional views illustrating a structure example of a secondary battery.

FIG. 9 is a top view illustrating a structure example of a secondary battery.

FIGS. 13A to 13D are cross-sectional views illustrating structure examples of a secondary battery.

FIGS. 31A to 31D illustrate examples of electronic devices.

DETAILED DESCRIPTION OF THE INVENTION

Figure 1A:
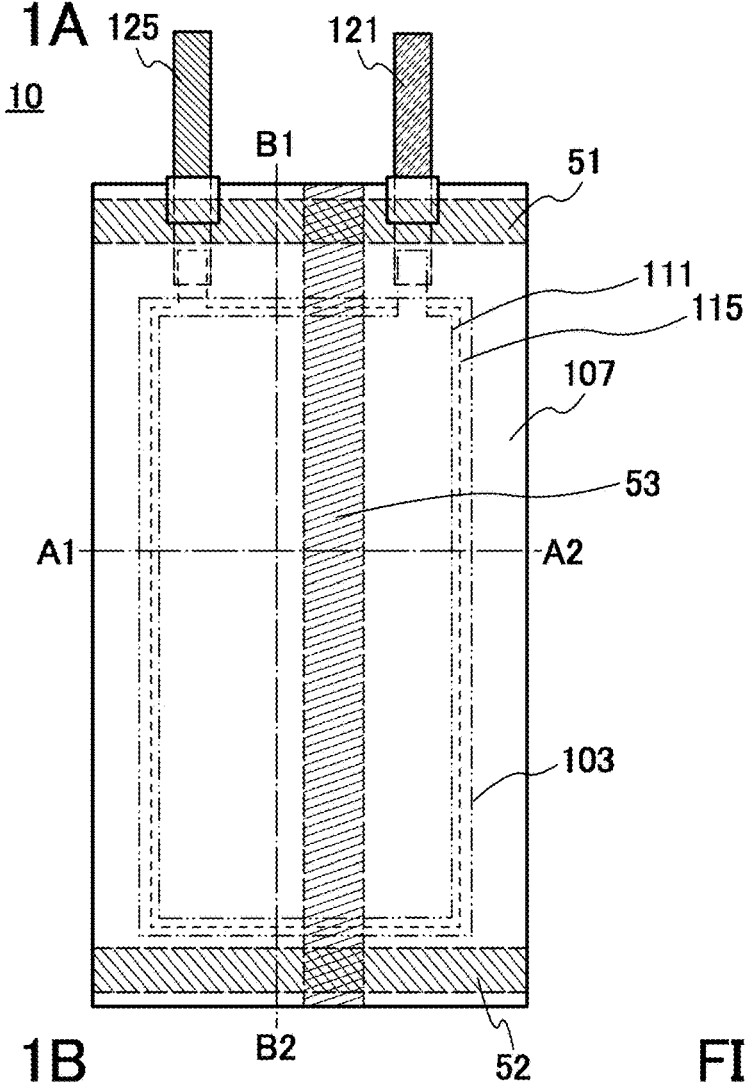
FIGS. 1A to 1D are a top view and cross-sectional views illustrating a structure example of a secondary battery.

Embodiments of the present invention will be described below in detail with reference to the drawings. However, the present invention is not limited to the description below, and it is easily understood by those skilled in the an that modes and details disclosed herein can be modified in various ways. Furthermore, the present invention is not construed as being limited to description of the embodiments.

The expression "electrically connected" includes the case where components are connected through an "object having any electric function". There is no particular limitation on an "object having any electric function" as long as electric signals can be transmitted and received between components that are connected through the object.

The position, size, range, or the like of each component illustrated in drawings and the like is not accurately represented in some cases for easy understanding. Therefore, the disclosed invention is not necessarily limited to the position, size, range, or the like disclosed in the drawings and the like.

The ordinal number such as "first", "second", and "third" are used to avoid confusion among components.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

In this specification, the term "parallel" indicates that the angle formed between two straight lines is greater than or equal to −10° and less than or equal to 10°, and accordingly also includes the case where the angle is greater than or equal to −5° and less than or equal to 5°. The term "substantially parallel" indicates that the angle formed between two straight lines is greater than or equal to −30° and less than or equal to 30°, for example. Furthermore, the term "perpendicular" indicates that the angle formed between two straight lines is greater than or equal to 80° and less than or equal to 100°, and accordingly also includes the case where the angle is greater than or equal to 85° and less than or equal to 95°. The term "substantially perpendicular" indicates that the angle formed between two straight lines is greater than or equal to 60° and less than or equal to 120°, for example.

Embodiment 1

Figure 2A:
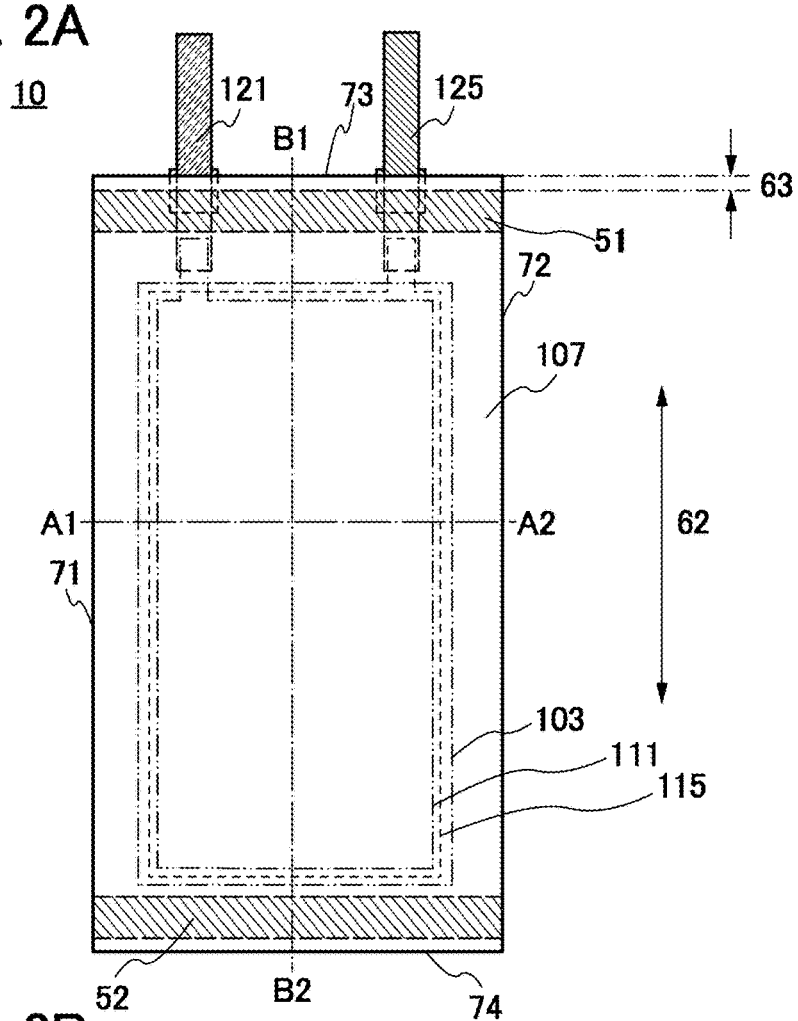
FIGS. 2A to 2C are a top view and cross-sectional views illustrating a structure example of a secondary battery.
Figure 2B:
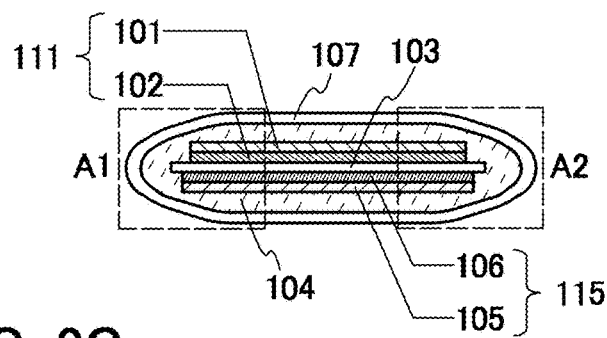
Figure 2C:
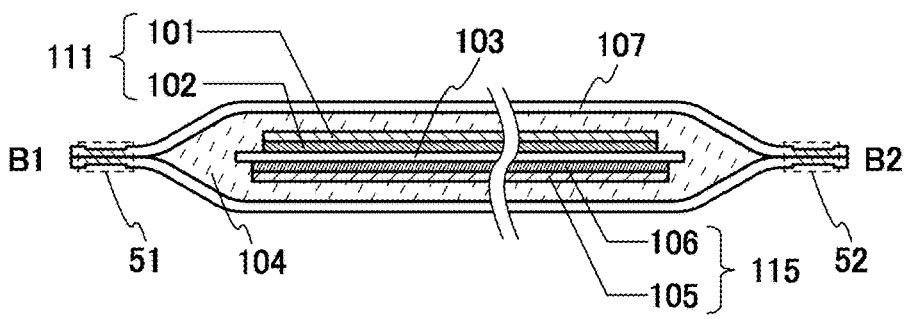

FIG. 2A illustrates a secondary battery 10 of one embodiment of the present invention. FIG. 2B illustrates a cross section taken along the dashed-dotted line A1-A2 in FIG. 2A, and FIG. 2C illustrates a cross section taken along the dashed-dotted line B1-B2 in FIG. 2A.

The secondary battery 10 includes an exterior body 107, a positive electrode lead 121, and a negative electrode lead 125. As illustrated in the top view of FIG. 2A, the secondary battery 10 includes a sealing portion 51 in the upper part and a sealing portion 52 in the lower part. At the sealing portion 51, the positive electrode lead 121 and the negative electrode lead 125 are sandwiched by the exterior body 107. Note that top views of FIG. 2A and the like may also be referred to as front views.

In the top view of FIG. 2A, the exterior body 107 of the secondary battery 10 has a rectangular shape, and the dashed-dotted lines A1-A2 and B1-B2 are substantially parallel to the short-side direction and the long-side direction respectively. In FIG. 2A, the rectangle has sides 71 and 72, which are long sides positioned in the left part and the right part respectively, and sides 73 and 74, which are short sides positioned in the upper part and the lower part respectively. Note that an arrow 62 in FIG. 2A shows the long-side direction.

Here, for example, the sealing portion 51 is preferably provided along the side 73 corresponding to the short side of the rectangle. In FIG. 2A, the sealing portion 51 is provided along the side 73, and is apart from the side 73 by a distance 63. Such a case may be expressed by the description the sealing portion 51 is provided along the side 73", for example, in this specification and the like.

The secondary battery 10 includes a positive electrode 111, a separator 103, and a negative electrode 115 facing the positive electrode 111 with the separator 103 therebetween, which are positioned in the exterior body 107. The positive electrode 111 includes a positive electrode current collector 101 and a positive electrode active material layer 102. The negative electrode 115 includes a negative electrode current collector 105 and a negative electrode active material layer 106. A space surrounded by the exterior body 107 is filled with an electrolytic solution 104. In FIGS. 2B and 2C, there is a distance between the exterior body 107 and the positive electrode 111 and between the exterior body 107 and the negative electrode 115; however, the exterior body 107 and the positive electrode 111 may be in contact with each other, and the exterior body 107 and the negative electrode 115 may be in contact with each other. In that case, the capacity per unit volume of the secondary battery 10 can be increased. Before the sealing the exterior body 107 is performed, gas in the exterior body 107 is preferably exhausted in a reduced-pressure atmosphere so as to reduce the internal volume of the exterior body 107 as much as possible, in which case the positive electrode 111 and the negative electrode 115 are held by the exterior body 107 to be fixed.

In the cross section illustrated in FIG. 2B, end portions of the exterior body 107 are each continuous and a sealing portion is not provided. The exterior body 107 has a tubular shape. One member refers to a sheet-like member used for the exterior body 107, specifically a sheet-like metal whose both surfaces are covered with a resin or the like.

In the cross section illustrated in FIG. 2C, the sealing portion 51 and the sealing portion 52 are provided in end portions of the exterior body 107.

Here, the sealing portion refers to a region at which two or more sheet-like regions are attached to each other, for example.

The exterior body 107 of the secondary battery 10 is preferably flexible. When the exterior body 107 is flexible the secondary battery 10 can also be flexible, for example.

Here, the capacity per unit volume of the secondary battery 10 of one embodiment of the present invention is preferably higher. Therefore, the volume proportion of the sealing portions in the secondary battery 10 is preferably lower.

The secondary battery 10 of one embodiment of the present invention can be bent.

An example where the secondary battery 10 illustrated in FIG. 2A is bent along the long-side direction shown by the arrow 62 will be described with reference to FIGS. 6A and 6B.

Figure 6A:
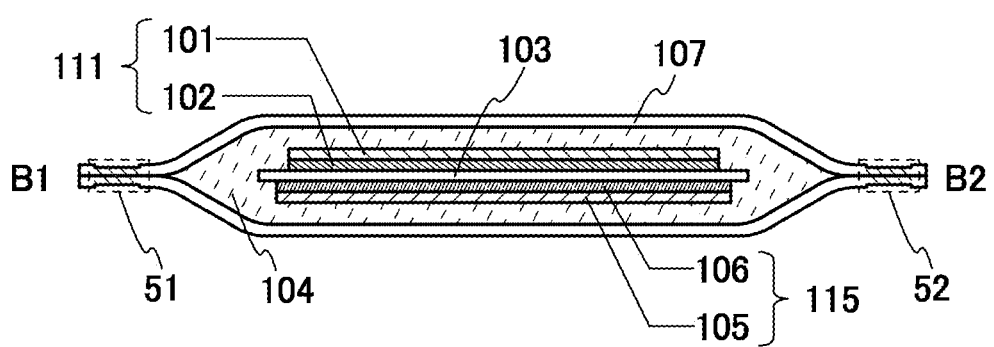
FIGS. 6A and 6B are cross-sectional views illustrating a structure example of a secondary battery.
Figure 6B:
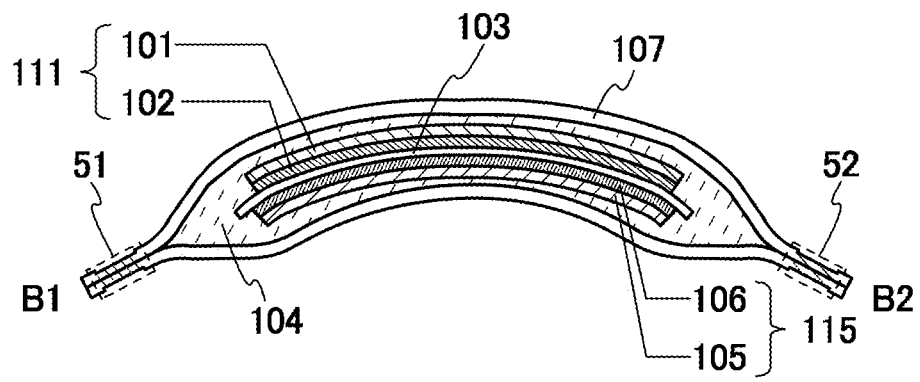

FIG. 6A illustrates a cross section taken along the dashed-dotted line B1-B2 in the secondary battery 10 illustrated in FIG. 2A. The secondary battery 10 can be bent when external force is applied thereto. FIG. 6B illustrates an example of a cross section of the secondary battery 10 bent along the long-side direction. Here, end portions along the respective long sides of the exterior body are also bent. Here, in FIG. 6B, the amount of change in the form of each of the sides 71 and 72 illustrated in FIG. 2A is large. In contrast, the sides 73 and 74 are scarcely changed in form, and the amount of change in the form of each of the sides 73 and 74 is small. Therefore, the example of FIG. 6B can also be expressed by the description "the long side of the secondary battery 10 is bent".

Here, the example where the secondary battery 10 is repeatedly bent is described. In the case where it is repeatedly bent, external force is repeatedly applied to the exterior body 107. When such external force is applied, stress is applied to the exterior body 107 in some cases. As a result, the exterior body 107 might deteriorate; for example, a crack is generated in the exterior body 107. The deterioration of the exterior body 107 causes the entry of atmospheric components into the secondary battery 10; thus, the electrolytic solution 104 or the like deteriorates, and as a result, the characteristics of the secondary battery 10 might be degraded. Furthermore, the deterioration of the exterior body 107 also causes leakage of the electrolytic solution 104 or the like from the secondary battery 10.

Therefore, in the case where the secondary battery 10 is repeatedly bent, it is preferable that the exterior body 107 scarcely deteriorate. For example, the stress applied to the exterior body 107 is preferably low. Furthermore, the exterior body 107 preferably has a structure that can relieve the stress due to the external force applied to the exterior body 107.

Here, the positive electrode lead 121 and die negative electrode lead 125 preferably extend to the outside of the exterior body 107 from one short-side side of the rectangle, as illustrated in FIG. 2A or the like, for example.

Note that the top surface shape of the exterior body 107 of the secondary battery is not limited to a rectangle, and may be a polygon, an ellipse, or a polygon with rounded corners.

Figure 5A:
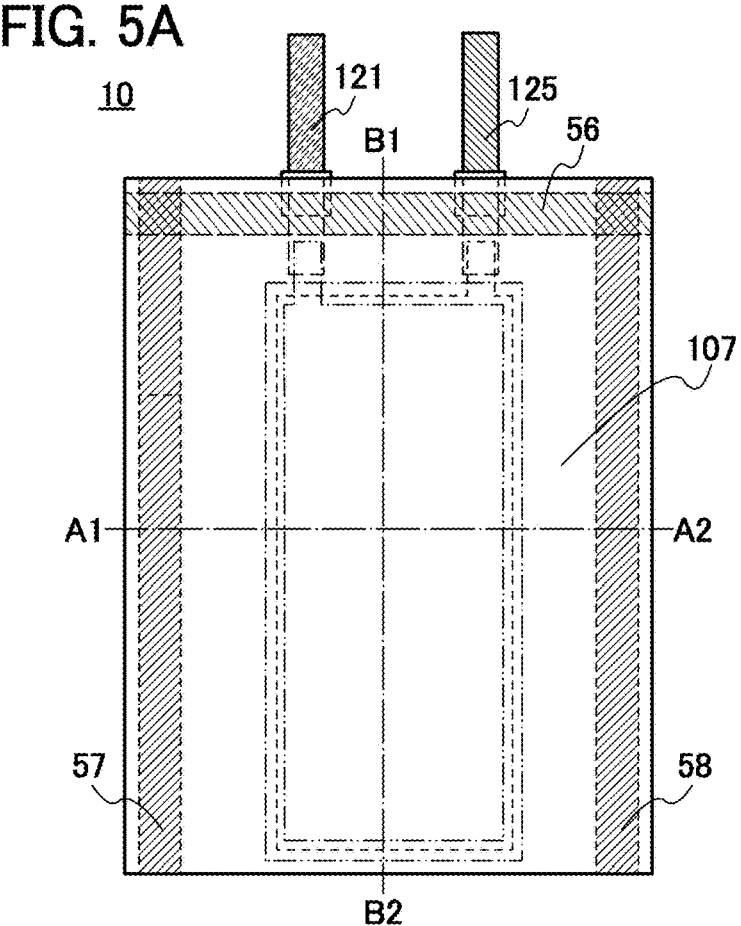
FIGS. 5A to 5C, are a top view and cross-sectional views illustrating a structure example of a secondary battery.

FIG. 5A is a top view of the secondary battery 10, which is different from the top view of FIG. 2A. The secondary battery 10 illustrated in FIG. 5A includes the exterior body 107, the positive electrode lead 121, and the negative electrode lead 125. Sealing the exterior body 107 is performed at three regions, a sealing portion 56, a sealing portion 57, and a sealing portion 58. At the sealing portion 56, the positive electrode lead 121 and the negative electrode lead 125 are sandwiched by the exterior body 107. The positive electrode lead 121 and the negative electrode lead 125 extend to the outside of the exterior body 107 through the sealing portion 56.

Figure 5B:
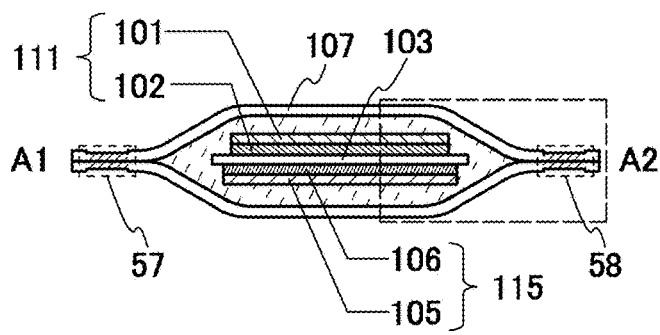
Figure 5C:
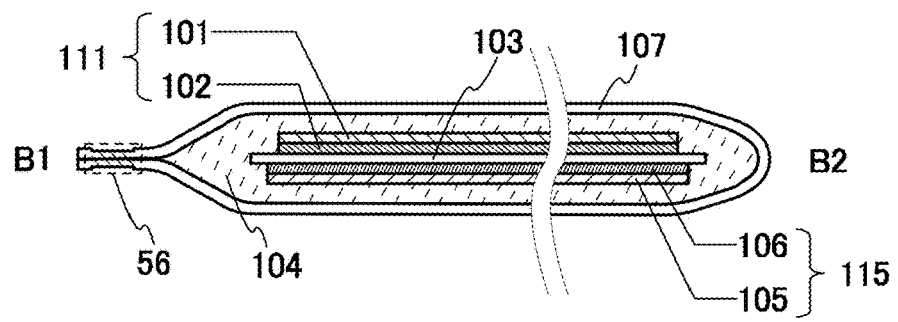

FIG. 5B illustrates a cross section taken along the dashed-dotted line A1-A2 in FIG. 5A, and FIG. 5C illustrates a cross section taken along the dashed-dotted line B1-B2 in FIG. 5A. In the cross section illustrated in FIG. 5B, the sealing portion 57 and the sealing portion 58 are provided in end portions of the exterior body 107. In the cross section illustrated in FIG. 5C, the sealing portion 56 is provided in one end portion of the exterior body 107; however, no sealing portion is provided in the other end portion, which is continuous.

In the lop view of FIG. 5A, the exterior body 107 of the secondary battery 10 has a rectangular shape, and the dashed-dotted lines A1-A2 and B1-B2 are substantially parallel to the short-side direction and the long-side direction respectively. The secondary battery 10 illustrated in FIG. 5A can be bent along the B1-B2 direction, i.e., the long-side direction. When the secondary battery 10 is bent, the end portions along tire respective long sides of the exterior body are also bent.

Note that when the secondary battery 10 is bent, the sealing portion 57 and the sealing portion 58 are largely changed in form. In contrast, the sealing portion 56 is scarcely changed in form. Since the sealing portion 57 and the sealing portion 58, which are largely changed in form, are provided, the deterioration of the exterior body 107 which is caused as a result of repeated bending of the secondary battery 10 can be minimized in some cases.

Figure 1B:
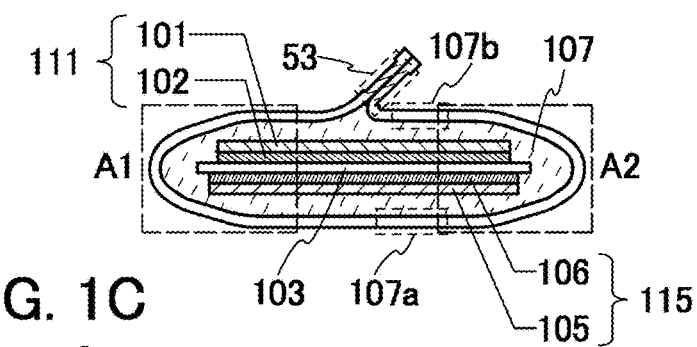
Figure 1C:
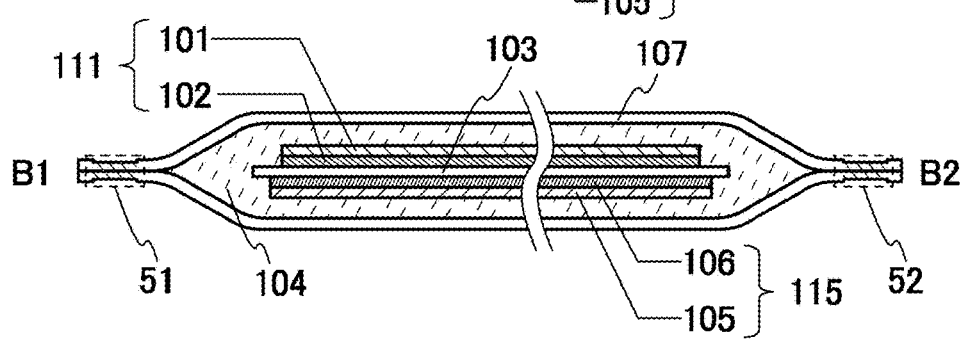

FIG. 1A illustrates the secondary battery 10 of one embodiment of the present invention. FIG. 1A is different from FIG. 2A in that a scaling portion 53 is provided as a third sealing portion. FIG. 1B illustrates a cross section taken along the dashed-dotted line A1-A2 in FIG. 1A, and FIG. 1C illustrates a cross section taken along the dashed-dotted line B1-B2 in FIG. 1A.

The secondary battery 10 includes the exterior body 107, the positive electrode lead 121, and the negative electrode lead 125. As illustrated in the top view of FIG. 1A, the secondary battery 10 includes the sealing portion 51 in the upper part and the sealing portion 52 in the lower part. At the sealing portion 51, the positive electrode lead 121 and the negative electrode lead 125 are sandwiched by the exterior body 107. The sealing portion 53 includes a first region overlapping with the sealing portion 51 and a second, region overlapping with the sealing portion 52.

In the case where the exterior body has a substantially rectangular shape when seen from above as illustrated in the top view of FIG. 1A, the sealing portion 53 is positioned between two long sides of the rectangle. Note that the sealing portion 53 may be substantially parallel to the long sides of the exterior body, for example.

Figure 7A:
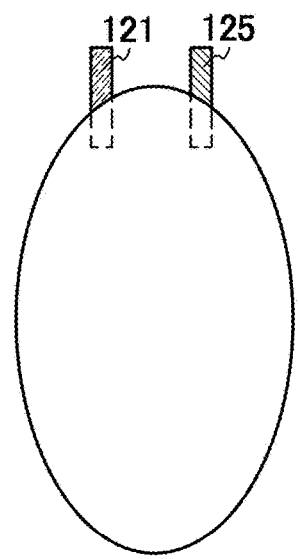
FIGS. 7A to 7E are top views illustrating structure examples of a secondary battery.
Figure 7C:
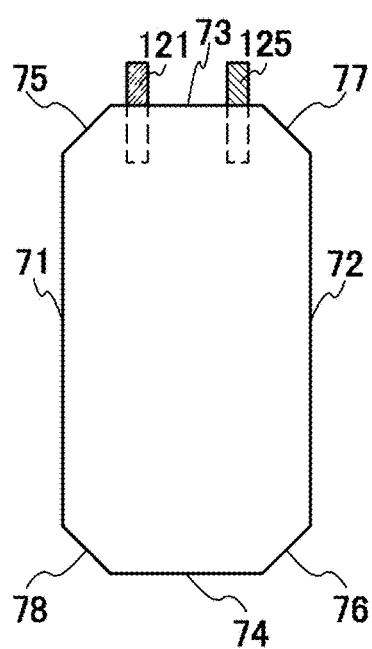
Figure 7E:
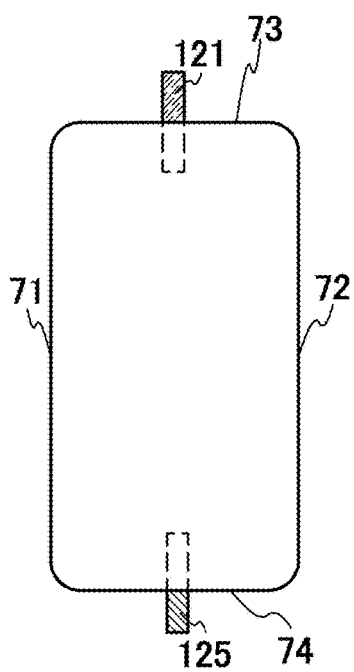
Figure 7B:
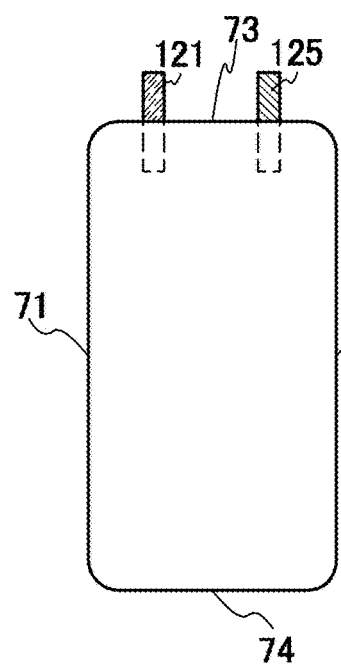

Here, the substantially rectangular shape may be a rectangular whose corner portions are partly rounded. Alternatively, it may be a rectangular whose corner portions are partly cut. FIGS. 7A to 7E are examples of top views of the exterior body 107. FIG. 7A shows an ellipse. FIG. 7B illustrates an example of a rectangle having rounded corner portions. FIG. 7C illustrates an example of a rectangle whose corner portions are partly cut. Here, in FIG. 7C, the sides 71 and 72 are also referred to as long sides. Note that the shape of FIG. 7C can also be expressed as an octagon. In the top view of FIG. 7C, the exterior body 107 includes the sides 71 and 72, which are two long sides, and the sides 73 and 74, which are substantially perpendicular to the side 71. Here, the sides 73 and 74 are also referred to as short sides. In this top view, the exterior body 107 includes a side 75 connecting the sides 71 and 73, a side 77 connecting the sides 73 and 72, a side 76 connecting the sides 72 and 74, and a side 78 connecting the sides 74 and 71. As illustrated in the top view of FIG. 7D, the exterior body 107 may have a quadrangle shape such as a trapezoid.

Figure 7D:
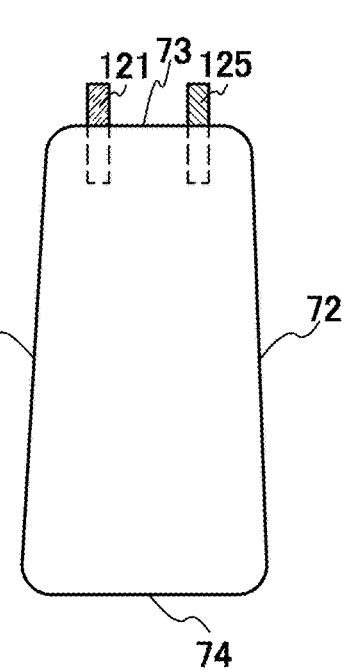

In the top views of the exterior body 107 having a substantially rectangular shape in FIGS. 7B to 7D, the positive electrode lead 121 and the negative electrode lead 125 are preferably provided on the side 73, which is a short side.

In the case where the exterior body 107 has a short axis and a long axis as illustrated in FIG. 7A, the positive electrode lead 121 and the negative electrode lead 125 are preferably positioned in an end portion of the ellipse in the long-side direction, for example.

The positive electrode lead 121 and the negative electrode lead 125 are not necessarily provided on the same side, they may be on the respective short sides. For example, as illustrated in FIG. 7E, the positive electrode lead 121 and the negative electrode lead 125 may be provided on the side 73 and the side 74, respectively.

In FIGS. 1A to 1C, the secondary battery 10 includes the positive electrode 111, the separator 103, and the negative electrode 115 facing the positive electrode 111 with the separator 103 therebetween, which are positioned in the exterior body 107. The positive electrode 111 includes the positive electrode current collector 101 and the positive electrode active material layer 102. The negative electrode 115 includes the negative electrode current collector 105 and the negative electrode active material layer 106. A space surrounded by the exterior body 107 is filled with the electrolytic solution 104.

Figure 1D:
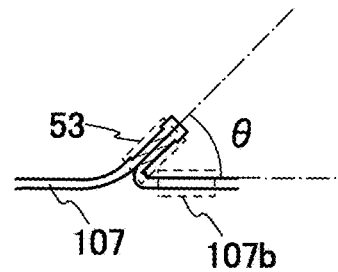

In the cross section illustrated in FIG. 1B, end portions of the exterior body 107 are each continuous, and the exterior body 107 has a bag-like shape. In the cross section of FIG. 1B, the secondary battery 10 has a surface 107a and a surface 107b thereover of the exterior body 107, and the sealing portion 53 above the surface 107b. Between the surface 107a and the surface 107b, the positive electrode 111, the negative electrode 115, and the separator 103 are provided. FIG. 1B illustrates part of the exterior body 107 including the sealing portion 53. The angle between the sealing portion 53 and the surface 107b of the exterior body 107 is shown as θ in FIG. 1D.

The exterior body 107 is formed using one member, for example. The sealing portion 53 is formed in such a manner that one end portion of one member used for forming the exterior body 107 is attached to the other end portion. The sealing portion 53 preferably has a fin-like shape, for example.

Figure 8A:
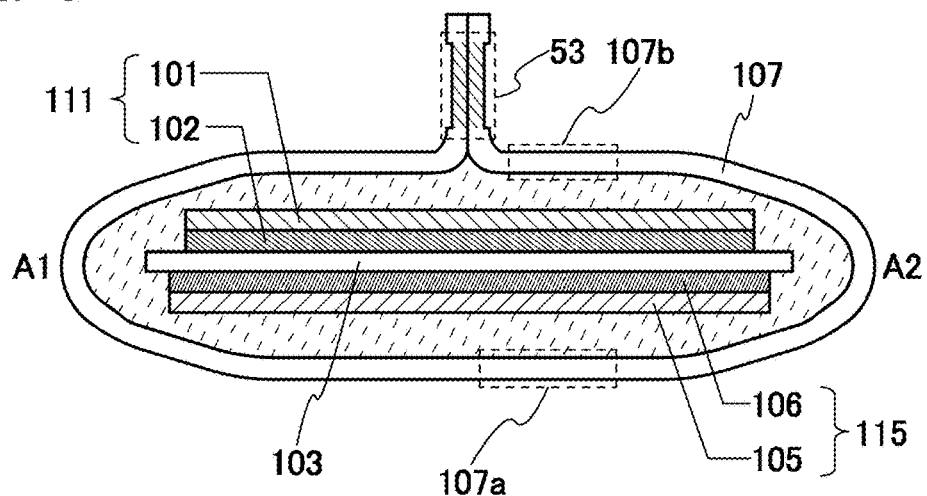
FIGS. 8A to 8E are cross-sectional views illustrating structure examples of a secondary battery.
Figure 8B:
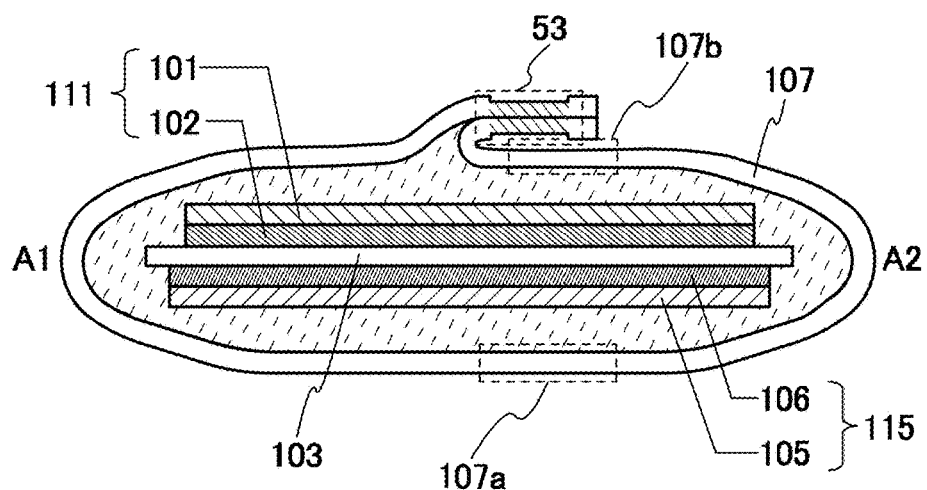
Figure 8C:
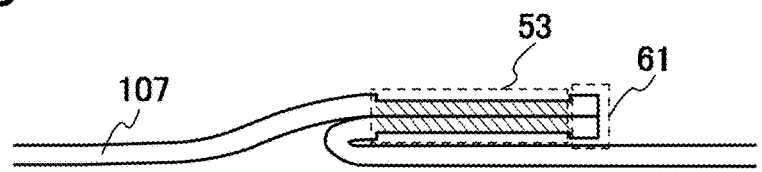
Figure 8D:
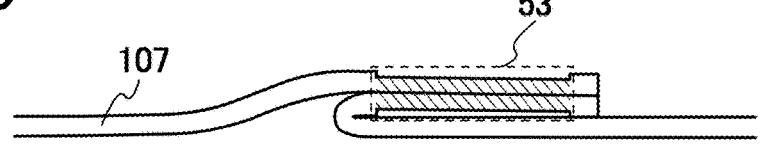
Figure 8E:
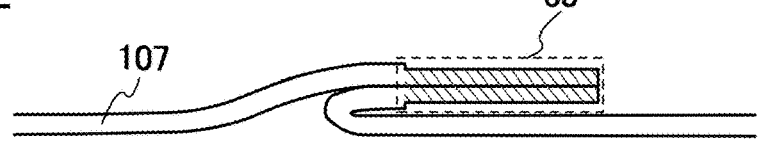

FIG. 8A illustrates an example in which the angle θ between the sin 107b and the sealing portion 53 is approximately 90°. In contrast, FIG. 8B illustrates an example in which the surface 107b and the sealing portion 53 are substantially parallel to each other. FIG. 8C is an enlarged view of part of the exterior body 107 including the sealing portion 53 illustrated in FIG. 8B. Note that as illustrated in FIG. 8D, the sealing portion 53 may be in contact with the surface 107b. As illustrated in FIGS. 8C and 8D, the sealing portion included as pact of the exterior body 107 may include a non-sealed region in an end portion of the exterior body 107 (such as a region 61 illustrated in FIG. 8C). Alternatively as illustrated in FIG. 8E, the end portion of the exterior body may also be sealed.

In the cross section illustrated in FIG. 1C, the sealing portion 51 and the sealing portion 52 are provided in end portions of the exterior body 107.

In the structure illustrated in FIGS. 1A to 1D, the number of sealing portions can be one in the cross section in the short-side direction in FIG. 1B. However, in the cross section, in the short-side direction in FIG. 5B, the number of sealing portions is two. Furthermore, in the structure illustrated in FIGS. 1A to 1D, the width of the secondary battery 10 in the cross section in FIG. 1B can be narrow.

Since the exterior body 107 has a rectangular shape when seen from above as illustrated in FIG. 1A and the like, the area of the sealing portion provided along the short side (such as the sealing portion 56 in FIG. 5A) can be smaller than that of the sealing portion provided along the long side (such as the sealing portion 57 or the sealing portion 58 in FIG. 5A). Thus, the capacity per unit volume of the secondary battery 10 can be higher.

In the cross section illustrated in FIG. 1B, the sealing portion 53 is positioned above the exterior, body 107; thus, although the thickness of the secondary battery 10 becomes larger because the scaling portion 53 is provided, the width of the secondary battery 10 can be narrow.

Note that an end portion of the sealing portion 53 seen from above is not necessarily linear for example, it may have a curved shape, it may have a wavy shape as illustrated in the top view of the secondary battery of FIG. 9.

Figure 10A:
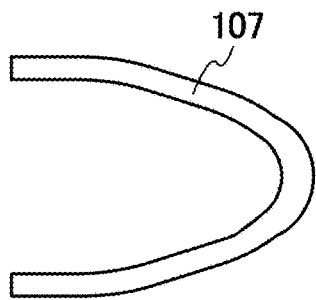
FIGS. 10A to 10G are cross-sectional views illustrating structure examples of a secondary battery.
Figure 10B:
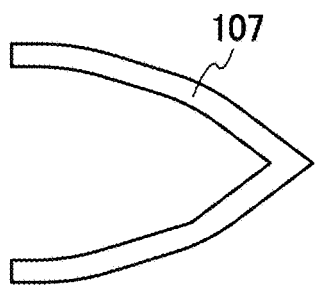

The shape of the end portion of the exterior body in the cross section is not limited to that illustrated in FIG. 1B or FIG. 2B. FIGS. 10A to 10G show examples of a region surrounded by the dashed lines in FIG. 1B and FIG. 2B, the shape of which is different from that in FIG. 1B or FIG. 2B. In the example of FIG. 10A, the exterior body 107 has a bag-like end face that is rounded. In the example of FIG. 10B, the end face of the exterior body 107 has a fold, which is different from that in FIG. 10A.

Figure 10C:
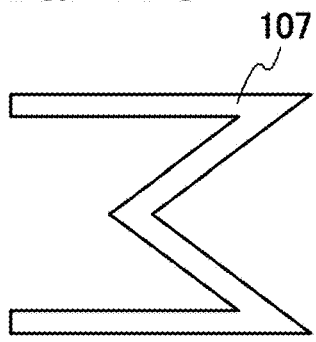
Figure 10D:
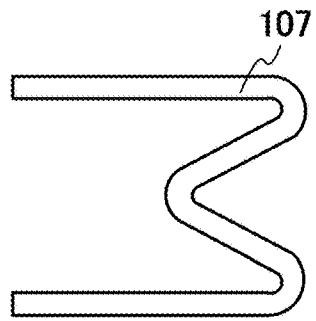

In the example of FIG. 10C, the end face is folded. Here, "the end face is folded" means that the end face has a valley-folded portion, for example. Alternatively, die end face may have an accordion-fold shape in which a mountain-folded portion and a valley-folded portion are repeated. The shape of the end face in FIG. 10C is also called bellows-fold shape. In the example of FIG. 10D, mountain-folded portions and a valley-folded portion in FIG. 10C are rounded.

Figure 10E:
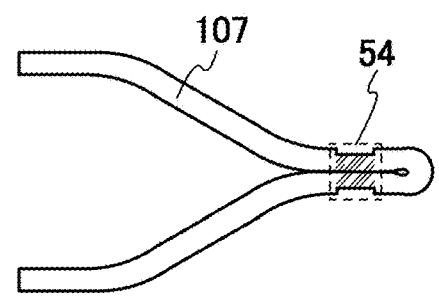

In the example of FIG. 10E, the end face in FIG. 10A partly has a sealing portion 54. Since the sealing portion 54 is provided for the exterior body 107, the end portion has higher resistance to the bending of the secondary battery 10, thus, the deterioration of the exterior body 107 may be less likely to occur.

Figure 10F:
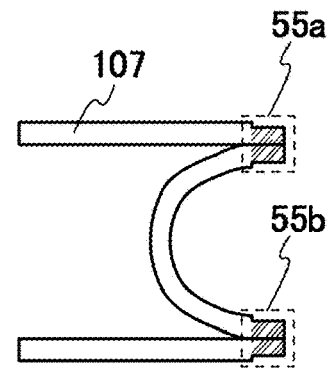
Figure 10G:
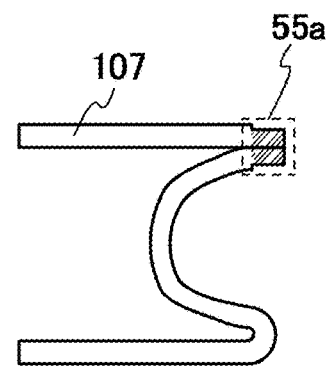

The end face in FIG. 10C can be formed using one member. Alternatively, as illustrated in FIG. 10F, the end face may be formed using two members in such a manner that a first member for forming the exterior body 107 and a second member for forming a valley-folded portion are prepared, and the first member and the second member are attached to each other at sealing portions 55a and 55b, which are provided in two mountain-folded portions. Note that one of the sealing portion 55a and the sealing portion 55b is not necessarily provided in the end face in FIG. 10F. In the example of 10G, the sealing portion 55b is not provided.

When the end face of the secondary battery 10 has such a shape as is illustrated in FIG. 10C, 10D, or 10F, the stress applied to the exterior body 107 due to the expansion of the secondary battery 10 can be lower.

Furthermore, when the end face of the secondary battery 10 has such a shape as is illustrated in FIG. 10C, 10D, or 10F, the stress applied in bending the secondary battery 10 can be relieved in some cases.

Accordingly, when the end face of the secondary battery 10 has such a shape as is illustrated in FIG. 10C, 10D, or 10F, the breakdown or deterioration of the exterior body 107 which is caused as a result of repeated bending of the secondary battery 10 can be inhibited.

FIGS. 3A to 3C illustrate an example in which the regions surrounded by the dashed lines in FIG. 1B have the shape of FIG. 10D. FIG. 3A is a top view of the secondary battery 10. FIG. 3B illustrates a cross section taken along the dashed-dotted line A1-A2 in FIG. 3A, and FIG. 3C illustrates a cross, section taken along the dashed-dotted line B1-B2 in FIG. 3A.

Figure 11A:
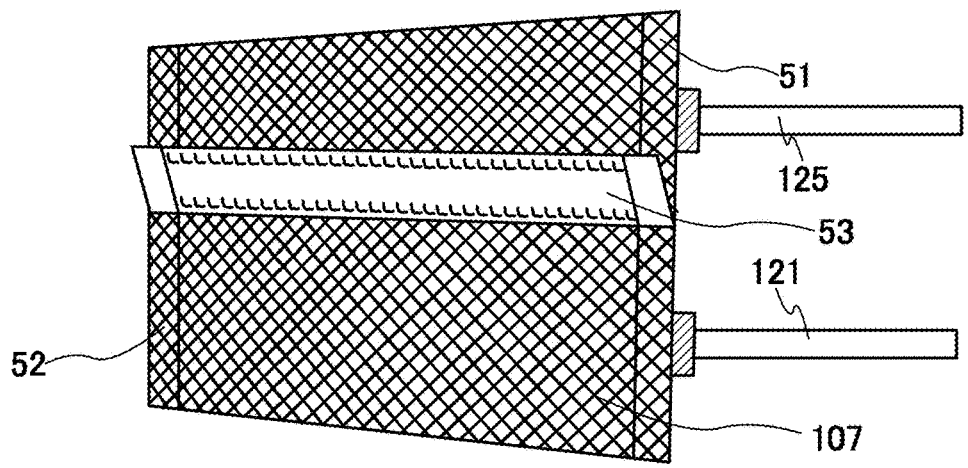
FIGS. 11A to 11D are perspective views illustrating a structure example of a secondary battery.
Figure 11B:
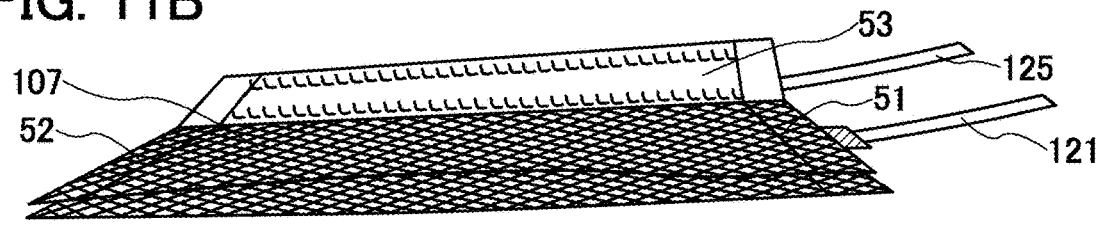
Figure 11C:
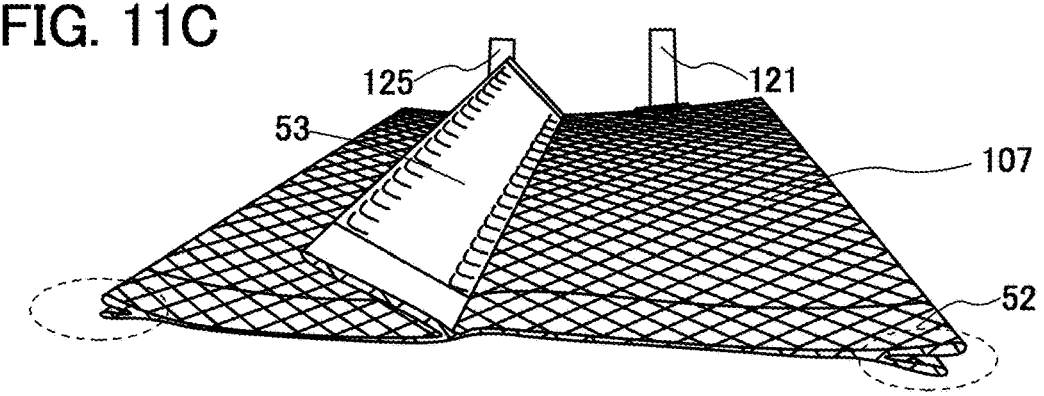
Figure 11D:
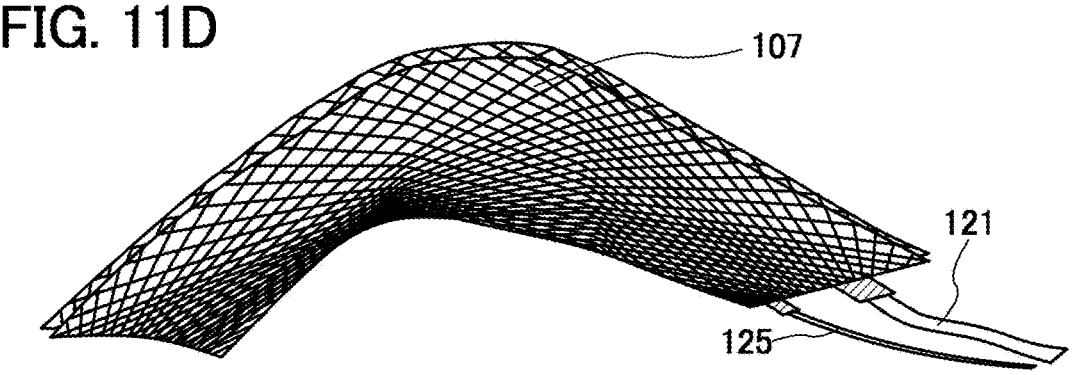

FIGS. 11A to 11D are perspective views of the secondary battery 10 illustrated in FIGS. 3A to 3C. FIG. 11A is a perspective view of the secondary battery 10 seen from above. FIG. 11B is a perspective view of the secondary battery 10 in FIG. 1B seen from the right side. FIG. 11C is a perspective view of the secondary battery 10 in FIG. 1B seen from the lower side. FIG. 11D is a perspective view of the secondary battery 10 that is bent. In FIG. 11C, regions surrounded by the dashed lines each have a cross section of a portion in which a side surface of the exterior body 107 is folded.

Figure 4A:
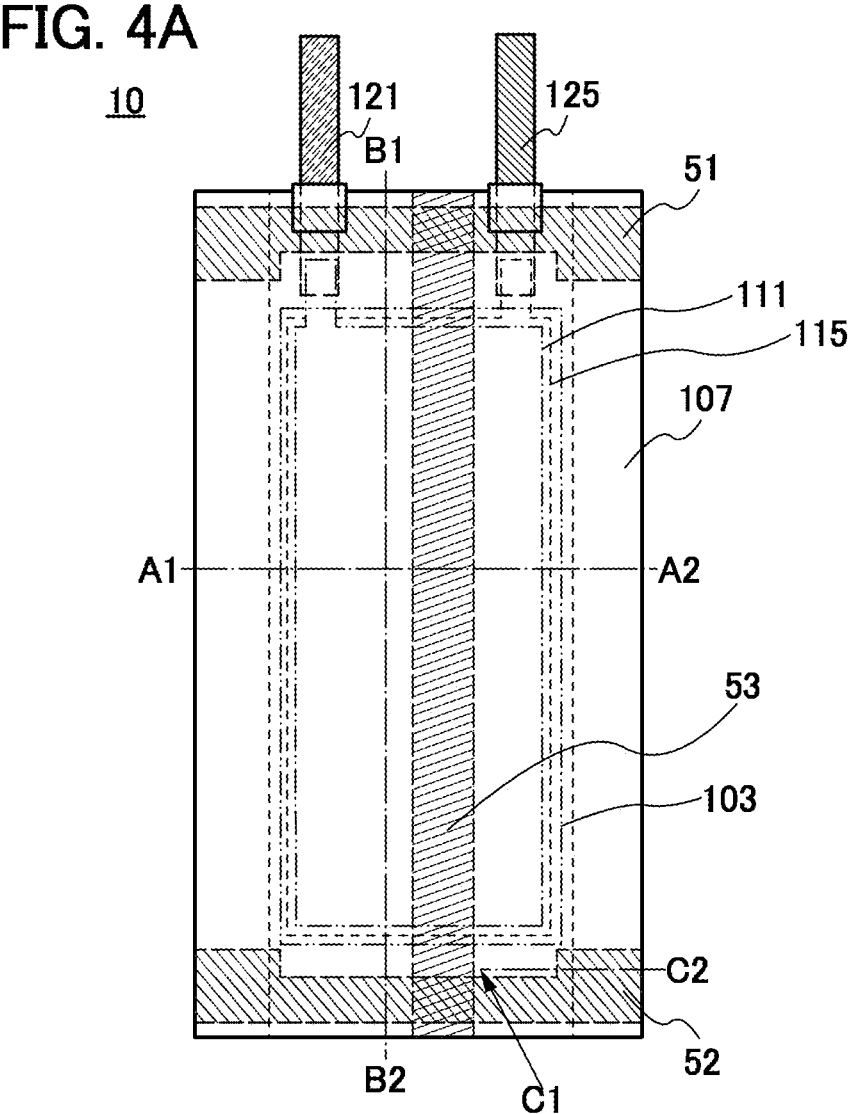
FIGS. 4A and 4B are a top view and a cross-sectional view illustrating a structure example of a secondary battery.
Figure 4B:
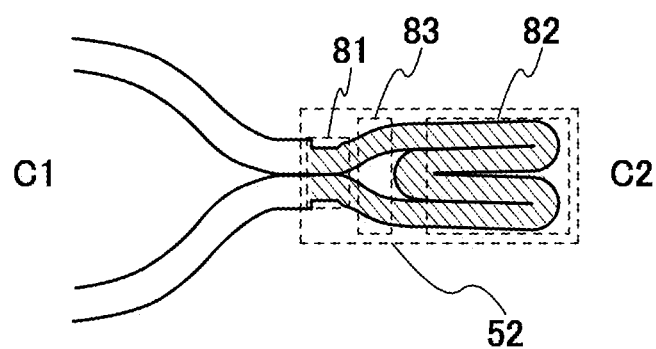

In the example of FIG. 4A, the sealing portions S1 and S2 have different shapes from those in FIG. 3A. FIG. 4B illustrates a cross section taken along the flashed-dotted line C1-C2 in FIG. 4A. In FIG. 4B, the sealing portion 52 of the exterior body 107 has a region 81 formed of two plate-like regions, a region 82 formed of four plate-like regions, and a region 83 positioned between the region 81 and the region 82. In the cross section illustrated in FIG. 4B, for example, sealing at the region 83 is not performed in some cases. The region 81 is preferably located inward from the region 82, in which case the hermeticity of the exterior body 107 in the secondary battery 10 can be sometimes improved.

Figure 12A:
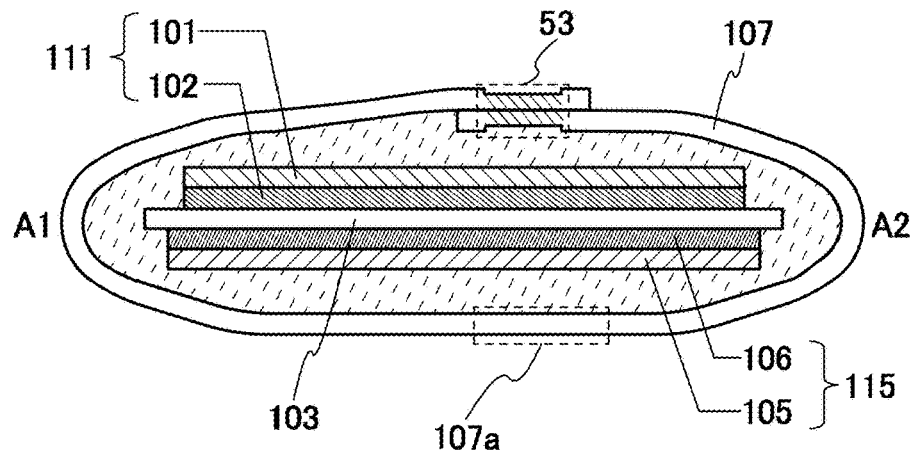
FIGS. 12A to 12C are cross-sectional views illustrating structure examples of a secondary battery.

FIG. 12A illustrates an example of the cross section of the secondary battery 10, which is different from the example of FIG. 1B. In the cross section of the secondary battery 10 illustrated in FIG. 12A, end portions of the exterior body 107 are each continuous, and the exterior body 107 has a bag-like shape. In the cross section of FIG. 12A, the secondary battery 10 includes the surface 107a of the exterior body 107 and the sealing portion 53 above the surface 107a. Between the surface 107a and the sealing portion 53, the positive electrode 111, the negative electrode 115, and the separator 103 are provided. The sealing portion 53 serves as part of the inner surface of the exterior body 107. The exterior body 107 is formed in such a manner that one member is rolled to have a tubular shape. The member has a front side and a back side. The sealing portion 53 is provided in such a manner that a region on the front side and a region on the back side are attached to each other.

Figure 12B:
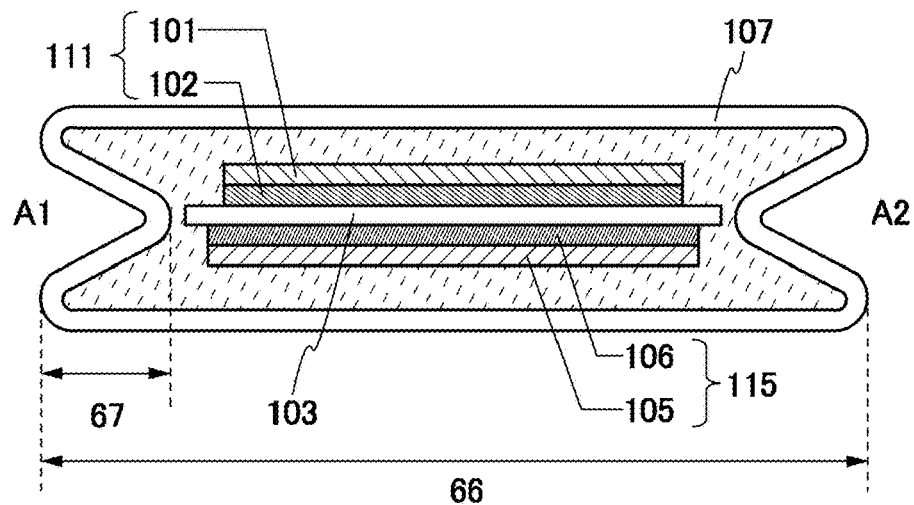
Figure 12C:
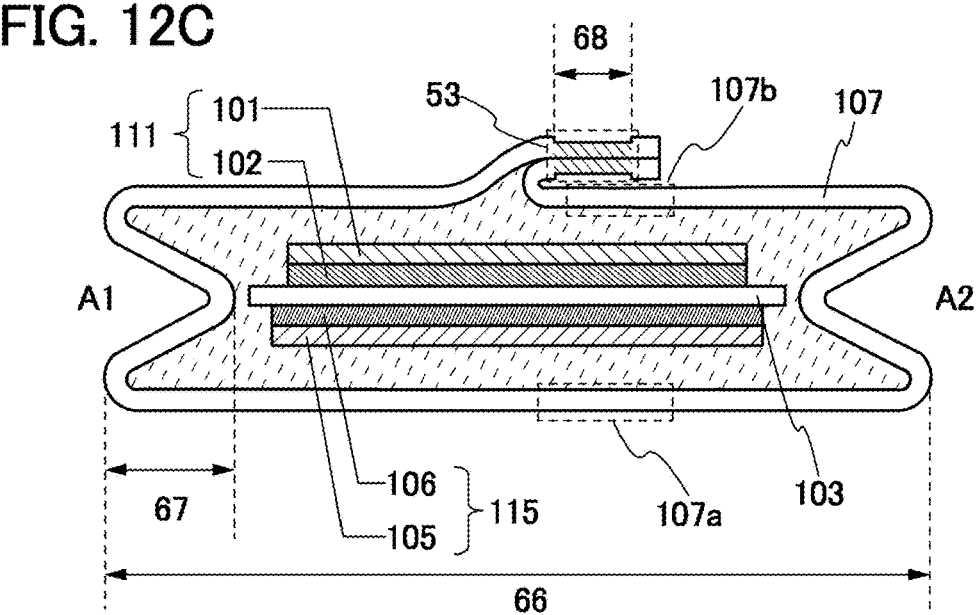

FIG. 12B illustrates an example of a cross section in which the regions surrounded by the dashed lines in FIG. 2B have the structure of FIG. 10D. FIG. 12C is an enlarged view of the cross-sectional view illustrated in FIG. 3B.

In the cross section of FIG. 12B, for example, a distance 67 between a mountain-folded portion and a valley-folded portion in the end portion is preferably 0.1 times or less, more preferably 0.05 times or less, and still more preferably 0.02 times or less as long as a width 66 of the exterior body 107 in the A1-A2 direction. The distance 67 is preferably greater than or equal to 1 mm and less than or equal to 10 mm, more preferably greater than or equal to 1 mm and less than or equal to 5 mm, and still more preferably greater than or equal to 1 mm and less than or equal to 2 mm.

In the cross section of FIG. 12C, for example, a width 68 of the sealing portion 53 is preferably 0.1 times or less, more preferably 0.05 times or less, and still more preferably 0.02 times or less as large as the width 66 of the exterior body 107. The width 68 is preferably greater than or equal to 1 mm and less than or equal to 10 mm, more preferably greater than or equal to 1 mm and less than or equal to 5 mm, and still more preferably greater than or equal to 1 mm and less than or equal to 2 mm.

In FIGS. 12B and 12C, the distance 67 can be sometimes smaller than the width of the sealing portion in the ease where the sealing portion is provided in the end portion, thus, the capacity per unit volume of the secondary battery 10 can be increased in some cases.

The width of the secondary battery 10 can be smaller in some cases when the sealing portion is bent or folded. FIGS. 13A to 13D and FIGS. 14A to 14C are each an enlarged view of the sealing portion 58 illustrated in FIG. 5B and the exterior body 107 in its vicinity. FIGS. 13A to 13D and FIGS. 14A to 14C show various examples in which the sealing portion 58 is bent. Note that an example where the scaling portion 58 is bent is described here; however, the sealing portion 57 may be bent.

FIG. 13A shows the state where the sealing portion 58 has not been bent yet. FIG. 13B shows the bent sealing portion 58. The sealing portion 58 may be partly in contact with the exterior body 107 by being bent. FIG. 13C shows an example where the sealing portion 58 is bent substantially in half. Although the secondary battery 10 of FIG. 13C has a wider width than that of FIG. 13B, it sometimes can have higher resistance to the repeated bending of the secondary battery 10, for example.

As illustrated in FIG. 13D, the position at which the secondary battery 10 is folded may be located inward from the sealing portion 58 by a distance 69.

Figure 14A:
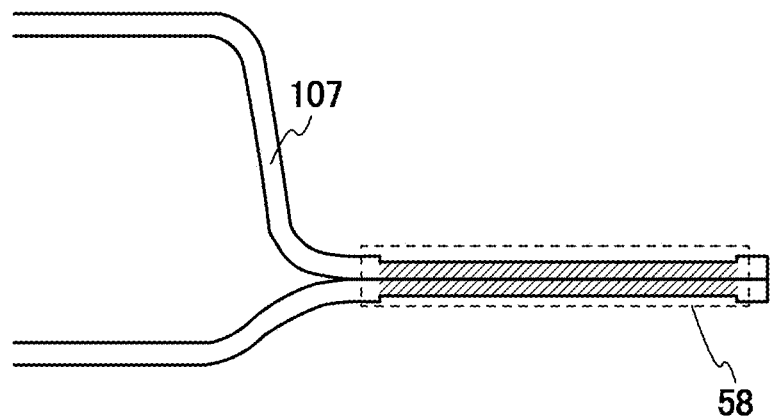
FIGS. 14A to 14C are cross-sectional views illustrating structure examples of a secondary battery.
Figure 14B:
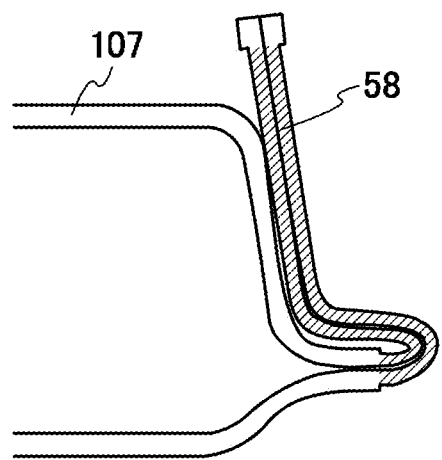
Figure 14C:
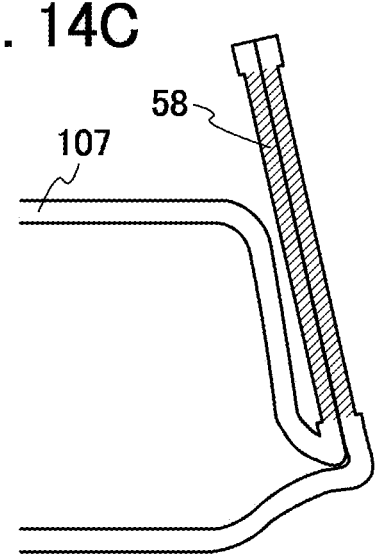

FIGS. 14A to 14C illustrate an example where the thickness of the secondary battery 10 is half or more, preferably 70% or more of the width of the sealing, portion 58. FIG. 14A shows the state where the sealing portion 58 has not been folded yet. In FIG. 14B, the sealing portion 58 is partly in contact with the side surface of the exterior body 107 by being bent. In the example of FIG. 14C, a region of the exterior body 107 located inward from the sealing portion 58 is bent. The width of the secondary battery 10 in the case of FIG. 14C can be sometimes narrower than that in the case of FIG. 14B. However, the stress applied to the exterior body due to the bending of the secondary battery 10 in the case of FIG. 14B can be sometimes lower than that in the case of FIG. 14C.

Modification Example 1

Figure 15A:
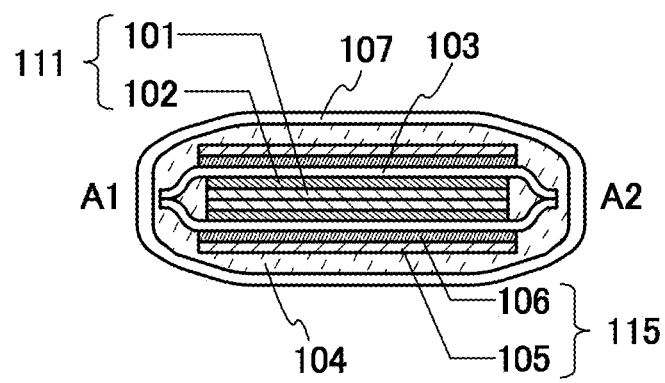
FIGS. 15A and 15B are cross-sectional views illustrating a structure example of a secondary battery.
Figure 15B:
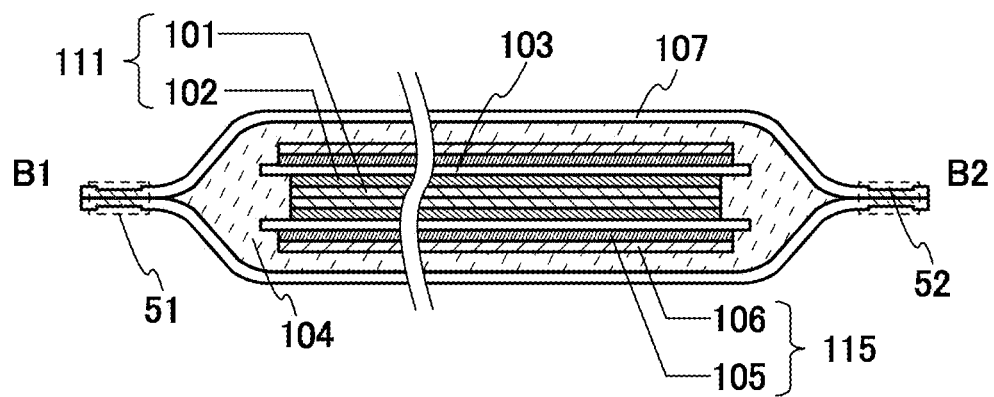

In the secondary battery 10 illustrated in FIGS. 1A to 1D, FIGS. 2A to 2C, FIGS. 3A to 3C, FIGS. 4A and 4B, or the like, the positive electrode 111 and the negative electrode 115 each have a single-layer structure, however, one embodiment of the present invention is not limited thereto. In the secondary battery 10, for example, a plurality of positive electrodes 111 and a plurality of negative electrodes 115 may be stacked. FIGS. 15A and 15B show such an example. FIG. 15A is a cross-sectional view taken along the dashed-dotted line A1-A2 in FIG. 1A and FIG. 15B is a cross-sectional view taken along the dashed-dotted line B1-B2 in FIG. 1B.

In FIGS. 15A and 15B, the negative electrode 115, the positive electrode 111, the positive electrode 111, and the negative electrode 115 are stacked in this order from the exterior body 107 side, and the separator 103 is provided between the negative electrode 115 and the positive electrode 111. The positive electrode 1it includes the positive electrode active material layer 102 on one surface of the positive electrode current collector 101, and the negative electrode 115 includes the negative electrode active material layer 106 on one surface of the negative electrode current collector 105. The positive electrode active material layer 102 and the negative electrode active material layer 106 face each other with the separator 103 positioned therebetween. In the cross section illustrated in FIG. 15A, the separator 103 has a bag-like shape by which the pair of positive electrodes 111 is surrounded. Alternatively, the separator 103 may have a bag-like shape by which one positive electrode 111 is surrounded. Instead of the positive electrode 111, the negative electrode 115 may be surrounded by the separator 103.

When the plurality of positive electrodes 111 and the plurality of negative electrodes 115 are stacked in this manner, the capacity per unit area of the secondary battery 10 can be increased.

Figure 16A:
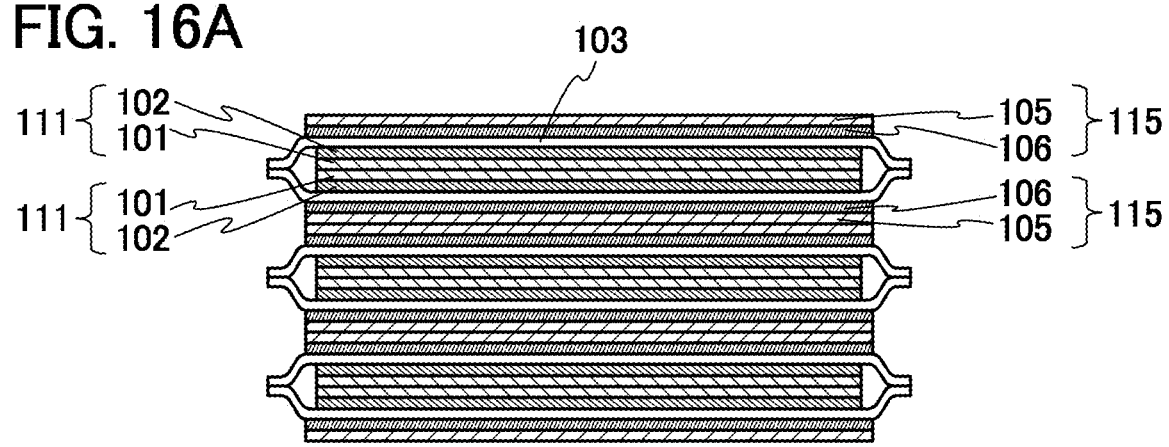
FIGS. 16A to 16C are cross-sectional views illustrating structure examples of a secondary battery.

Although two positive electrodes 111 and two negative electrodes 115 are stacked in the secondary battery 10 illustrated in FIGS. 15A and 15B, three or more positive electrodes 111 and three or more negative electrodes 115 may be stacked. In the example of FIG. 16A, six positive electrodes 111 and six negative electrodes 115 are stacked in such an order as shown in FIG. 15A.

In the structure shown in FIG. 16A, the positive electrodes 111 and the negative electrodes 115 are stacked in such a manner that surfaces of the positive electrodes 111 on each of which the positive electrode active material layer 102 is not provided are in contact with each other, and surfaces of the negative electrodes 115 on each of which the negative electrode active material layer 106 is not provided are in contact with each other. When the positive electrodes 111 and the negative electrodes 115 are stacked in this manner, contact surfaces between metals can be formed; specifically, the surfaces of the positive electrodes 111 on each of which the positive electrode active material layer 102 is not provided can be in contact with each other, and the surfaces of the negative electrodes 115 on each of which the negative electrode active material layer 106 is not provided can be in contact with each other. The coefficient of friction of the contact surface between metals can be lower than that of a contact surface between the active material and the separator.

Therefore, when the secondary battery 10 is curved, the surfaces of the positive electrodes 111 on each of which the positive electrode active material layer 102 is not provided slide on each other, and the surfaces of the negative electrodes 115 on each of which the negative electrode active material layer 106 is not provided slide on each other; thus, the stress due to the difference between the inner diameter and the outer diameter of a curved portion can be relieved.

Here, the inner diameter of the curved portion refers to the radius of curvature of the inner surface of the curved portion in the exterior body 107 of the secondary battery 10 in the case where the secondary battery 10 is curved, for example. Therefore, the deterioration of the secondary battery 10 can be minimized. Accordingly, the secondary battery 10 can be highly reliable.

Figure 16B:
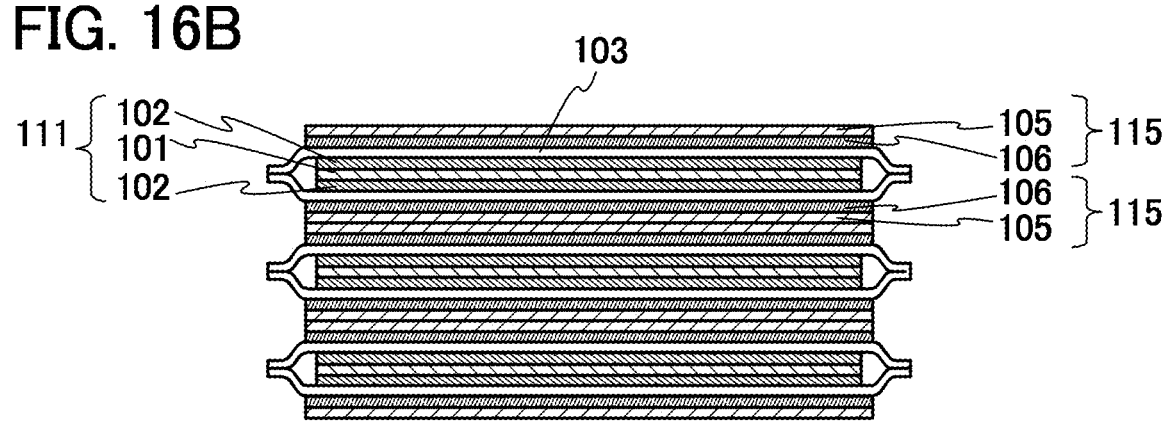

FIG. 16B illustrates an example of a stack of the positive electrodes 111 and the negative electrodes 115, which is different from the example of FIG. 16A. FIG. 16B is different from FIG. 16A in that the positive electrode active material layers 102 are provided on both surfaces of the positive electrode current collector 101. When the positive electrode active material layers 102 are provided on both the surfaces of the positive electrode current collector 101 as illustrated in FIG. 16B, the capacity per unit volume of the secondary battery 10 can be increased.

Figure 16C:
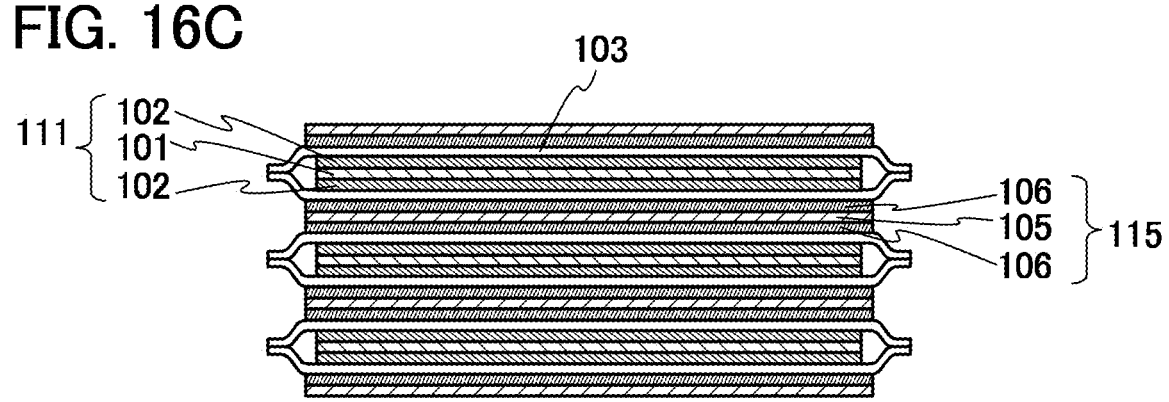

FIG. 16C illustrates an example of a stack of the positive electrodes 111 and the negative electrodes 115, which is different from the example of FIG. 16B. FIG. 16C is different from FIG. 16B in that the negative electrode active material layers 106 are provided on both surfaces of the negative electrode current collector 105. When the negative electrode active material layers 106 are provided on both the surfaces of the negative electrode current collector 105 as illustrated in FIG. 16C, the capacity per unit volume of the secondary battery 10 can be further increased.

Figure 17A:
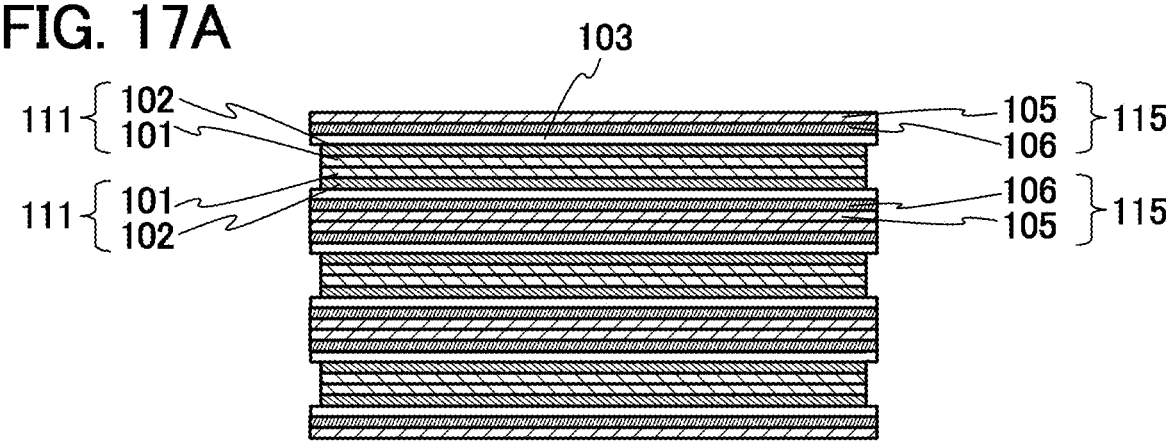
FIGS. 17A and 17B are cross-sectional views illustrating structure examples of a secondary battery.

In the structures illustrated in FIG. 5A and FIGS. 16A to 16C, the separator 103 has a bag-like shape by which the positive electrodes 111 are surrounded; however, one embodiment of the present invention is not limited thereto. FIG. 17A shows an example in which the separator 103 has a different structure from that in FIG. 16A. FIG. 17A is different from FIG. 16A in that one sheet-like separator 103 is provided between the positive electrode active material layer 102 and the negative electrode active material layer 106. In the example of FIG. 17A, six positive electrodes 111 and six negative electrodes 115 are stacked, and six separators 103 are provided.

Figure 17B:
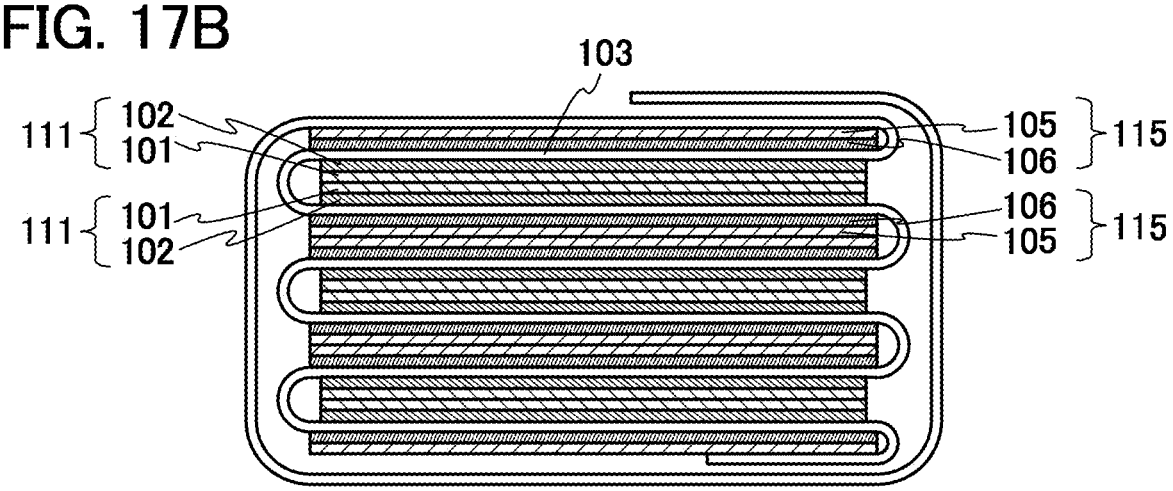

FIG. 17B shows an example in which the separator 103 has a different structure from that in FIG. 17A. FIG. 17B is different from FIG. 17A in that one separator 103 is folded plural times so as to be repeatedly sandwiched between the positive electrode active material layer 102 and the negative electrode active material layer 106. In other words, in the structure of FIG. 17B, the separators 103 in FIG. 17A are extended and connected to each other. In the structure of FIG. 17B, six positive electrodes 111 and six negative electrodes 115 are stacked and thus the separator 103 needs to be folded five times or more. The separator 103 is not necessarily provided so as to be sandwiched between the positive electrode active material layer 102 and, the negative electrode active material layer 106; the plurality of positive electrodes 111 and the plurality of negative electrodes 115 may be bounded together by the separator 103 that is extended.

Figure 45A:
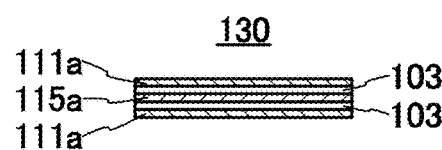
FIGS. 45A to 45D are cross-sectional views and a perspective view of a secondary battery.
Figure 45B:
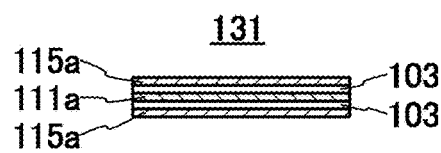
Figure 45C:
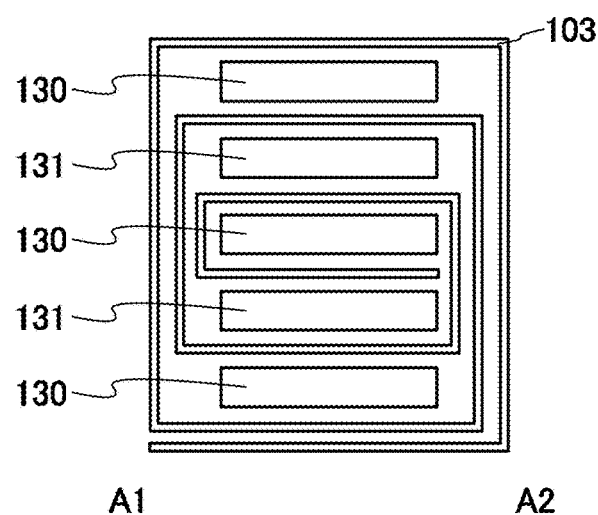

Note that the positive electrode, the negative electrode, and the separator may be stacked as illustrated in FIGS. 45A to 45D. FIG. 45A is a cross-sectional view of a first electrode assembly 130, and FIG. 45B is a cross-sectional view of a second electrode assembly 131. FIG. 45C is a cross-sectional view taken along the dashed-dotted line A1-A2 in FIG. 1A. In FIG. 45C, the first electrode assembly 130, the second electrode assembly 131, and the separator 103 are selectively illustrated for the sake of clarity.

As illustrated in FIG. 45C, the secondary battery 10 includes a plurality of first electrode assemblies 130 and a plurality of second electrode assemblies 131.

As illustrated in FIG. 45A, in each of the first electrode assemblies 130, a positive electrode 111a including the positive electrode active material layers 102 on both surfaces of the positive electrode current collector 101, the separator 103, a negative electrode 115a including the negative electrode active material layers 106 on both surfaces of the negative electrode current collector 105, the separator 103, and the positive electrode 111a including the positive electrode active material layers 102 on both surfaces of the positive electrode current collector 101 are stacked in this order. As illustrated in FIG. 45B, in each of the second electrode assemblies 131, the negative electrode 115a including the negative electrode active material layers 106 on both surfaces of the negative electrode current collector 105, the separator 103, the positive electrode 111a including the positive electrode active material layers 102 on both surfaces of the positive electrode current collector 101, the separator 103, and the negative electrode 115a including the negative electrode active material layers 106 on both surfaces of the negative electrode current collector 105 are stacked in this order.

As illustrated in FIG. 45C, the plurality of first electrode assemblies 130 and the plurality of second electrode assemblies 131 are covered with the wound separator 103.

Figure 45D:
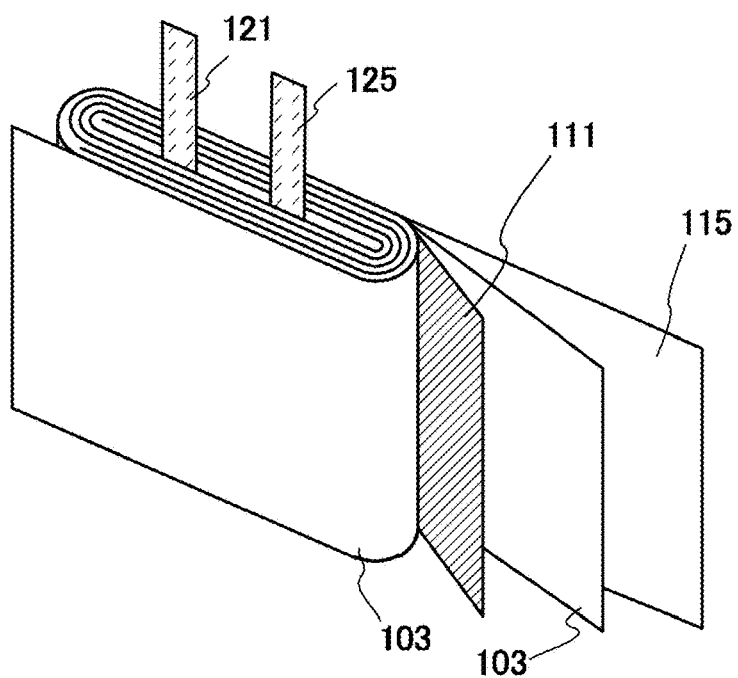

As illustrated in a perspective view of FIG. 45D, the secondary battery 10 may be what is carted a wound storage battery with a structure in which one snip-like positive electrode 111, one strip-like separator 103, and one strip-like negative electrode 115 are sequentially stacked and then wound. Here, the positive electrode 111 in FIG. 45D includes the positive electrode current collector 101 and the positive electrode active material layers 102 on both surfaces of the positive electrode current collector 101. The negative electrode 115 in FIG. 45D includes the negative electrode current collector 105 and the negative electrode active material layers 106 on both surfaces of the negative electrode current collector 105.

Method for Manufacturing Thin Secondary Battery

A method for manufacturing the secondary battery 10 will be described.

Figure 18A:
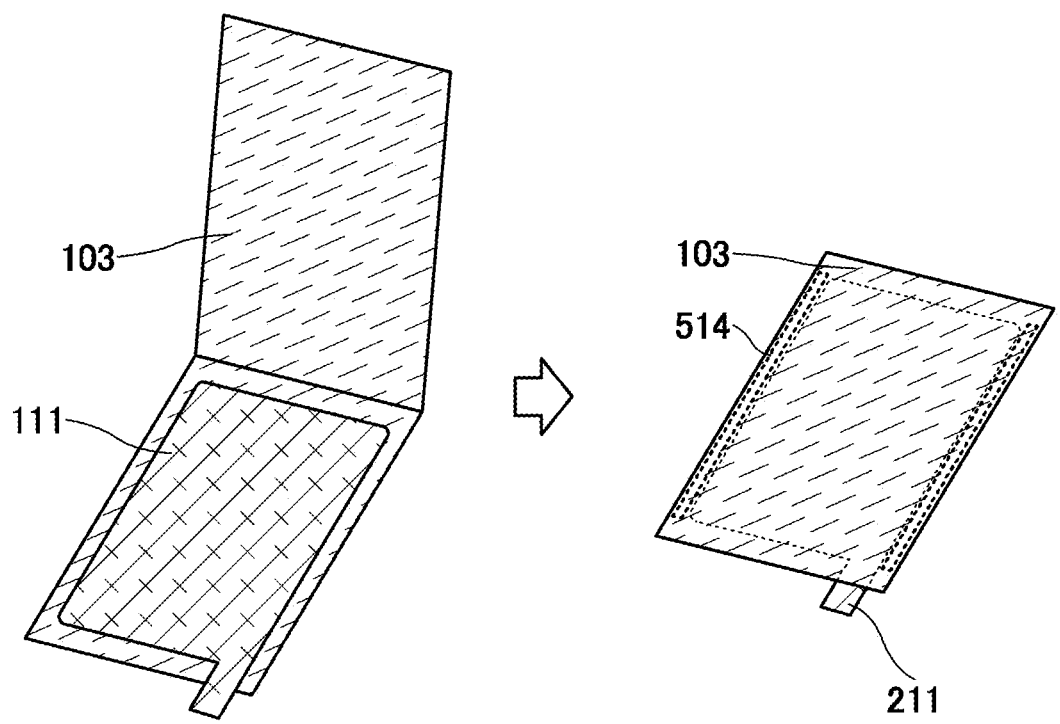
FIGS. 18A and 18B illustrate an example of a method for manufacturing a secondary battery.
Figure 18B:
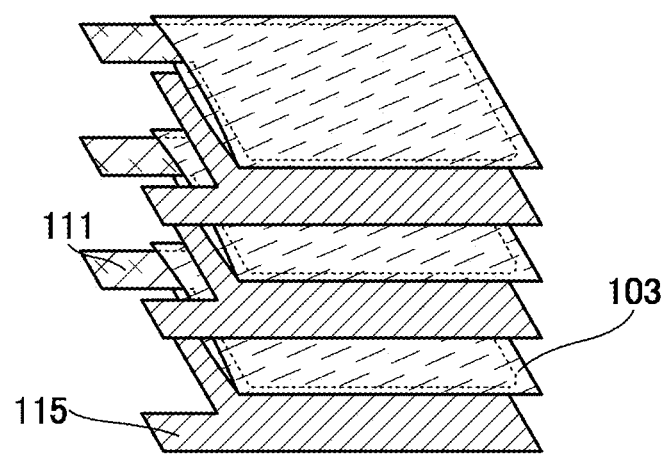

The separator 103 is preferably formed to have a bag-like shape to surround one of the positive electrode 111 and the negative electrode 115. For example, as illustrated in FIG. 18A, the separator 103 is folded in half such that the positive electrode 111 is sandwiched, and sealed with a sealing portion 514 in a region outside the region overlapping with the positive electrode 111; thus, the positive electrode 111 can be reliably supported inside the separator 103. Then, as illustrated in FIG. 18B, the positive electrodes 111 surrounded by the separator 103 and the negative electrodes 115 are alternately stacked.

Figure 19A:
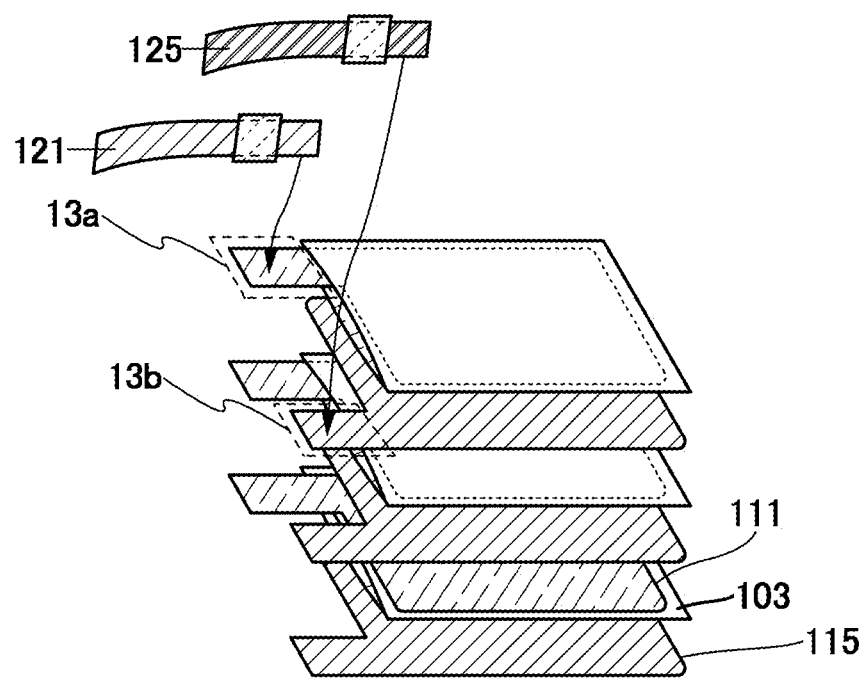
FIGS. 19A and 19B illustrate an example of a method for manufacturing a secondary battery.
Figure 19B:
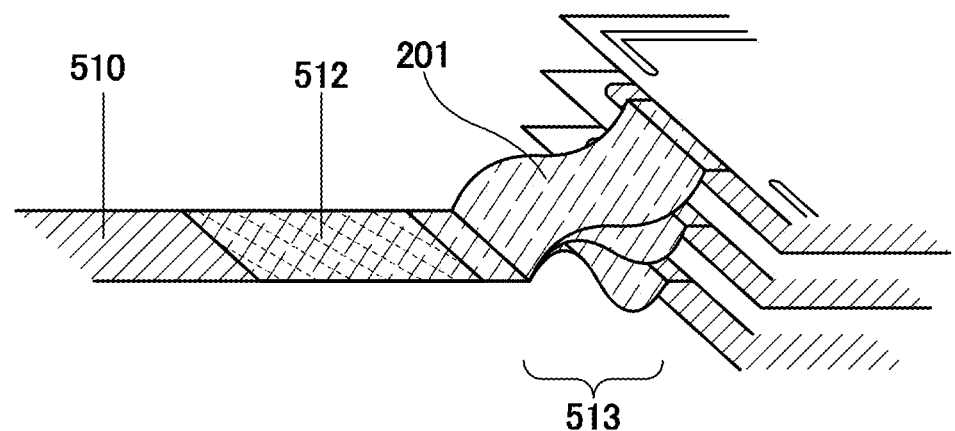

Next, the positive electrode lead 121 and the negative electrode lead 123 are welded to a tab region 13a of the positive electrode 111 and a tab region 13b of the negative electrode 115, respectively. In each of the tab regions 13a and 13b, at least part of the current collector is preferably exposed. FIG. 19A illustrates an example where a current collector is welded to a lead electrode, specifically, an example where the positive electrode current collectors 101 are welded to the positive electrode lead 121. The positive electrode current collectors 101 are welded, to the positive electrode lead 121 in a welding region 512 by ultrasonic welding or the like. The positive electrode current collector 101 includes a hem portion 513 as illustrated in FIG. 19B, and it is therefore possible to relieve stress due to external force applied after fabrication of the secondary battery. Thus, the secondary battery can have high reliability.

Figure 20A:
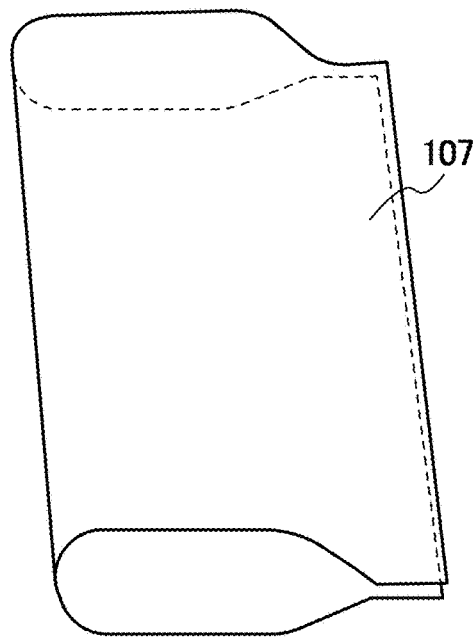
FIGS. 20A to 20D illustrate an example of a method for manufacturing a secondary battery.
Figure 20B:
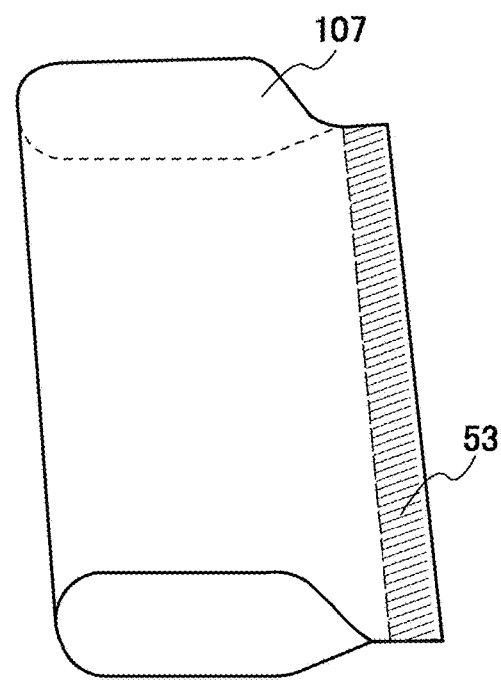

Then, the exterior body 107 is prepared. As illustrated in FIG. 20A, one member is folded in half such that two facing sides of the member are aligned with each other. Next, the two sides aligned with each other and their vicinities are sealed so that the sealing portion 53 is formed. In this manner, the exterior body 107 having a tubular shape is formed (see FIG. 20B). As the exterior body 107, for example, a structure in which a resin layer is provided on a surface of sheet-like metal can be used. It is preferable that a resin of the resin layer can be welded by heat. Thermal welding or the like is preferably used for forming the sealing portion 53, for example.

Figure 20C:
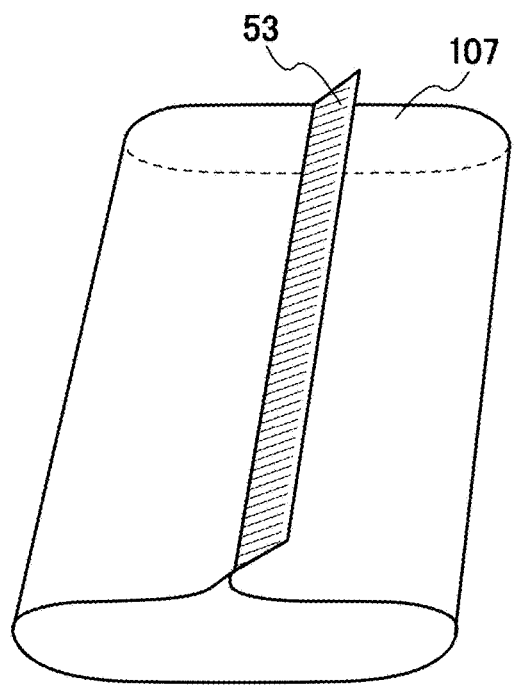
Figure 20D:
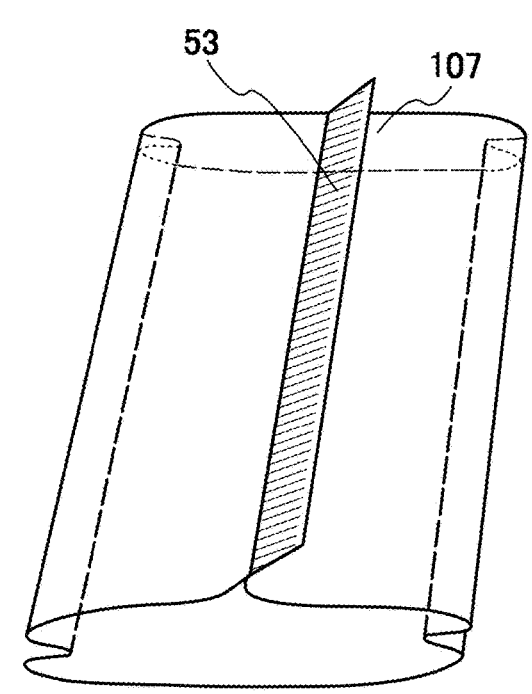

Then, the shape of the exterior body 107 is preferably changed into a flattened shape such that the sealing portion 53 is positioned in substantially the center part of the exterior body 107 when seen from above (see FIG. 20C). After that, two end portions of the exterior body 107 are folded inward (see FIG. 20D).

Figure 21:
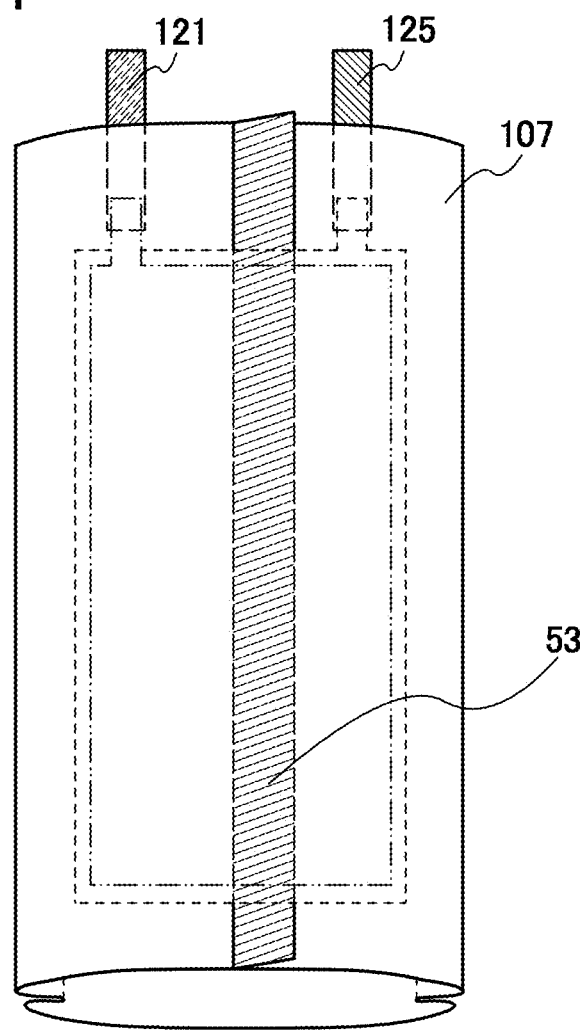
FIG. 21 illustrates an example of a method for manufacturing a secondary battery.

Next, a stack of the positive electrode connected to the positive electrode lead 121, the negative electrode connected to the negative electrode lead 125, and the separator are inserted into a space surrounded by the exterior body 107 having a tubular shape (see FIG. 21). After that, the sealing portion 51 and the sealing portion 52 are provided in the upper end portion and the lower end portion, respectively, of the exterior body 107 seen from above. Through the above steps, the secondary battery 10 illustrated in FIGS. 1A to 1D can be manufactured.

In the secondary battery 10 described here, as one example, the positive electrode lead 121 and the negative electrode lead 125 are bonded to the positive electrode current collector 101 and the negative electrode current collector 105, respectively, by ultrasonic welding such that the positive electrode lead 121 and the negative electrode lead 125 are exposed to the outside. The positive electrode current collector 101 and the negative electrode current collector 105 may double as terminals for electrical contact with the outside in that case, the positive electrode current collector 101 and the negative electrode current collector 105 may be arranged so that pan of the positive electrode current collector 101 and part of die negative electrode current collector 105 are exposed to the outside the exterior body 107 without using lead electrodes.

As the exterior body 107 in the secondary battery 200, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

In the above structure, the exterior body 107 of the secondary battery can change its form with a radius of curvature greater than or equal to 30 mm, preferably greater than or equal to 10 mm. One or two films are used as the exterior body of the secondary battery. In the case where the secondary battery has a layered structure, the secondary battery has a cross section sandwiched by two curved surfaces of the films when it is bent.

Note that the cross-sectional shape of the secondary battery is not limited to a simple are shape, and the cross section can be partly arc-shaped; for example, an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 30 mm, preferably greater than or equal to 10 mm.

Next, aging after fabrication of the secondary battery will be described. Aging is preferably performed after fabrication of a secondary battery. The aging can be performed under the following conditions, for example. Charge is performed at a rate of 0.001 C or more and 0.2 C or less at a temperature higher than or equal to room temperature and lower than or equal to 40° C. In the case where an electrolytic solution is decomposed and a gas is generated and accumulated in the cell, the electrolytic solution cannot be in contact with a surface of the electrode in some regions. That is to say, an effectual reaction area of the electrode is reduced and effectual current density is increased.

When the current density is too high, a voltage drop occurs depending on the resistance of the electrode, and the deposition of lithium on the surface of the active material proceeds in parallel with the intercalation of lithium into the active material. The lithium deposition might reduce capacity. For example, if a coating film or the like grows on the surface after lithium deposition, lithium deposited on the surface cannot be dissolved. This lithium cannot contribute to capacity. In addition, when deposited lithium is physically collapsed and conduction with the electrode is lost, the lithium also cannot contribute to capacity. Therefore, the gas is preferably released before the potential of the electrode reaches the potential of lithium because of a voltage drop.

After the release of the gas, the charging state may be maintained at a temperature higher than room temperature, preferably higher than or equal to 30° C. and lower than or equal to 60° C., more preferably higher than or equal to 35 and lower than or equal to 60° C. for, for example, 1 hour or more and 100 hours or less. In the initial charge, an electrolytic solution decomposed on the surface forms a coating film. The formed coating film may thus be densified when the charging state is held at a temperature higher than room temperature after the release of the gas, for example.

Here, in the case where the thin secondary battery is bent, it is preferably bent after the release of the gas. By bending the thin secondary battery after the release of the gas, for example, lithium deposition in a region to which stress is applied due to the bending or the like can be prevented.

Capacity of Secondary Battery

Then, the capacity per unit area of each of the structures illustrated in FIGS. 1A to 1D and FIGS. 5A to 5C seen from above is calculated.

Figure 42:
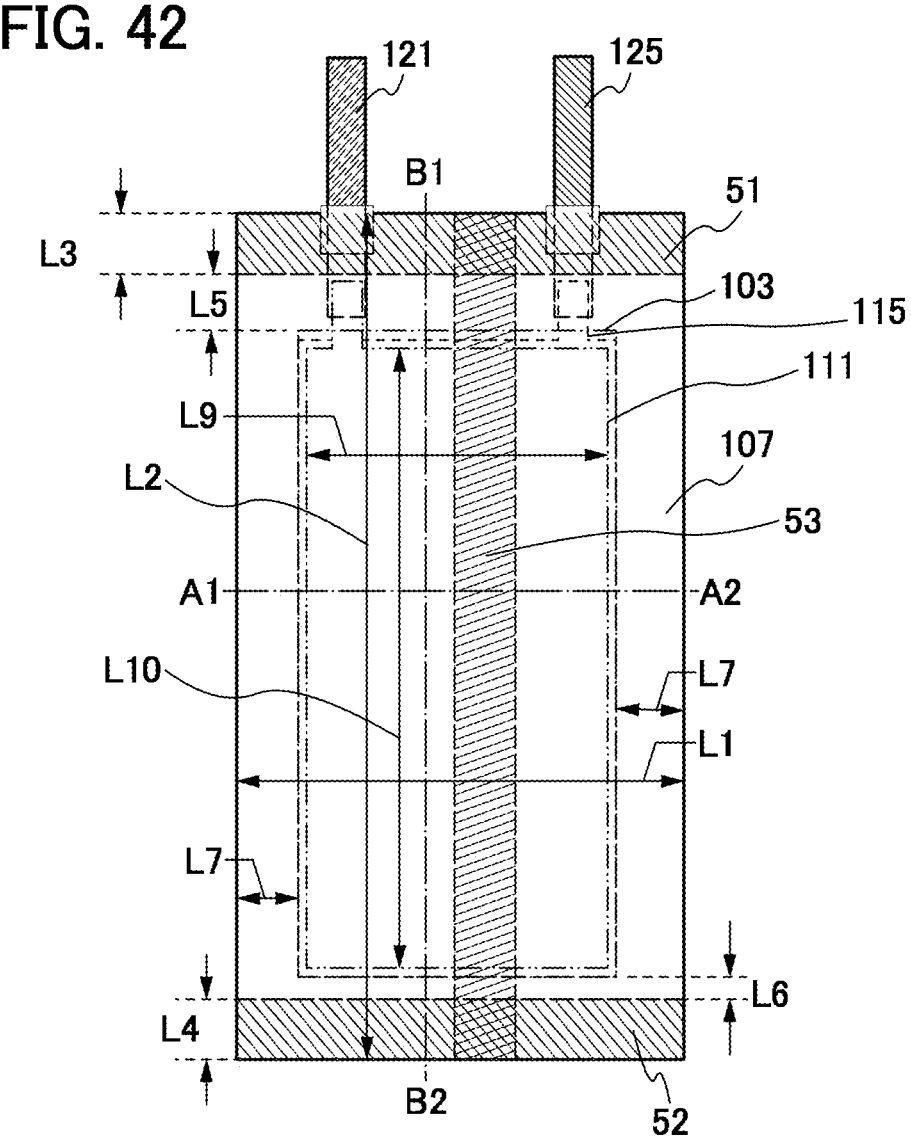
FIG. 42 is a top view of a secondary battery.

FIG. 42 is a top view of the structure illustrated in FIGS. 1A to 1D. For the sake of simplicity of calculation, the distance between the upper end portion of the exterior body and the sealing portion 51 and the distance between the lower end portion of the exterior body and the sealing portion 52 are set to 0. A length L1 represents the width of the exterior body; a length L2 represents the length of the exterior body; a length L3 represents the width of the sealing portion 51; a length L4 represents the width of the sealing portion 52; a length L5 represents the distance between the lower end of the sealing portion 51 and the upper end of the separator 103; a length L6 represents the distance between the upper end of the sealing portion 52 and the lower end of the separator 103; and a length L7 represents the distance between the separator 103 and each of the left and right ends of the exterior body.

Figure 43:
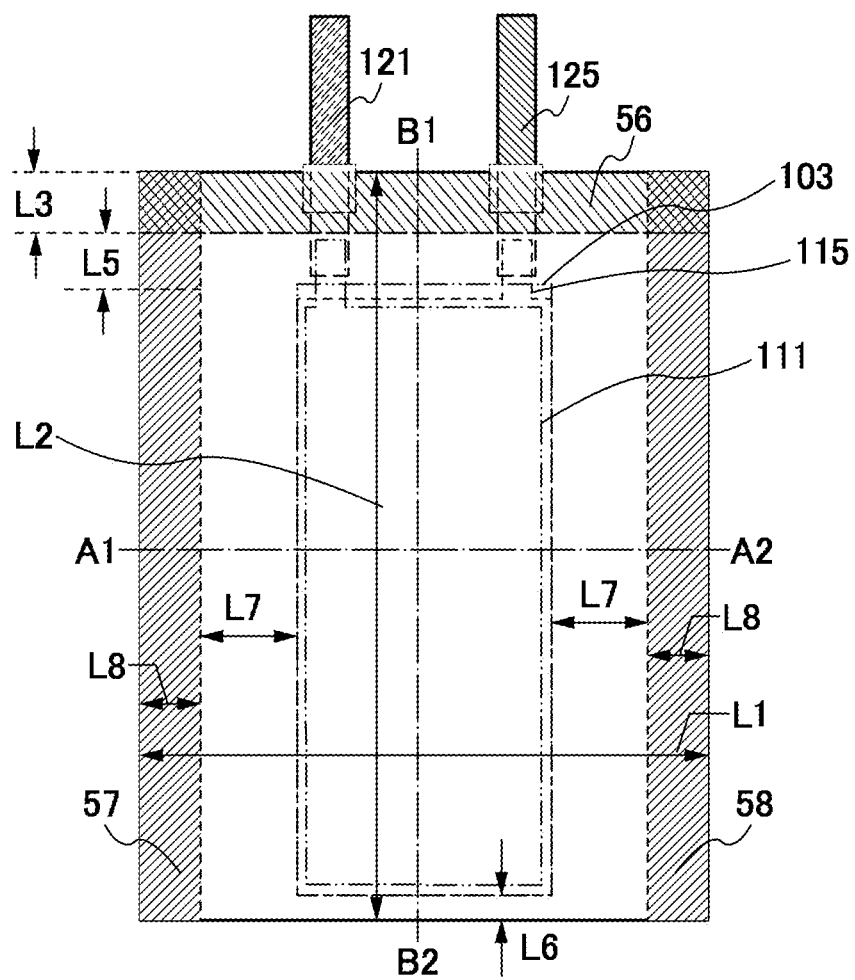
FIG. 43 is a top view of a secondary battery.

FIG. 43 is a top view of the structure illustrated in FIGS. 5A to 5C. For the sake of simplicity of calculation, the distance between the upper end portion of the exterior body and the sealing portion 56, the distance between the left end portion of the exterior body and the sealing portion 57, and the distance between the right end portion of the exterior body and the sealing portion 58 are set to 0. Here in FIG. 43, the length L1 represents the width of the exterior body; the length L2 represents the length of the exterior body; the length L3 represents the width of the scaling portion 56; the length L5 represents the distance between the lower end of the scaling portion 56 and the upper end of the separator 103; the length L6 represents the distance between the lower end of the exterior body and the lower end of the separator 103; and the length L7 represents the distance between the right end of the sealing portion 57 and the left end of the separator 103 and the distance between the left end of the sealing portion 58 and the right end of the separator 103. Note that a length L8 represents the width of each of the sealing portion 57 and the sealing portion 58.

An area S of the positive electrode active material layer 102 of the secondary battery 10 and a capacity C of the secondary battery 10 are calculated using the values shown in Table 1 as the lengths L1 to L8 Here, eight pairs of the positive and negative electrode active material layers facing each other are prepared. The capacity per unit area is 3.5 mAh/cm$^2$. The unit of the lengths L1 to L8 is mm, the unit of the area S is cm$^2$, and the unit of the capacity C is mAh. Here, S and C are calculated under the condition where the lengths L1, L2, L5, and L6 are fixed at 15 mm, 30 mm, 4 mm and 1.0 mm respectively, and the lengths L3 and L4 or the lengths L7 and L8 are changed. Note that the length L3 is larger than the length L4 or L8 by 1 mm.

TABLE 1

|  |  | L1 | L2 | L3 | L4 | L5 | L6 | L7 | L8 | L9 | L10 | S | C |
|---|---|---|---|---|---|---|---|---|---|---|---|---|---|
| FIG. 42 | Condition 1 | 15 | 30 | 3 | 2 | 4 | 1 | 1 | — | 12 | 18 | 2.16 | 60.5 |
|  | Condition 2 | 15 | 30 | 2 | 1 | 4 | 1 | 1 | — | 12 | 20 | 2.39 | 66.9 |
|  | Condition 3 | 15 | 30 | 3 | 2 | 4 | 1 | 1.5 | — | 11 | 18 | 1.98 | 55.4 |
|  | Condition 4 | 15 | 30 | 2 | 1 | 4 | 1 | 1.5 | — | 11 | 20 | 2.2 | 61.6 |
|  | Condition 5 | 15 | 30 | 3 | 2 | 4 | 1 | 2 | — | 10 | 18 | 1.8 | 50.4 |
|  | Condition 6 | 15 | 30 | 2 | 1 | 4 | 1 | 2 | — | 10 | 20 | 2 | 56.0 |
| FIG. 43 | Condition 7 | 15 | 30 | 3 | — | 4 | 1 | 1 | 2 | 8 | 20 | 1.6 | 45.0 |
|  | Condition 8 | 15 | 30 | 2 | — | 4 | 1 | 1 | 1 | 10 | 21 | 2.1 | 59.0 |
|  | Condition 9 | 15 | 30 | 3 | — | 4 | 1 | 1.5 | 2 | 7 | 20 | 1.4 | 39.2 |
|  | Condition 10 | 15 | 30 | 2 | — | 4 | 1 | 1.5 | 1 | 9 | 21 | 1.89 | 52.9 |
|  | Condition 11 | 15 | 30 | 3 | — | 4 | 1 | 2 | 2 | 6 | 20 | 1.2 | 33.6 |
|  | Condition 12 | 15 | 30 | 2 | — | 4 | 1 | 2 | 1 | 8 | 21 | 1.68 | 47.0 |

Here, for example, L7 is set to 1 mm, and L4 or L8 is set to 1 mm, and the capacity of the secondary battery in FIG. 42 and that of the secondary battery in FIG. 43 are compared. In Condition 2 in Table 1 for the secondary battery in FIG. 42, L7 is 1 mm and L4 is 1 mm; thus, the capacity is 66.9 mAh. In Condition 8 in Table 1 for the secondary battery in FIG. 43, L7 is 1 mm and L8 is 1 mm; thus, the capacity is 59.0 mAh. Therefore, the capacity with respect to the area of the secondary battery 10 seen from above can be higher in the case of the structure illustrated in FIG. 42 than in the case of the structure illustrated in FIG. 43.

In embodiment 1, one embodiment of the present invention has been described. Other embodiments of the present invention are described in Embodiments 2 to 6 Note that one embodiment of the present invention is not limited thereto.

In other words, various embodiments of the invention are described in this embodiment and the other embodiments, and one embodiment of the present invention is not limited to a particular embodiment. For example, although an example of use in a secondary battery is described in this embodiment, one embodiment of the present invention is not limited thereto. Depending on circumstances or conditions, one embodiment of the present invention can be applied to a variety of secondary batteries such as a lead storage battery, a lithium-ion secondary battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a zinc air battery, and a lithium air battery, a primary battery; a capacitor such as an electric double layer capacitor, an ultracapacitor, a supercapacitor, and a lithium ion capacitor, and the like. Furthermore, depending on circumstances or conditions, for example, one embodiment of the present invention is not necessarily applied to a secondary battery. Although an example in which one embodiment of the present invention is applied to a curved power storage device, a flexible power storage device, or a power storage device that can be deformed is described, one embodiment of the present invention is not limited thereto. Depending on circumstances or conditions, one embodiment of the present invention may be applied to a power storage device that can have any of a variety of shapes or a power storage device that can have any level of hardness. Depending on circumstances or conditions, one embodiment of the present invention may be applied to a power storage device that is not curved and has a flat plate shape or a power storage device that has a cylindrical shape. Depending on circumstances or conditions, one embodiment of the present invention may be applied to a power storage device that does not have flexibility and cannot be deformed.

Embodiment 2

Materials that can be used for the positive electrode 111, the negative electrode 115, the separator 103, the electrolytic solution 104, and the exterior body 107 of the secondary battery 10 will be described below.

Positive Electrode

The positive electrode 111 includes the positive electrode current collector 101, the positive electrode active material layer 102 formed over the positive electrode current collector 101, and the like.

The positive electrode current collector 101 can be formed using a material that has high conductivity and does not dissolve at the potential of the positive electrode, such as a metal typified by stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, and nickel. The positive electrode current collector 101 can have a foil-like shape, a plate-like shape (sheet-like shape), a net-like shape, a punching-metal shape, an expanded-metal shape, or the like as appropriate. The positive electrode current collector 101 preferably has a thickness greater than or equal to 5 µm and less than or equal to 30 µm. The surface of the positive electrode current collector 101 may be provided with an undercoat layer using graphite or the like.

The positive electrode active material layer 102 may further include a binder for increasing adhesion of positive electrode active materials, a conductive additive for increasing the conductivity of the positive electrode active material layer 102, and the like in addition to the positive electrode active materials.

Examples of positive electrode active materials that can be used for the positive electrode active material layer 102 include a composite oxide with an olivine crystal structure, a composite oxide with a layered rock-salt crystal structure, and a composite oxide with a spinet crystal structure. For example, a compound such as $LiFeO_2$, $LiCoO_2$, $LiNiO_2$, $LiMn_2O_4$, $V_2O_5$, $Cr_2O_5$; or $MnO_2$ can be used.

In particular, $LiCoO_2$ is preferable because it has high capacity, stability in the air higher than that of $LiNiO_2$, and thermal stability higher than that of $LiNiO_2$, for example.

It is preferable to add a small amount of lithium nickel oxide ($LiNiO_2$ or $LiNi_{1-x}M_xO_2$ (M=Co, Al, or the like)) to a lithium-containing material with a spinel crystal structure which contains manganese such as $LiMn_2O_4$ because characteristics of the secondary battery using such a material can be improved.

In addition, a lithium-manganese composite oxide that is represented by the composition formula $Li_aMn_bM_cO_d$ can be used as the positive electrode active material. Here, the element M is preferably silicon, phosphorus, or a metal element other than lithium and manganese, and further preferably nickel. Furthermore, in the case where the whole particle of the lithium-manganese composite oxide is measured, it is preferable to satisfy the following at the time of discharging: $0<a/(b+c)<2$; $c>0$; and $0.26\leq(b+c)/d<0.5$. Note that the composition ratio of the metal, silicon, phosphorus, or the like in the whole particle of the lithium-manganese composite oxide can be measured with an inductively coupled plasma mass spectrometer (ICP-MS) for example. The composition ratio of oxygen in the whole particle of the lithium-manganese composite oxide can be measured with an energy dispersive X-ray spectrometer (EDX), for example, or can be obtained using fusion gas analysis or valence evaluation of X-ray absorption fine structure (XAFS) analysis together with ICP-MS analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

To achieve high capacity, the lithium-manganese composite oxide preferably includes a region where the surface portion and the middle portion are different in the crystal structure, the crystal orientation, or the oxygen content. In order that such a lithium-manganese composite oxide can be obtained, the composition formula is preferably $Li_aMn_bNi_cO_d$ satisfying the following: $1.6\leq a\leq 1.848$; $0.19\leq c/b\leq 0.935$; and $2.5\leq d\leq 3$. For example, it is particularly preferable to, use a lithium-manganese composite oxide represented by the composition formula $Li_{1.68}Mn_{0.8062}Ni_{0.318}O_3$. In this specification and the like, a lithium-manganese composite oxide represented by the composition formula $Li_{1.68}Mn_{0.8062}Ni_{0.318}O_3$ refers to that formed at a ratio (molar ratio) of the amounts of raw materials of $Li_2CO_3$:$MnCO_3$:$NiO$=0.84:0.8062:0.318. Although this lithium-manganese composite oxide is represented by the composition formula $Li_{1.68}Mn_{0.8062}Ni_{0.318}O_3$, the composition might deviate from this.

Figure 22A:
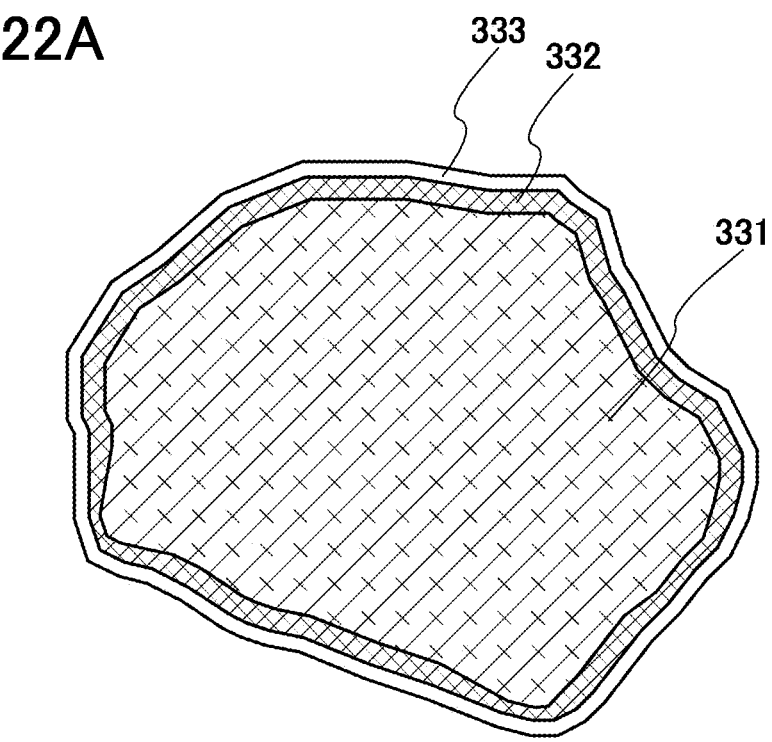
FIGS. 22A and 22B are cross-sectional views illustrating examples of an active material.
Figure 22B:
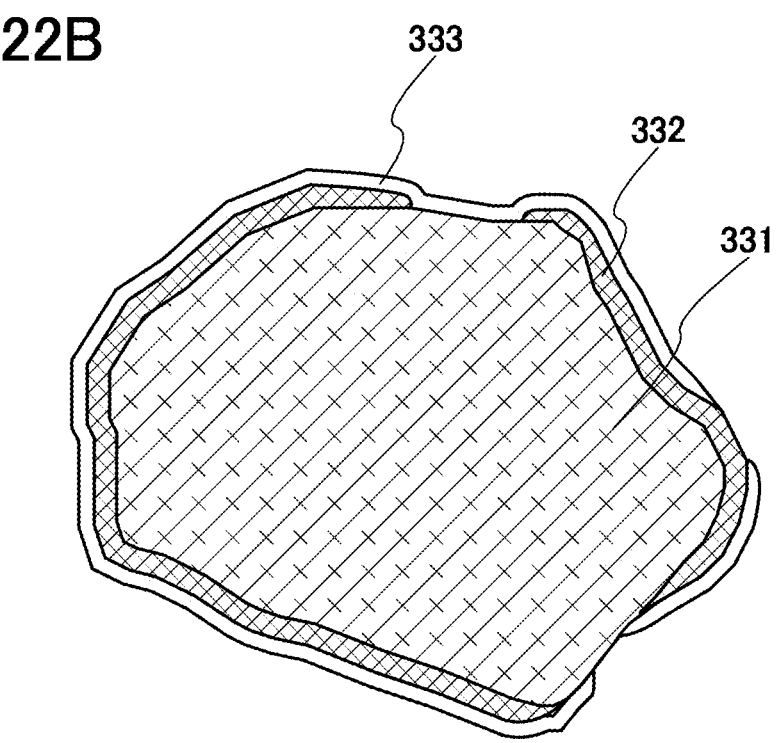

FIGS. 22A and 22B each illustrate an example of a cross section of a particle of the lithium-manganese composite oxide including regions which are different in crystal structure, crystal orientation, or oxygen content.

As illustrated in FIG. 22A, the lithium-manganese composite oxide preferably includes a first region 331, a second region 332, and a third region 333 as the regions which are different in crystal structure, crystal orientation, or oxygen content. The second region 332 is in contact with at least part of the outside of the first region 331. Here, the term "outside" refers to the side closer to a surface of a particle. The third region 333 preferably includes a region corresponding to the surface of the lithium-manganese composite oxide particle.

As shown in FIG. 22B, the first region 331 may include a region not covered with the second region 332. The second region 332 may include a region not covered with the third region 333. For example, the first region 331 may include a region in contact with the third region 333. The first region 331 may include a region covered with neither the second region 332, nor the third region 333.

The composition of the second region 332 is preferably different from that of the first region 331.

For example, the case is described where the composition of the first region 331 and that of the second region 332 are separately measured and the first region 331 and the second region 332 each contain lithium, manganese, the element M, and oxygen; the atomic ratio of lithium to manganese, the element M, and oxygen in the first region 331 is represented by a1:b1:c1:d1; and the atomic ratio of lithium to manganese, the element M, and oxygen in the second region 332 is represented by a2:b2:c2:d2. Note that then composition of each of the first region 331 and the second region 332 can be measured by, for example, energy dispersive X-ray spectroscopy (EDX) using a transmission electron microscope (TEM). In measurement by EDX, the ratio of lithium to the total composition is sometimes difficult to measure. Thus, a difference between the composition of the elements other than lithium in the first region 331 and that in the second region 332 is described below. Here, d1/(b1+c1) is preferably greater than or equal to 2.2, more preferably greater than or equal to 2,3, and still more preferably greater than or equal to 2.35 and less than or equal to 3. Furthermore, d2/(b2+c2) is preferably less than 2.2, more preferably less than 2.1, and still more preferably greater than or equal to 1.1 and less than or equal to 1.9. Also in this case, the composition of the whole particle of the lithium-Manganese composite oxide including, the first region 331 and the second region 332 preferably satisfies $0.26\leq(b+c)/d<0.5$ as described above.

The valence of manganese in the second region 332 may be different from that of manganese in the first region 331.

The valence of the element M in the second region 332 may be different from that of the element M in the first region 331.

Specifically, the first region 331 is preferably a lithium-manganese composite oxide having a layered rock-salt crystal structure. The second region 332 is preferably a lithium-manganese composite oxide having a spinel crystal structure.

Here, in the case where there is a spatial distribution of the composition or the valence of an element in any of the regions, the compositions or the valences in a plurality of portions in the region are obtained, and the average value thereof is calculated to be regarded as the composition of the valence in the region, for example.

A transition layer may be provided between the second region 332 and the first region 331. Here the transition layer is a region where composition is changed continuously or gradually, a region where a crystal structure is changed continuously or gradually, or a region where the lattice constant of a crystal is changed continuously or gradually. A mixed layer may be provided between the second region 332 and the first region 331. The mixed layer is a region in which, for example, two or more crystals having different crystal orientations are mixed, two or more crystals having different crystal structures are mixed, or two or more crystals having different compositions are mixed.

For the third region 333, carbon or a metal compound can be used. Examples of the metal include cobalt, aluminum, nickel, iron, manganese, titanium, zinc, and lithium. The third region 333 may contain an oxide or a fluoride of the metal as an example of the metal compound.

In particular, the third region 333 preferably contains carbon among the above. Since carbon has high conductivity, a particle coated with carbon in an electrode of a storage battery can reduce the resistance of the electrode, for example. When the third region 333 contains carbon, the second region 332 in contact with the third region 333 can be oxidized. The third region 333 may contain graphene, graphene oxide, or graphene oxide subjected to reduction. Graphene and reduced graphene oxide have excellent electrical characteristics of high conductivity and excellent physical properties of high flexibility and high mechanical strength. Moreover, the particle of the lithium-manganese composite oxide can be coated efficiently.

When the third region 333 contains carbon such as graphene, the secondary battery using the lithium-manganese composite oxide for its positive electrode material can have improved cycle characteristics.

The thickness of a layer containing carbon is preferably greater than or equal to 0.4 nm and less than or equal to 40 nm.

Furthermore, the average diameter of primary particles of the lithium-manganese composite oxide is preferably greater than or equal to 5 nm and less than or equal to 50 μm, more preferably greater than or equal to 100 nm and less than or equal to 500 nm, for example. Furthermore, the specific surface area is preferably greater than or equal to 5 m$^2$/g and less than or equal to 15 m$^2$/g. Furthermore, the average diameter of secondary particles is preferably greater than or equal to 5 μm and less than or equal to 50 μm. Note that the average particle diameters can be measured with a particle size distribution analyzer or the like using a laser diffraction and scattering method or by observation with a scanning electron microscope (SEM) or a TEM. The specific surface area can be measured by a gas adsorption method.

Alternatively, a complex material (LiMPO$_4$ (general formula) (M is one or more of Fe(II), Mn(II), Co(II), and Ni(II))) can be used for the positive electrode active material layer 102. Typical examples of the general formula LiMPO$_4$. Include lithium compounds such as LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<1, and 0<i<1).

LiFePO$_4$ is particularly, preferable because it properly has properties necessary for the positive electrode active material, such as safety, stability, high capacity density, and the existence of lithium ions that can be extracted in initial oxidation (charging).

Alternatively, a complex material such as Li$_{(2-j)}$MSiO$_4$ (general formula) (M is one or more, of Fe(II), Mn(II), Co(II), and Ni(II); 0≤j≤2) can be used for the positive electrode active material layer 102. Typical examples of Li$_{(2-j)}$MSiO$_4$ (general formula) include lithium compounds such as Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a NASICON compound represented by a general formula, A$_x$M$_2$(XO$_4$)$_3$ (A=Li, Na, or Mg, M=Fe, Mn, Ti, V, or Nb, and X=S, P, Mo, W, As, or Si), can be used as the positive electrode active material. Examples of the NASICON compound include Fe$_2$(MnO$_4$)$_3$, Fe$_2$(SO$_4$)$_3$, and Li$_3$Fe$_2$(PO$_4$)$_3$. Still further alternatively, a compound represented by a general formula, Li$_2$MPO$_4$F, Li$_2$MP$_2$O$_7$, or Li$_5$MO$_4$ (M=Fe or Mn), perovskite fluoride such as NaFeF$_3$ or FeF$_3$, a metal chalcogenide (a sulfide, a selenide, or a telluride) such as TiS$_2$ or MoS$_2$, an oxide with an inverse spinel crystal structure such as LiMVO$_4$, a vanadium oxide (e.g., V$_2$O$_5$, V$_6$O$_{13}$, or LiV$_3$O$_8$), a manganese oxide, or an organic sulfur compound can be used as the positive electrode active material, for example.

In the case where carrier ions are alkali metal ions other than lithium ions or alkaline-earth metal ions, the positive electrode active material may contain, instead of lithium, an alkali metal (e.g., sodium or potassium) or an alkaline-earth metal (e.g., calcium, strontium, barium, beryllium, or magnesium). For example the positive electrode active material may be a layered oxide containing sodium such as NaFeO$_2$ or Na$_{2/3}$[Fe$_{1/2}$Mn$_{1/2}$]O$_2$.

Further alternatively, any of the aforementioned materials may be combined to be used as the positive electrode active material. For example, a solid solution obtained by combining two or more of the above materials can be used as the positive electrode active material. For example, a solid solution of LiCo$_{1/3}$Mn$_{1/3}$Ni$_{1/3}$O$_2$ and Li$_2$MnO$_3$ can be used as the positive electrode active material.

Note that although not shown, a conductive material such as a carbon layer may be provided on a surface of the positive electrode active material layer 102. With the conductive material such as the carbon layer, the conductivity of the electrode can be increased. For example, the positive electrode active material layer 102 can be coated with the carbon mixing a carbohydrate such as glucose at the time of baking the positive electrode active material.

The average particle diameter of the primary particle of the positive electrode active material layer 102 is preferably greater than or equal to 50 nm and less than or equal to 100 μm.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, more preferably greater than or equal to 1 wt % and less than or equal to 5 wt %.

A network for electrical conduction can be formed in the electrode by the conductive additive. The conductive additive also allows maintaining of a path for electric conduction between the particles of the positive electrode active material. The addition of the conductive additive to the active material layer increases the electrical conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. Thus, the use of graphene as the conductive additive can increase contact points and the contact area of active materials.

Note that graphene in this specification includes single-layer graphene and multilayer graphene including two to hundred layers. Single-layer graphene refers to a one-atom-thick sheet of carbon molecules having $\pi$ bonds. Graphene oxide refers to a compound formed by oxidation of such graphene. When graphene oxide is reduced to form graphene, oxygen contained in the graphene oxide is not entirely released and part of the oxygen remains in the graphene. In the case where graphene contains oxygen, the proportion of oxygen in the graphene measured by XPS is higher than or equal to 2 atomic % and lower than or equal to 11 atomic %, preferably higher than or equal to 3 atomic % and lower than or equal to 10 atomic %.

Graphene is capable of making low-resistance surface contact and has extremely high conductivity even with a small thickness. Therefore, even a small amount of graphene can efficiently form a conductive path in an active material layer.

In the case where an active material with a small average particle diameter (e.g., 1 μm or less) is used, the specific surface area of the active material is large and thus more conductive paths for the active material particles are needed. In such a case, it is particularly preferred that graphene with extremely high conductivity that can efficiently form a conductive path even in a small amount be used.

A cross-sectional structure example of a positive electrode active material layer containing graphene as a conductive additive is described below. Note that a negative electrode active material layer may contain graphene as a conductive additive.

Figure 46:
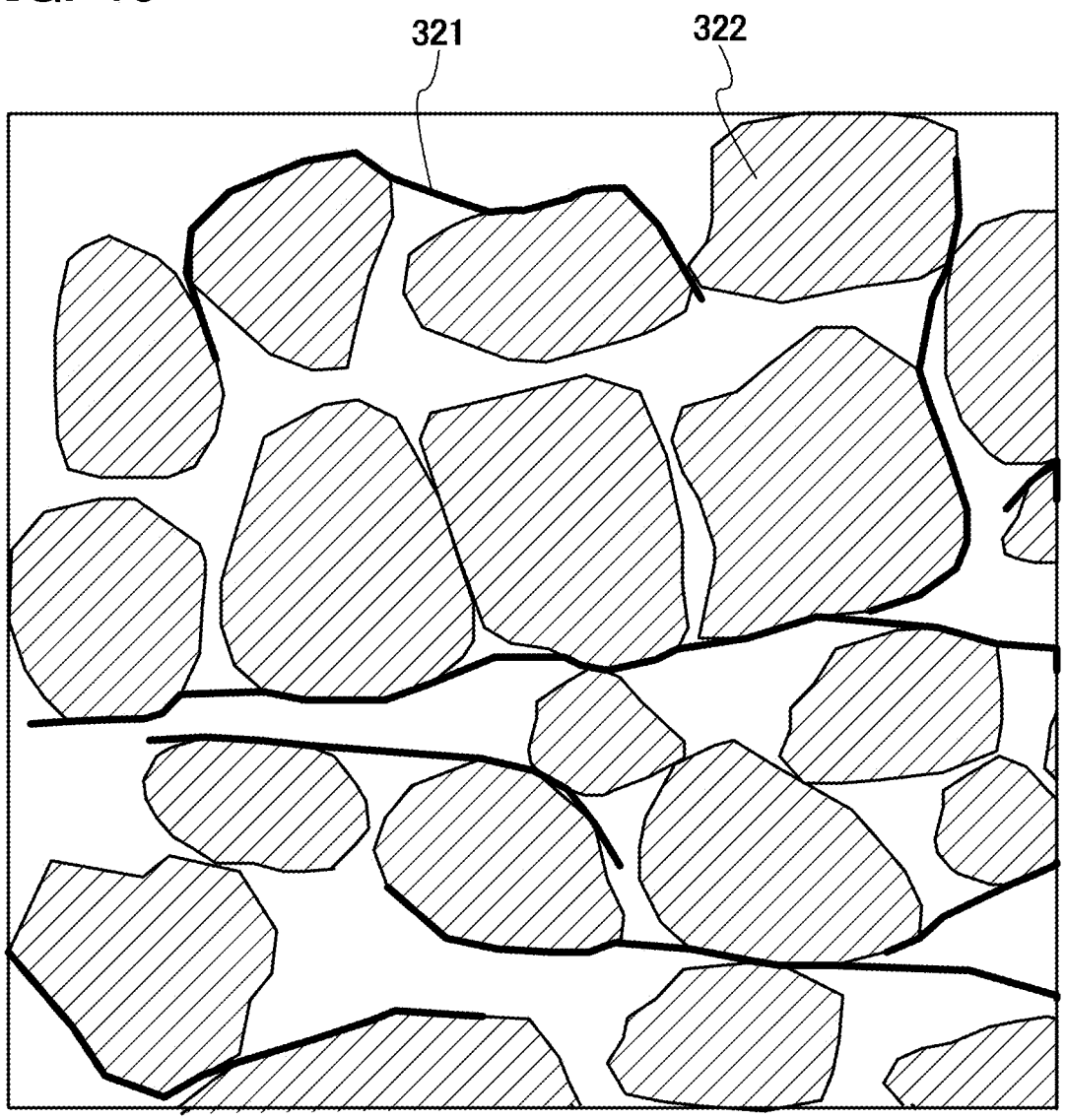
FIG. 46 is a cross-sectional view of a positive electrode active material layer.

FIG. 46 is a longitudinal sectional view of the positive electrode active material layer 102. Here, the longitudinal section refers to a section substantially perpendicular to a surface. The positive electrode active material layer 102 includes positive electrode active material particles 322, graphene flakes 321 as a conductive additive, and a binder (not illustrated).

The longitudinal section of the positive electrode active material layer 102 in FIG. 46 shows substantially uniform dispersion of the graphene flakes 321 in the positive electrode active material layer 102. The graphene flakes 321 are schematically shown by thick lines in FIG. 46 but are actually thin films each having a thickness corresponding to the thickness of a single layer or a multi-layer of carbon molecules. The plurality of graphene flakes 321 are formed in such away as to wrap, coat, or adhere to the surfaces of the plurality of positive electrode active material particles 322, so that the graphene flakes 321 make surface contact with the positive electrode active material particles 322. Furthermore, the graphene flakes 321 are also in surface contact with each other; consequently, the plurality of graphene flakes 321 form a three-dimensional network for electric conduction.

This is because graphene oxide with extremely high dispersibility in a polar solvent is used for the formation of the graphene flakes 321. The solvent is removed by volatilization front a dispersion medium in which graphene oxide is uniformly dispersed, and the graphene oxide is reduced to graphene, hence, the graphene flakes 321 remaining in the positive electrode active material layer 102 partly overlap with each other and are dispersed such that surface contact is made, thereby forming an electrical conduction path. Then, graphene oxide is reduced by heat treatment or with the use of a reducing agent, for example.

Unlike a conventional conductive additive in die form of particles, such as acetylene black, which makes point contact with an active material, the graphene flake 321 is capable of making low-resistance surface contact, accordingly, the electrical conduction between the positive electrode active material particles 322 and the graphene flakes 321 can be improved without an increase in the amount of a conductive additive. Thus, the proportion of the positive electrode active material particles 322 in the positive electrode active material layer 102 can be increased. Accordingly, the discharge capacity of a power storage device can be increased.

Graphene flakes are bonded to each other to form net-like graphene (hereinafter referred to as a graphene net). The graphene net covering the active material can function as a binder for binding particles. The amount of a binder can thus be reduced, or the binder does not have to be used. This can increase the proportion of the active material in the electrode volume or weight. That is to say, the capacity of the power storage device can be increased.

Various methods can be used for forming an electrode which is used for the secondary battery of one embodiment of the present invention. For example, in the case where an active material layer is formed over a current collector by a coating method, the active material, the binder, the conductive additive, and the dispersion medium (also referred to as solvent) are mixed to form a paste, the paste is applied to the current collector, and the dispersion medium is vaporized. Here, the conductive additive is not necessarily used for forming the electrode. After that, the active material layer may be pressed by a compression method such as a roll press method or a flat plate press method so as to be consolidated if necessary.

As the dispersion medium, water, polar organic solvent such as N-methylpyrrolidone (NMP) or dimethylformamide, or the like can be used. Water is preferably used in terms of the safety and cost.

It is preferable for the binder to include, for example, water-soluble polymers. As the water-soluble polymers, a polysaccharide or the like can be used. As the polysaccharide, a cellulose derivative such as carboxymethyl cellulose (CMC), methyl cellulose, ethyl cellulose, hydroxy propyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, fluorine rubber, or ethylene-propylene-diene copolymer is preferably used. Any of these rubber materials is more preferably used in combination with the aforementioned water-soluble polymers.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVdP), polyacrylonitrile (PAN), polyvinyl chloride, ethylene-propylene-diene polymer, polyvinyl acetate, polymethyl methacrylate, or nitrocellulose is preferably used.

Two or more of the above materials may be used in combination for the binder.

The content of the binder in the positive electrode active material layer 102 is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the positive electrode active material layer 102 is preferably greater than or equal to 1 wt % and less than or equal to 10 wt %, more preferably greater than or equal to 1 wt % and less than or equal to 5 wt %.

In the case where the positive electrode active material layer 102 is formed by a coating method, the positive electrode active material, the binder, and the conductive additive are mixed to form a positive electrode paste (slurry), and the positive electrode paste is applied to the positive electrode current collector 101 and dried.

Negative Electrode

The negative electrode 115 includes, for example, the negative electrode current collector 105 and the negative electrode active material layer 106 formed over the negative electrode current collector 105.

The negative electrode current collector 105 can be formed using a material that has high conductivity and is not alloyed with a carrier ion of lithium or the like, such as stainless steel, gold, platinum, iron, copper, titanium, or an alloy thereof. Alternatively, an aluminum alloy to which an element which improves heat resistance, such as silicon, titanium, neodymium, scandium, or molybdenum, is added can be used. The negative electrode current collector 105 can have a foil-like shape, a plate-like shape (sheet-like shape), a net-like shape, a punching-metal shape, an expanded-metal shape, or the like as appropriate. The negative electrode current collector 105 preferably has a thickness greater than or equal to 5 μm and less than or equal to 30 μm. The surface of the negative electrode current collector 105 may be provided with an undercoat layer using graphite or the like.

The negative electrode active material layer 106 may further include a binder for increasing adhesion of negative electrode active materials, a conductive additive for increasing the conductivity of the negative electrode active material layer 106, and the like in addition to the negative electrode active materials. For the materials of the binder and the conductive additive which are used for the negative electrode active material layer, the materials of the binder and the conductive additive which are used for the positive electrode active material layer are referred to.

A material with which lithium can be dissolved and precipitated or a material which can reversibly react with lithium ions can be used for a negative electrode active material; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

As the negative electrode active material, other than the above carbon materials, an alloy-based material which enables charge-discharge reaction by an alloying reaction and a dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, etc. can be used as the alloy-based material. Such elements have higher capacity than carbon. In particular, silicon has a significantly high theoretical capacity of 4200 mAh/g. For this reason, silicon is preferably used for the negative electrode active material. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, an oxide such as SiO, SnO, $SnO_2$, titanium dioxide ($TiO_2$), lithium titanium oxide ($Li_4Ti_5O_{12}$), niobium pentoxide ($Nb_2O_5$), tungsten oxide ($WO_2$), or molybdenum oxide ($MoO_2$) can be used. Further alternatively, as the negative electrode active material, lithium-graphite intercalation compound ($Li_xC_6$) can be used.

Note that SiO refers to the powder of a silicon oxide including a silicon-rich portion and can also be referred to as $SiO_y$, (2>y>0). Examples of SiO include a material containing one or more of $Si_2O_3$, $Si_3O_4$, and $Si_2O$ and a mixture of S1 powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystalline silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and SiO is oxidized because of repeated charge and discharge cycles, SiO is changed into $SiO_2$ in some cases.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode, active material by extracting the lithium ions contained in the positive electrode active material in advance.

Alternatively, a material which causes a conversion reaction can be used for the negative electrode active material. For example, a transition metal oxide with, which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

In the case where the negative electrode active material layer 106 is formed by a coating method, the negative electrode active material and the binder are mixed to form a negative electrode paste (slurry), and tire, negative electrode paste is applied to the negative electrode current collector 105 and dried.

Graphene may be formed on a surface of the negative electrode active material layer 106. In the case of using silicon as the negative electrode active material, the volume of silicon is greatly changed due to occlusion and release of carrier ions in charge-discharge cycles. Therefore, adhesion between the negative electrode current collector 105 and the negative electrode active material layer 106 is decreased, resulting in degradation of battery characteristics caused by charge and discharge. Thus, graphene is preferably formed on a surface of the negative electrode active material layer 106 containing silicon because even when the volume of silicon is changed in charge-discharge cycles, decrease in the adhesion between the negative electrode current collector 105 and the negative electrode active material layer 106 can be inhibited, which makes it possible to reduce degradation of battery characteristics.

Alternatively, a coating film of an oxide or the like may be formed on the surface of the negative electrode active material layer 106. A coating film formed by decomposition or the like of an electrolytic solution or the like in charging cannot release electric charges used at the formation, and therefore forms irreversible capacity. In contrast, the film of an oxide or the like provided on the surface of the negative electrode active material layer 106 in advance can reduce or prevent generation of irreversible capacity.

As the coating film coating the negative electrode active material layer 106, an oxide film of any one of niobium, titanium, vanadium, tantalum, tungsten, zirconium, molybdenum, hafnium, chromium, aluminum, and silicon or an oxide film containing any one of these elements and lithium can be used. Such a film is much denser than a conventional film formed on a surface of a negative electrode due to a decomposition product of an electrolytic solution.

For example, niobium oxide ($Nb_2O_5$) has a low electric conductivity of $10^{-9}$ S/cm and a high insulating property. For this reason, a niobium oxide film inhibits an electrochemical decomposition reaction between the negative electrode active material and the electrolytic solution. On the other hand, niobium oxide has a lithium diffusion coefficient of $10^{-9}$ cm$^2$/sec and high lithium ion conductivity. Therefore, niobium oxide can transmit lithium ions. Alternatively, silicon oxide or aluminum oxide may be used.

A sol-gel method can be used to, coat the negative electrode active material layer 106 with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 106. A decrease in the capacity of the secondary battery can be prevented by using the coating film.

Separator

As a material for the separator 103, a porous insulator such as cellulose, polypropylene (PP), poly ethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

Electrolytic Solution

As a solvent for the electrolytic solution 104 used in the secondary battery 10, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent of the electrolytic solution, safety against liquid leakage and the like is improved. Further, the secondary battery can be thinner and more lightweight. Typical examples of the gelled high-molecular material include a silicone gel, an acrylic gel, an acrylonitrile-based gel, a polyethylene oxide-based gel, a polypropylene oxide-based gel, and a fluorine-based polymer gel.

Alternatively, the use of one or more kinds of ionic liquids (room temperature molten salts) that have non-flammability and non-volatility as the solvent for the electrolytic solution can prevent the secondary battery from exploding or catching fire even when the secondary battery internally shorts out or the internal temperature increases due to overcharging or the like.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more a these lithium salts can be used in an appropriate combination in an appropriate ratio.

The electrolytic solution used for the secondary battery is preferably a highly purified one so as to contain a negligible amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%. An additive agent such as vinylene carbonate may be added to the electrolytic solution.

Exterior Body

The secondary battery can have any of a variety of structures, and a sheet-like member is used for the exterior body 107 in this embodiment. For example, a film is used for the exterior body 107. Note that the film used for the exterior body 107 is a single-layer film selected from a metal film (e.g., an aluminum film, a stainless steel film, and a nickel steel film), a plastic film made of an organic material, a hybrid material film including an organic material (e.g., an organic resin or fiber) and an inorganic material (e.g., ceramic), and a carbon-containing inorganic film (e.g., a carbon film or a graphite film); or a stacked-layer film including two or more of the above films.

As the exterior body 107, for example, one metal sheet or a film whose both surfaces are covered with a resin layer may be used. For example, a film having a three-layer structure can be used. In the three-layer structure, a highly flexible metal thin film of, for example, aluminum, stainless steel, copper, or nickel is provided over a film formed of a material such as polyethylene, polypropylene, polycarbonate, ionomer, or polyamide, and an insulating synthetic resin film of, for example, a polyamide-based resin or a polyester-based resin is provided as the outer surface of the exterior body over the metal thin film.

Forming depressions or projections on a surface of a metal film by embossing increases the surface area of the exterior body 107 exposed to outside air, achieving efficient heat dissipations.

In the case where the secondary battery 10 is changed in form by externally applying force, bending stress is externally applied to the exterior body 107 of the secondary battery 10. This might partly deform or damage the exterior body 107. Depressions or projections formed on the exterior body 107 can relieve a strain caused by stress applied to the exterior body 107. Thus, the secondary battery 10 can be highly reliable. Note that a "strain" is the scale of change in form indicating the displacement of a point of an object relative to the reference (initial) length of the object. The depressions or projections formed on the surface of the exterior body 107 can reduce the influence of a strain caused by application of external force to the secondary battery to an acceptable level. Thus, a highly reliable secondary battery can be provided.

Embodiment 3

A battery management unit (BMU) that can be used in combination with secondary batteries each including the materials described in the above embodiment and transistors that are suitable for a circuit included in the battery management unit will be described with reference to FIG. 23, FIGS. 24A to 24C, FIG. 25, FIG. 26, FIGS. 27A to 76C, FIG. 28, and FIG. 29. In this embodiment, in particular, a battery management unit of a power storage device including battery cells connected in series will be described.

When the plurality of battery cells connected in series are repeatedly charged and discharged, there occur variations in charge and discharge characteristics among the battery cells, which causes variations in capacity (output voltage) among the battery cells. The discharge capacity of the plurality of battery cells connected in series depends on the capacity of the battery cell that is low. The variations in capacity among the battery cells reduce the discharge capacity of all the battery cells. Furthermore, when charge is performed based on the capacity of the battery cell that is low, the battery cells might be undercharged. In contrast, when charge is performed based on the capacity of the battery cell that is high, the battery cells might be overcharged.

Thus, the battery management unit of the power storage device including the battery cells connected in series has a function of reducing variations in capacity among the battery cells, which cause an undercharge and an overcharge. Examples of a circuit configuration for reducing variations in capacity among battery cells include a resistive type, a capacitive type, and an inductive type, and a circuit configuration that can reduce variations in capacity among battery cells using transistors with a low off-state current will be explained here as an example.

A transistor including an oxide semiconductor in its channel formation region (an OS transistor) is preferably used as the transistor with a low off-state current. When an OS transistor with a low off-state current is used in the circuit of the battery management unit of the power storage device, the amount of charge that leaks from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the ease where the atomic ratio of the metal elements of a target for forming an oxide semiconductor film is $In:M:Zn=x_1:y_1:z_1$, $x_1/y_1$ is preferably greater than or equal to ⅓ and less than or equal to 6, more preferably greater than or equal to 1 and less than or equal to 6, and $z_1/y_1$ is preferably greater than or equal to ⅓ and less than or equal to 6, more preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film will be described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal pans can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in the direction substantially parallel to the sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-OS film, and is arranged parallel to the formation surface or the top surface of the CAAC-OS film.

On the other hand, according to the plan high-resolution TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts.

For example, when the structure of a CAC-OS film including an $InGaZnO_4$ crystal is analyzed by an out-of-plane method using an X-ray diffraction (XRD) apparatus, a peak may appear at a diffraction angle ($2\theta$) of around 31°. This peak is derived from the (009) plane of the $InGaZnO_4$ crystal, which indicates that crystals in the CAAC-OS film have c-axis alignment, and that the c-axes are aligned in the direction substantially perpendicular to the formation surface or the top surface of the CAAC-OS film.

Note that in analysis of the CAAC-OS film with an $InGaZnO_4$ crystal by an out-of-plane method, another peak may appear when $2\theta$ is around 36°, in addition to the peak at $2\theta$ of around 31°. The peak of $2\theta$ at around 36° indicates that a crystal having no c-axis alignment is included in part of the CAAC-OS. It is preferable that in the CAAC-OS film, a peak appear when $2\theta$ is around 31° and that a peak not appear when $2\theta$ is around 36°.

The CAAC-OS film is an oxide semiconductor film with low impurity concentration. The impurity is an element other than the main components of the oxide semiconductor film, such as hydrogen, carbon, silicon, or a transition metal element. In particular, an element (specifically, silicon or the like) having higher strength of bonding to oxygen than a metal element included in an oxide semiconductor film extracts oxygen from the oxide semiconductor film, which results in disorder of the atomic arrangement and reduced crystallinity of the oxide semiconductor film. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein, for example.

The state in which impurity concentration is low and density of defect states is low (the number of oxygen vacancies is small) is referred to as a. "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Charge trapped by the carrier traps in the oxide semiconductor film takes a long time to be released, and might behave like fixed charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a S1 transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the power storage device.

Figure 23:
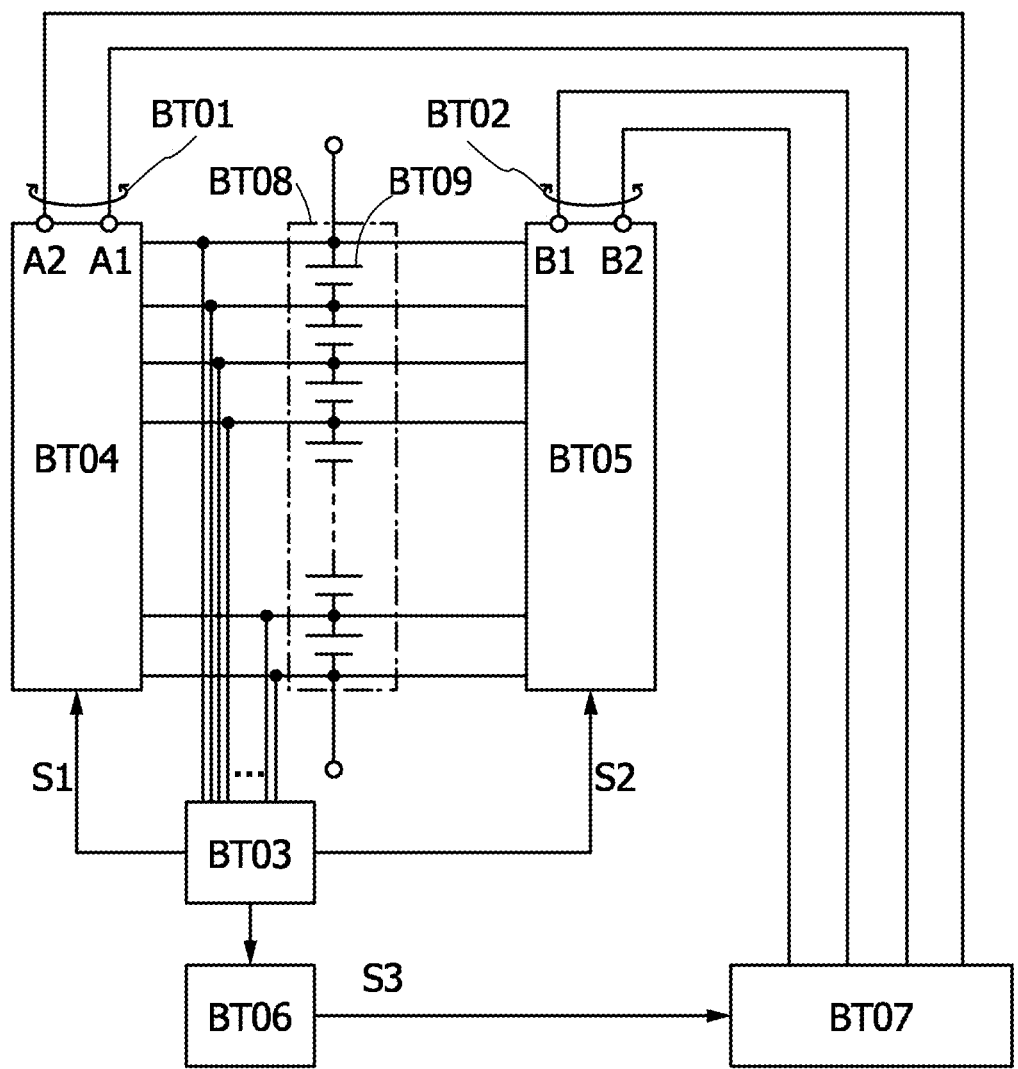
FIG. 23 is a block diagram illustrating a battery management unit of a power storage device.

FIG. 23 is an example of a block diagram of the power storage device. A power storage device BT00 illustrated in FIG. 23 includes a terminal pair BT01, a terminal pair. BT02, a switching control circuit BT03, a switching circuit BT04, a switching circuit BT05, a voltage transformation control circuit BT06, a voltage transformer circuit BT07, and a battery portion. BT08 including a plurality of battery cells BT09 connected in series.

In the power storage device BT00 illustrated in FIG. 23, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of the connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

The operations of the switching control circuit BT03 will be described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that the battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of the battery cell BT09 having the highest voltage or the lowest voltage among the plurality of battery cells BT09. In this case, the switching control circuit BT03 can determine whether each battery cell BT09 is a high-voltage cell or a low-voltage cell by, for example, determining whether or not the ratio of the voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control, circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series, as the charge battery cell group. In addition, the switching control circuit BT03 may preferentially select the battery cells BT09 which are almost overcharged or overdischarged as the discharge battery cell group or the charge battery cell group.

Figure 24A:
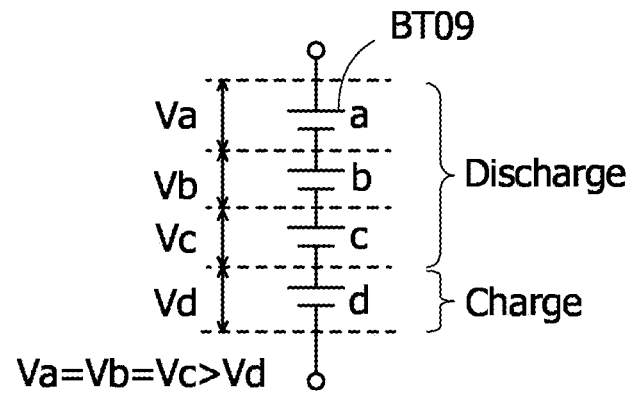
FIGS. 24A to 24C are conceptual diagrams each illustrating a battery management unit of a power storage device.
Figure 24B:
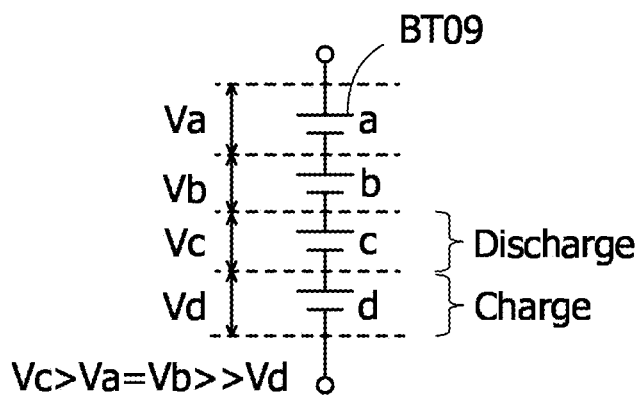
Figure 24C:
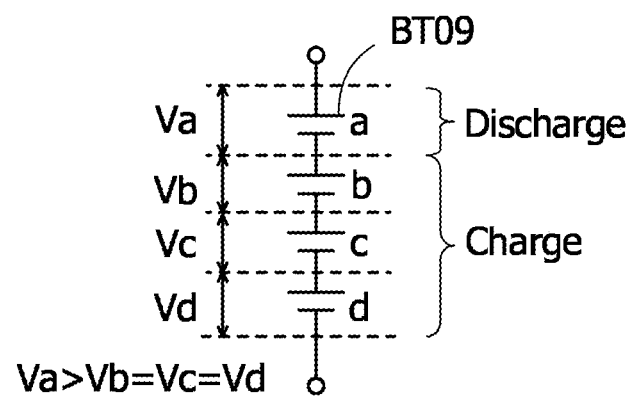

Here, operation examples of the switching control circuit BT03 in this embodiment will be described with reference to FIGS. 24A to 24C. FIGS. 24A to 24C illustrate the operation examples of the switching control circuit BT03. Note that FIGS. 24A to 24C each illustrate the case where four battery cells BT09 are connected in series as an example for convenience of explanation.

FIG. 24A shows the case where the relation of voltages Va, Vb, Vc, and Vd is Va=Vb=Vc>Vd where the voltages Va, Vb, Vc, and Vd are the voltages of a batter) cell a, a battery cell b, a battery cell c, and a battery cell d, respectively. That is, a series of three high-voltage cells a to c and one low-voltage cell d are connected in series. In this case, the switching control circuit BT03 selects the series of three high-voltage cells a to c as the discharge battery cell group. In addition, the switching control circuit BT03 selects the low-voltage cell d as the charge battery cell group.

Next, FIG. 248 shows the case where the relation of the voltages is Vc>Va=Vb>>Vd. That is, a series of two low-voltage cells a and b, one high-voltage cell c, and one low-voltage cell d which is almost overdischarged are connected in series in this case, the switching control circuit BT03 selects the high-voltage cell c as the discharge battery cell group. Since the low-voltage cell d is almost overdischarged, the switching control circuit BT03 preferentially selects the low-voltage cell d as the charge battery cell group instead of the series of two low-voltage cells a and b.

Lastly, FIG. 24C shows the case where the relation of the voltages is Va>Vb=Vc=Vd. That is, one high-voltage, cell a and a series of three low-voltage cells b to d are connected in series. In this case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 24A to 24C, the switching control circuit BT03 outputs the control signal S1 and the control signal S2 to the switching circuit BT04 and the switching circuit BT05, respectively. Information showing the discharge battery cell group, which is the connection destination of the switching circuit BT04, is set in the control signal S1. Information showing the charge battery cell group, which is the connection destination of the switching circuit BT05, is set in the control signal S2.

The above, is the detailed description of the operations of the switching control, circuit BT03.

The switching circuit BT04 sets the discharge battery cell group selected by the switching control circuit BT03 as the connection destination of the terminal pair BT01 in response to the control signal S1 output from the switching control circuit BT03.

The terminal pair BT01 includes a pair of terminals A1 and A2. The switching circuit BT04 connects one of the pair of terminals A1 and A2 to a positive electrode terminal of the battery cell BT09 positioned on the most upstream side (on the high potential side) of the discharge battery cell group, and the other, to a negative electrode terminal of the battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the charge battery cell group selected by the switching control circuit BT03 as the connection destination of the terminal pair BT02 in response to the control signal S2 output from the switching control circuit BT03.

The terminal pair BT02 includes a pair of terminals B1 and B2. The switching circuit BT05 connects one of the pair of terminals B1 and B2 to a positive electrode terminal of the battery cell BT09 positioned on the most upstream side (on the high potential side) of the charge battery cell group, and the other to a negative electrode terminal of the battery cell BT09 positioned on the most downstream side (on the low potential side) of the charge battery cell group. Note that the switching circuit BT05 can recognize the position of the charge battery cell group on the basis of the information set in the control signal S2.

Figure 25:
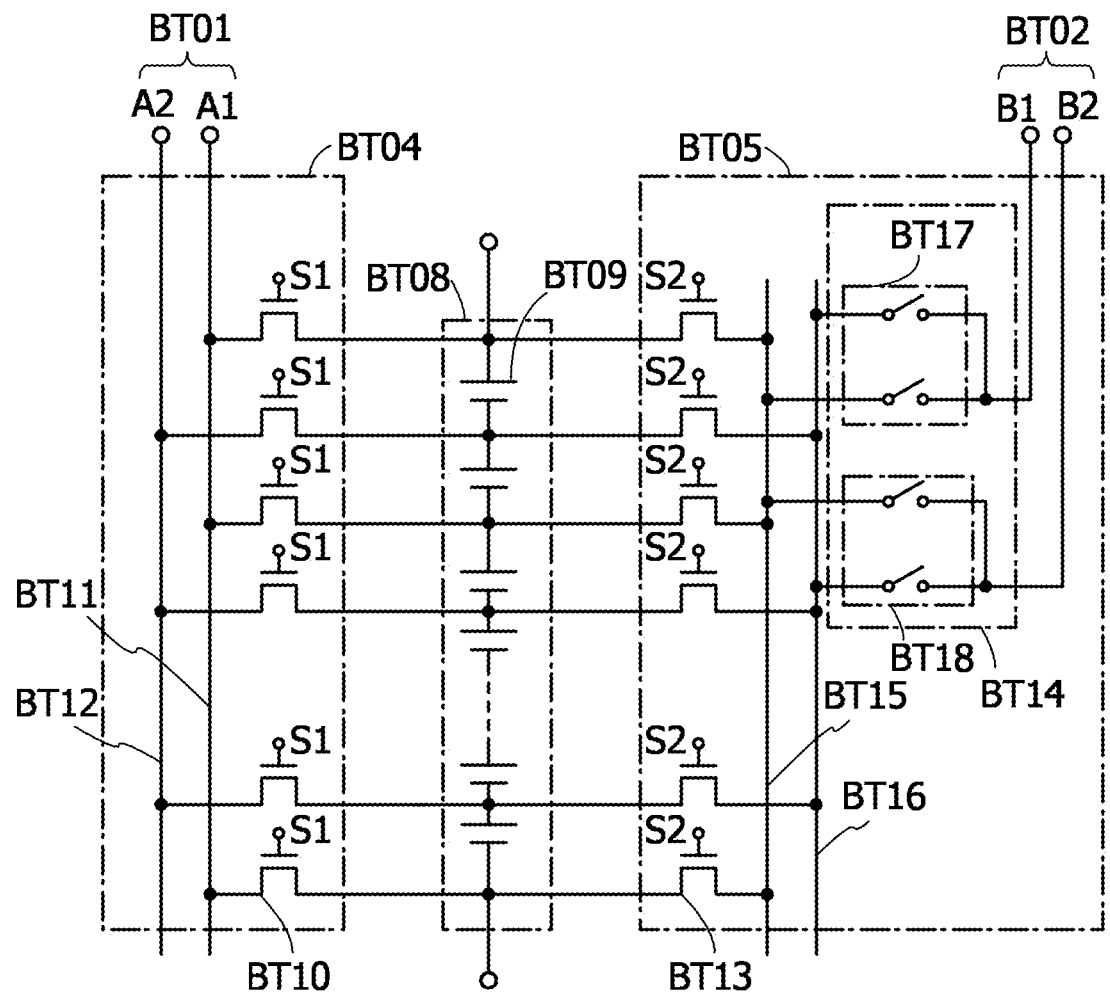
FIG. 25 is a circuit diagram illustrating a battery management unit of a power storage device.
Figure 26:
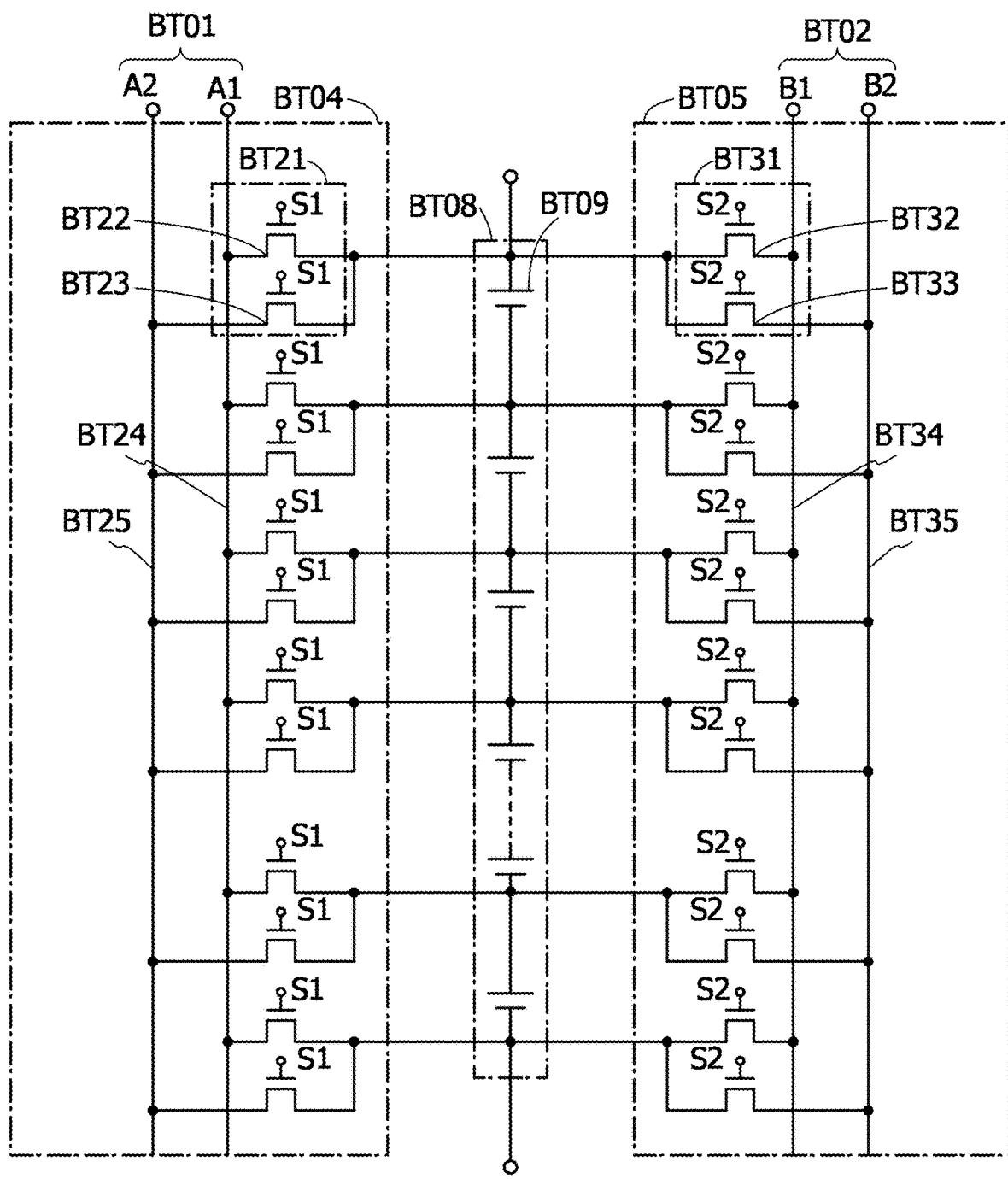
FIG. 26 is a circuit diagram illustrating, a battery management unit of a power storage device.

FIG. 25 and FIG. 26 are circuit diagrams showing configuration examples of the switching circuits BT04 and BT05.

In FIG. 25, the switching circuit BT04 includes a plurality of transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. The sources or drains which are not connected to the bus BT11 or the bus BT12 of the plurality of transistors BT10 are each connected between two adjacent battery cells BT09.

The source or drain of the transistor BT10 which is not connected to the bus BT12 on the most upstream side of the plurality of transistors BT10 is connected to the positive electrode terminal of the battery cell BT09 on the most upstream side of the battery portion BT08. The source or drain of the transistor BT10 which is not connected to the bus BT12 of the transistor BT10 on the most downstream side of the plurality of transistors BT10 is connected to the negative electrode terminal of the battery cell BT09 on the most downstream side of the battery portion BT08.

The switching circuit BT04 connects the discharge battery cell group to the terminal pair BT01 by bringing one of the plurality of transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

An OS transistor is preferably used as the transistor BT10. Since the oil-state current of the OS transistor is low, the amount of charge that leaks from the battery cell which does not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when the output voltage of the discharge battery cell group is high.

In FIG. 25, the switching circuit BT05 includes a plurality of transistors BT13, a current control switch BT14, a bus BT15, and a bus BT16. The bus BT15 and the bus BT16 are provided between the plurality of transistor BT13 and the current control switch BT14. Sources or drains of the plurality of transistors BT13 are connected alternately to the bus BT15 and the bus BT16. Sources or drains which are not connected to the bus BT15 or the bus BT16 of the plurality of transistors BT13 are each connected between two adjacent battery cells BT09.

The source or drain of the transistor BT13 which is not connected to the bus BT16 on the most upstream side of the plurality of transistors BT13 is connected to the positive electrode terminal of the battery cell BT09 on the most upstream side, of the battery portion BT08. The source or drain of the transistor BT13 which is not connected to the bus BT16 on the most downstream side of the plurality of transistors BT13 is connected to the negative electrode terminal of the battery cell BT09 on the most downstream side of the battery portion BT08.

An OS transistor is preferably used as the transistors BT13 like the transistors. BT10. Since the off-state current of the OS transistor is to the amount of charge that leaks from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch. BT14 includes a switch pair BT17 and a switch pair BT18. Terminals on one end of the switch pair BT17 are connected to the terminal B1. Terminals on the other end of the switch pair BT17 extend from two switches. One switch is connected to the bus BT15, and the other switch is connected to the bus BT16. Terminals on one end of the switch pair BT18 are connected to the terminal B2. Terminals on the other end of the switch pair BT18 extend from two switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of the battery cell BT09 on the most upstream side of the charge battery cell group into an on state in response to the control signal S2 supplied to gates of the plurality of transistors BT13. In addition, the switching circuit BT05 brings a transistor BT13 connected to the negative electrode terminal of the battery cell BT09 on the most downstream side of the charge battery cell group into an on state in response to the control signal S2 supplied to the gates of the plurality of transistors BT13.

The polarities of voltages applied to the terminal pair BT02 can vary in accordance with the configurations of the voltage transformer circuit BT07 and the discharge battery cell group connected to the terminal pair BT01. In order to supply a current in the direction for charging the charge battery cell group, terminals with the same polarity of the terminal pair BT02 and the charge battery cell group are required to be connected to each other. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode will be described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14. In that case, the polarities of the voltages applied to the terminal pair BT02 are controlled by controlling the polarities of the voltages applied to the terminal pair BT01 in response to the operation of the current control switch BT14 and the control signal S1. Thus, the current control switch BT14 controls the direction of current which flows to the charge battery cell group from the terminal pair BT02.

FIG. 26 is a circuit diagram illustrating configuration examples of the switching circuit BT04 and the switching circuit BT05 which are different from those of FIG. 25.

In FIG. 26, the switching circuit BT04 includes a plurality of transistor pairs BT21, a bus BT24, and a bus BT25. The bus BT24 is connected to the terminal A1. The bus BT25 is connected to the terminal A2. Terminals on one end of each of the plurality of transistor pairs BT21 extend from a transistor BT22 and a transistor BT23. Sources or drains of the transistors BT22 are connected to the bus BT24. Sources or drains of the transistors BT23 are connected to the bus BT25. In addition, terminals on the other end of each of the plurality of transistor pairs BT21 are connected between two adjacent battery cells BT09. The terminals on the other end of the transistor pair BT21 on the most upstream side of the plurality of transistor pairs BT21 are connected to the positive electrode terminal of the battery cell BT09 on the most upstream side of the battery portion BT08. The terminals on the other end of the transistor pair BT21 on the most downstream side of the plurality of transistor pairs BT21 are connected to a negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34 and a bus BT35. The bus BT34 is connected to the terminal B1. The bus BT35 is connected to the terminal B2. Terminals on one end of each of the plurality of transistor pairs BT31 extend from a transistor BT32 and a transistor BT33. The terminal cm one end extending from the transistor BT32 is connected to the bus BT34. The terminal on one end extending from the transistor BT33 is connected to the bus BT35. Terminals on the other end of each of the plurality of transistor pairs BT31 are connected between two adjacent battery cells BT09. The terminal on the other end of the transistor pair BT31 on the most upstream side of the plurality of transistor pairs BT31 is connected to the positive electrode terminal of the battery cell BT09 on the most upstream side of the battery portion BT08. The terminal on the other end of the transistor pair BT31 on the most downstream side of, the plurality of transistor pairs BT31 is connected to the negative electrode terminal of the battery cell BT09 on the most downstream side of the battery portion BT08.

The switching circuit BT05 switches the connection destination, of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 the terminal B2. Which of the transistors BT32 and BT33 is turned on is determined by the control signal S2.

Two transistor pairs BT31 are used to connect the terminal pair BT02 and the charge battery cell group. Specifically the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations, of the two transistor pairs BT31 are determined by the polarities of the voltages applied to the terminal pair BT02. Specifically, in the case where voltages which make the terminal B a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned, on and the transistor BT33 is turned off. In this manner, terminals with the same polarity of the terminal pair BT02 and the charge battery cell group are connected to each other. In addition, the current which flows from the terminal pair BT02 is controlled to be supplied in the direction for charging the charge battery cell group.

The voltage transformation control circuit BT06 controls the operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a charging voltage necessary for charging the charge battery cell group needs to be ensured. Therefore, the voltage transformation control circuit BT06 outputs the voltage transformation signal S3 for controlling the voltage transformer circuit BT07 so Unit the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 27A:
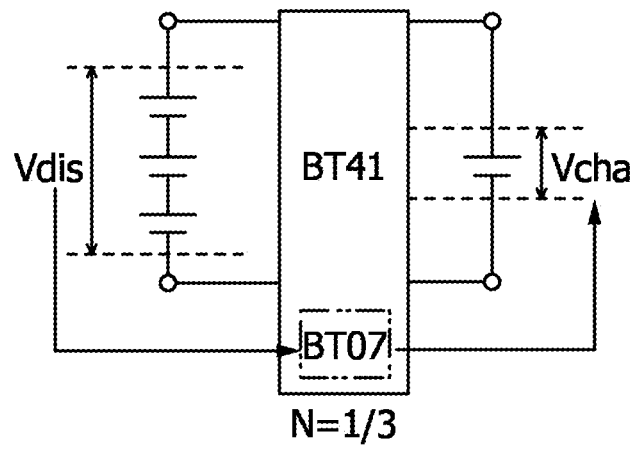
FIGS. 27A to 27C are conceptual diagrams each illustrating a battery management unit of a power storage device.
Figure 27B:
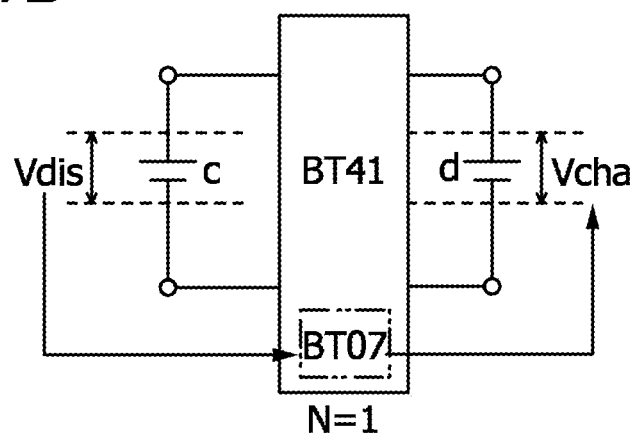
Figure 27C:
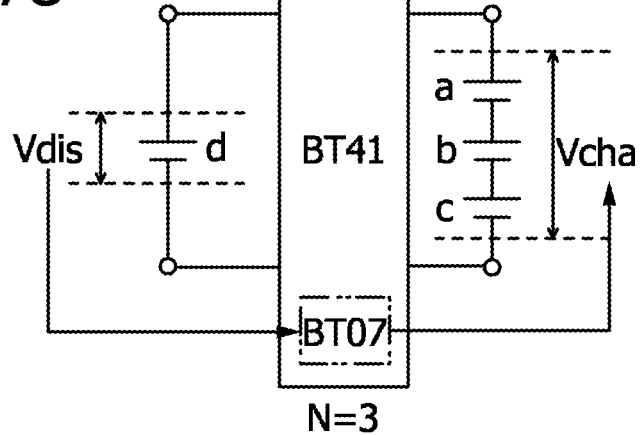

Here, operation examples of the voltage transformation control circuit BT06 in this embodiment will be described with reference to FIGS. 27A to 27C. FIGS. 27A to 27C are conceptual diagrams for explaining the operation examples of the voltage transformation control circuit BT06 corresponding to the discharge battery cell group and the charge battery cell group described in FIGS. 24A to 24C. FIGS. 27A to 27C each illustrate a battery management unit BT41. As described above, the battery management unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In the example illustrated in FIG. 27A, the series of three high-voltage cells a to c and one low voltage cell d are connected in series as in FIG. 24A. In that case, as described using FIG. 24A, the switching control circuit BT03 selects the high-voltage cells a to c as the discharge battery cell group, and selects the low-voltage cell d as the charge battery cell group. The voltage transformation control circuit BT06 calculates a conversion ratio N for converting the discharging voltage (Vdis) to the charging voltage (Vcha) on the basis of the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, an overvoltage may be applied to the battery cells BT09 included in the charge battery cell group through the terminal pair BT02. Thus, in the case of FIG. 27A, it is necessary that, a charging voltage (Vcha) applied to the terminal pair BT02 be lower than the discharging voltage. In addition, in order to charge the charge battery cell group, it is necessary that, the charging voltage be higher than the total voltage of the battery cells BT09 included in the charge battery cell group. Thus, the transformation control circuit BT06 sets the conversion, ratio N larger than the ratio of the number of the battery cells BT09 included in the charge battery cell group to the number of the battery cells BT09 included in the discharge battery cell group.

Thus, the voltage transformation control circuit BT06 preferably sets the conversion ratio N larger than the ratio of the number of the battery cells BT09 included in the charge battery cell group to the number of the battery cells BT09 included in the discharge battery cell group by about 1% to 10%. Here, the charging, voltage is made higher than the voltage of the charge battery cell group, but the charging voltage is equal to the voltage of the charge battery cell group in reality. Note that the voltage transformation control circuit BT06 feeds a current for charging, the charge battery cell group in accordance with the conversion ratio N in order to make the voltage of the charge battery cell group equal to the charging voltage. The value of the current is set by the voltage transformation control circuit BT06.

In the example illustrated in FIG. 27A, since the number of the battery cells BT09 included in the discharge battery cell group is three and the number of the battery cells BT09 included in the charge battery cell group is one, the voltage transformation control circuit BT06 calculates a value which is slightly larger than ⅓ as the conversion ratio N. Then, the voltage transformation control circuit BT06 outputs the voltage transformation signal S3, which lowers the discharging voltage in accordance with the conversion ratio N and converts the voltage into a charging voltage, to the voltage transformer circuit BT07. The transformer circuit BT07 applies the charging voltage which is transformed in response to the transformation signal S3 to the terminal pair BT02. Then, the battery cells BT09 included in the charge battery cell group are charged with the charging voltage applied to the terminal pair BT02.

In each of examples illustrated in FIGS. 27B and 27C, the conversion ratio N calculated in a manner similar to that of FIG. 27A. In each of the examples illustrated in FIGS. 27B and 27C, since the number of the battery cells BT09 included in the discharge battery cell group is less than or equal to the number of the battery cells BT09 included in the charge battery cell group, the conversion ratio N is or more. Therefore, in this case, the voltage transformation control, circuit BT06 outputs the voltage transformation signal S3 for raising the discharging voltage and converting the voltage into the charging voltage.

The Voltage transformer circuit BT07 converts the discharging voltage applied to the terminal pair BT01 into a charging voltage in response to the voltage transformation signal S3. The voltage transformer circuit BT07 applies the charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage. Which is the total voltage of the discharge battery cell group, into the charging voltage in response to the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC convener as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 28:
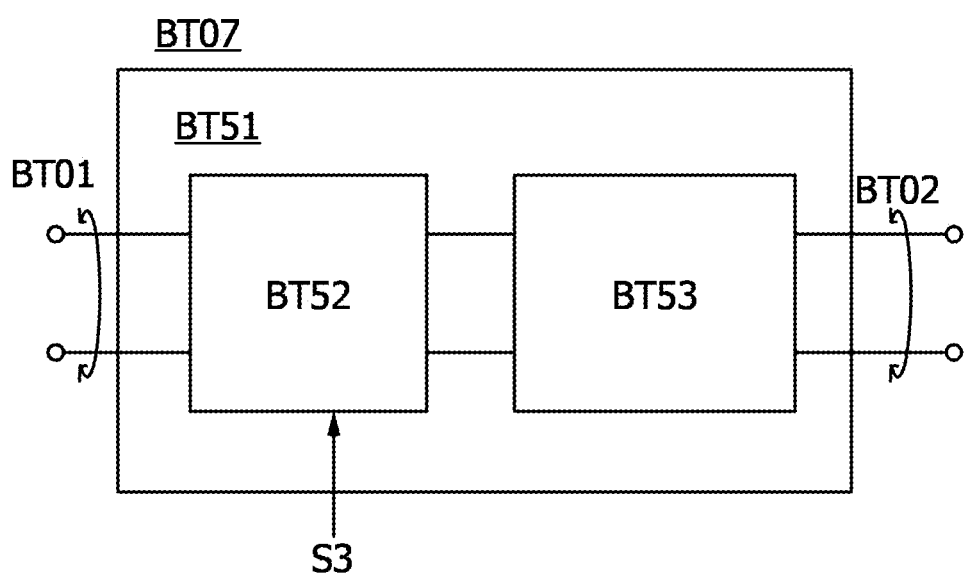
FIG. 28 is a block diagram illustrating a battery management unit of a power storage device.

The configuration of the voltage transformer circuit BT07 including the insulated DC-DC converter is illustrated in FIG. 28. An insulated DC-DC converter BT51 includes a switch, portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in response to the voltage transformation signal S3 for controlling the on/off ratio which is output from the voltage transformation control circuit BT06. The switch portion BT52 can have any of various structures in accordance with the type of insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC convener is used, the terminal pair BT01 and the terminal pair BT02 can be insulated from each other inside the transformer BT53.

Figure 29:
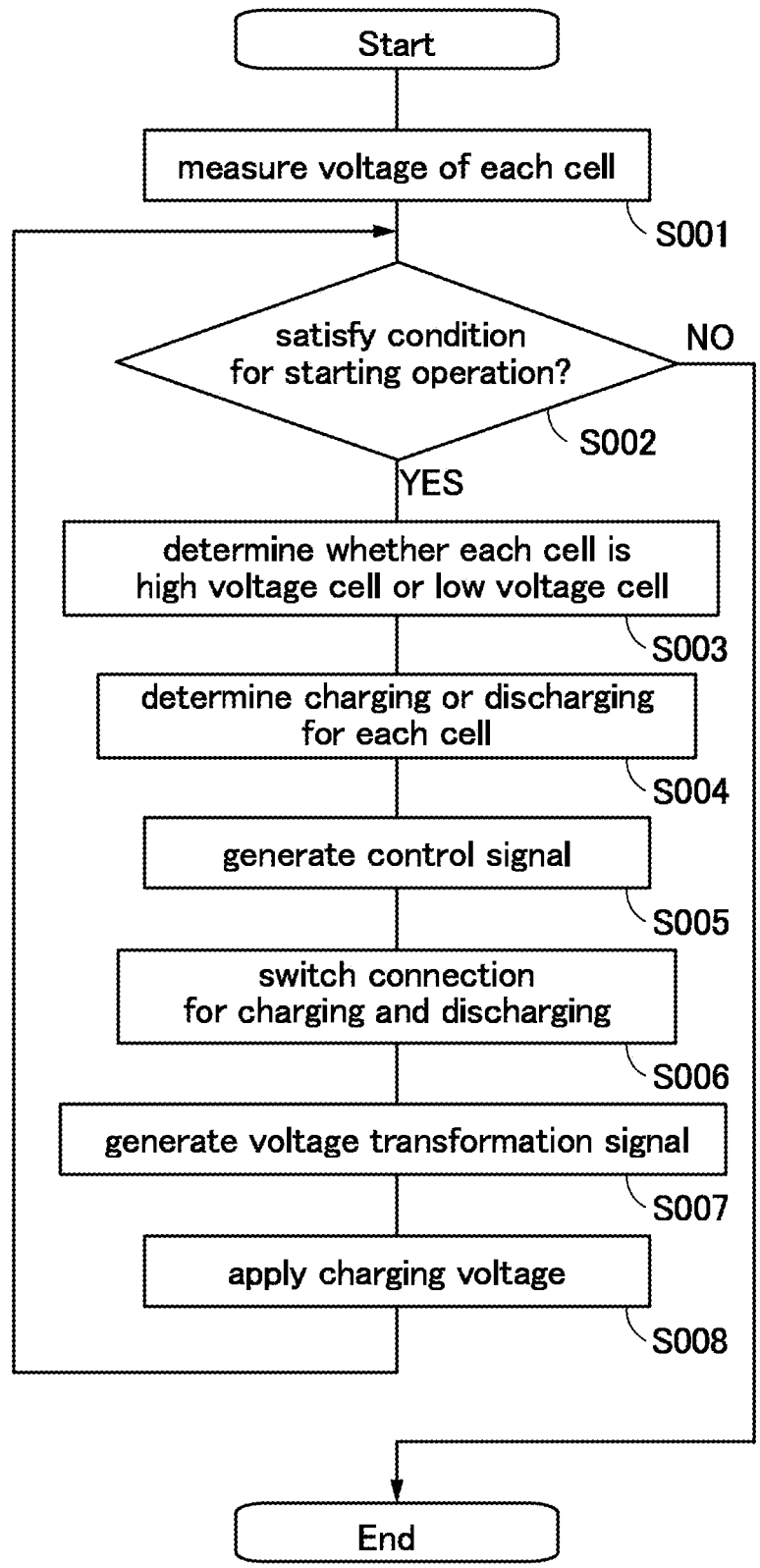
FIG. 29 is a flow chart illustrating a battery management unit of a power storage device.

A flow of operations of the power storage device BT00 in this embodiment will be described with reference to FIG. 29. FIG. 29 is a flow chart showing the flow of the operations of the power storage device BT00.

First, the power storage device BT00 obtains a voltage measured for each of the plurality of battery cells BT09 (step S001). Then, the power storage device BT00 determines whether or not the condition for starting the operation of reducing variations in voltage of the plurality of battery cells BT09 is satisfied (step S002). An example of the condition can be that the difference between the maximum value and the minimum value of the voltage measured for each of the plurality of battery cells BT09 is higher than or equal to the predetermined threshold value. In the case where the condition is not satisfied (step S002: NO), the power storage device BT00 does not perform the following operation because voltages of the battery cells BT09 are well balanced. In contrast, in the case where the condition is satisfied (step S002: YES), the power storage device BT00 performs the operation of reducing variations in the voltage of the battery cells BT09. In this operation, the power storage device BT00 determines whether each battery cell BT09 is a high voltage cell or a low voltage cell on the basis of the measured voltage of each cell (step S003). Then, the power storage device BT00 determines a discharge battery cell group and a charge battery, cell group on the basis of the determination result (step S004). In addition, the power storage device BT00 generates the control signal S1 for setting the connection destination of the terminal pair BT01 to the determined discharge battery cell group, and the control signal S2 for setting the connection destination of the terminal pair BT02 to the determined charge battery cell group (step S005). The power storage device BT00 outputs, the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S006). The power storage device BT00 generates the voltage transformation signal S3 based on the number of the battery cells BT09 included in the discharge battery cell group and the number of the battery cells BT09 included in the charge battery cell group (step S007). Then, the power storage device BT00 converts, in response to the voltage transformation signal S3, the discharging voltage applied to the terminal pair BT01 into a charging voltage and applies the charging voltage to the terminal pair BT02 (step S008). In this way, charge of the discharge battery cell group is transferred to the charge battery cell group.

Although the plurality of steps are shown in order in the flow chart of FIG. 29, the order of performing the steps is not limited to the order.

With this embodiment, unlike in a capacitive type circuit, a structure for temporarily storing an electric charge from the discharge battery cell group and then sending the stored electric charge to the charge battery cell, group is unnecessary to transfer an electric charge from the discharge battery cell group to the charge battery cell group. Accordingly, the charge transfer efficiency per unit time can be increased. In addition, the switching circuit BT04 and the switching circuit BT08 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, charge can be transferred without any problems regardless of how the battery cells BT09 are selected as the discharge battery cell group and the charge battery cell group.

Furthermore, the use of OS transistors as the transistor BT10 and the transistor BT13 can reduce the amount of charge that leaks from the battery cells BT09 not belonging to the charge battery cell group or the discharge battery cell group. Accordingly, a decrease in capacity of the battery cells BT09 which do not contribute to charging or discharging can be suppressed. In addition, the variations in characteristics of the OS transistor due to heat are smaller than those of an Si transistor. Accordingly, even when the temperature of the battery cells BT09 is increased, an operation such as turning on or off the transistors in response to the control signals S1 and S2 can be performed normally.

Embodiment 4

In this embodiment, an example of an electronic device including the secondary battery described in Embodiment 1 will be described.

Figure 30:
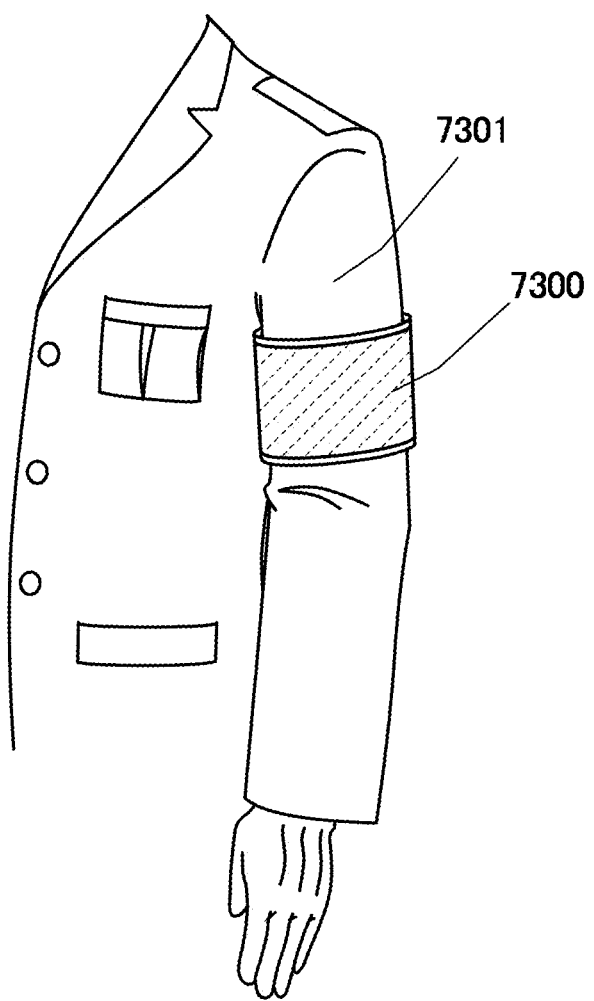
FIG. 30 illustrates an example of an electronic device.

FIG. 30 illustrates an example of an armband electronic device including a flexible secondary battery. An armband device 7300 illustrated in FIG. 30 can be worn on an arm 7301 and includes a display portion having a curved surface and a bendable secondary battery.

Note that in the display portion, a display element, a display device which is a device including a display element, a light-emitting element, and a light-emitting device which is a device including a light-emitting element can employ a variety of modes or can include a variety of elements. The display element, the display device, the light-emitting element, or the light-emitting device includes at least one of an electroluminescent (EL) element (e.g., an EL element including organic and inorganic materials, an organic EL element, or an inorganic EL element), an LED (e g, a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical systems (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electro wetting element, a piezoelectric ceramic display, a display element including a carbon nanotube, and the like. In addition to that, the display element, the display device, the light-emitting element, or the light-emitting device may include a display medium whose contrast, luminance, reflectivity, transmittance, or the like is changed by electrical or magnetic effect. Examples of a display device having an EL element include an EL display. Display devices having electron emitters include a field emission display (FED), an SED-type flat panel display (SED: surface-conduction electron-emitter display), and the like. Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples further include a display device including electronic ink, Electronic Liquid Powder (registered trademark), or an electrophoretic element, such as electronic paper. In the case of a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multi-layer film in which a plurality of layers are stacked. When graphene or graphite is provided in this manner, a nitride semiconductor, for example, an n-type GaN semiconductor layer including crystals can be easily formed thereover. Furthermore, a p-type GaN semiconductor layer including crystals or the like can be provided thereover, and thus the LED can be formed. Note that an AlN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

The armband device 7300 preferably further includes one or more functional elements. An example of a functional element is a sensor. As the sensor, a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. The armband device 7300 may include a functional element such as a touch panel, an antenna, a power generation element, or a speaker.

For example, when a user wears the armband device 7300 on his or her arm and makes its display emit light at nighttime, traffic safety can be ensured. For another example, when a soldier, a security guard, or the like wears the armband device 7300 on an upper arm, he or she can check a chiefs command, which is received in real time and displayed on its display portion, while creeping. It is difficult for a soldier ear a security guard to use a wireless device, a mobile phone, or a head mounted device because he or she wears a helmet and has weapons or tools with hands in executing his or her duties. Thus, it is useful that a soldier or a security guard can wear it on his or her upper arm and operate it by, for example, voice input to an audio input portion such as a microphone even when his or her hands are full.

The armband device 7300 can also be effectively used in the field of sports. For example, it is difficult for a marathoner to check the time on his or her watch without stopping swinging; his or her arms. Stopping swinging his or her arms might disturb his or her rhythm, obstructing his or her run. However, wearing the armband device 7300 on his or her upper arm enables him or her to check the time without stopping swinging, of his or her arm. Furthermore, it can, display other information (e.g., his or her position in a course or his or her health condition) on its display screen. It is more useful that it further has a function that allows an athlete to operate it by voice input or the like without using his or her hands, seek it from his or her coach by a communication function, and listen the directions output by voice output from an audio output portion such as a speaker or view the instructions displayed on its display screen.

For another example, when a construction crew or the like who wears a helmet wears the armband device 7300 and operates it, he or she can exchange information by communication to easily obtain the positional information of other crews so that he or she can work safely.

FIGS. 31A to 31D illustrate examples of other electronic devices including flexible secondary batteries. Examples of electronic devices each including a flexible secondary battery include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of a car.

FIG. 31A illustrates an example of a mobile phone. A cellular phone 7400 includes a display portion 7402 incorporated in a housing 7401, operation buttons 7403, an external, connection port 7404, a speaker 7405, a microphone 7406, and the like. Note that the mobile phone 7400 includes a secondary battery 7407.

FIG. 31B illustrates the mobile phone 7400 that is bent. When the whole mobile phone 7400 is bent by the external force, the secondary battery 7407 included in the mobile phone 7400 is also bent.

FIG. 31C illustrates an example of a bangle display device. A portable display device 7100 includes a housing 7101, a display portion 7102, operation buttons 7103, and a secondary battery 7104. When the display device is worn on a user's arm while the secondary battery 7104 is bent, the housing changes its shape and the curvature of part or the whole of the secondary battery 7104 is changed. Note that the radius of curvature of a curve at a point refers to the radius of the circular arc that best approximates the curve at that point. The reciprocal of the radius of curvature is curvature. Specifically, part or the whole of the housing or the main surface of the secondary battery 7104 is changed in the range, of radius of curvature from 40 mm to 150 mm. When the radius of curvature at the main surface of the secondary battery 7104 is 40 mm to 150 mm, the reliability can be kept high.

The secondary battery described in the above embodiment is used as the secondary battery 7104; thus, even in the case where the secondary battery 7104 is change in form when the portable display device 7100 is worn or removed, stress applied to the secondary battery 7104 does not concentrate on a positive electrode tab or a negative electrode tab. Thus, it is possible to reduce the possibility that a crack or a fracture is generated in the positive electrode tab and the negative electrode tab even when the portable display device 7100 is worn and removed repeatedly. Accordingly, the portable display device 7100 can be highly reliable.

Note that between first and second portions for generating an electromotive force in the secondary battery described in the above embodiment, a third portion including lead electrodes is provided. Such a secondary battery is used as the secondary battery 7104; thus, lead electrodes of the secondary battery 7104 can be close to the display portion 7102. Therefore, the secondary battery 7104 can be provided without extension or addition of a wiring.

A flexible secondary battery can be provided with high space efficiency in any of a variety of electronic devices. For example, in a stove 7500 illustrated in FIG. 31D, a module 7511 is attached to a main body 7512. The module 7511 includes the secondary battery 7501, a motor, a fan, an air outlet 7511a, and a thermoelectric generation device. In the stove 7500, after a fuel is injected through an opening 7512a and ignited, outside air can be sent through the air outlet 7511a to the inside of the stove 7500 by rotating the motor and the fan which are included in the module 7511 using power of the secondary battery 7501. In this manner, the stove 7500 can have strong heating power because outside air can be taken into, the inside, of the stove 7500 efficiently. In addition, cooking can be performed on an upper grill 7513 with thermal energy generated by the combustion of fuel. The thermal energy is converted into power with the thermoelectric generation device of the module 7511, and the secondary battery 7501 is charged with the power. The power charged into the secondary battery 7501 can be output through an external terminal 7511b.

This embodiment can be implemented in appropriate combination with any of the other embodiments and example.

Embodiment 5

In this embodiment, other examples of electronic devices that can include the secondary battery described in Embodiment 1 will be described.

Figure 32A:
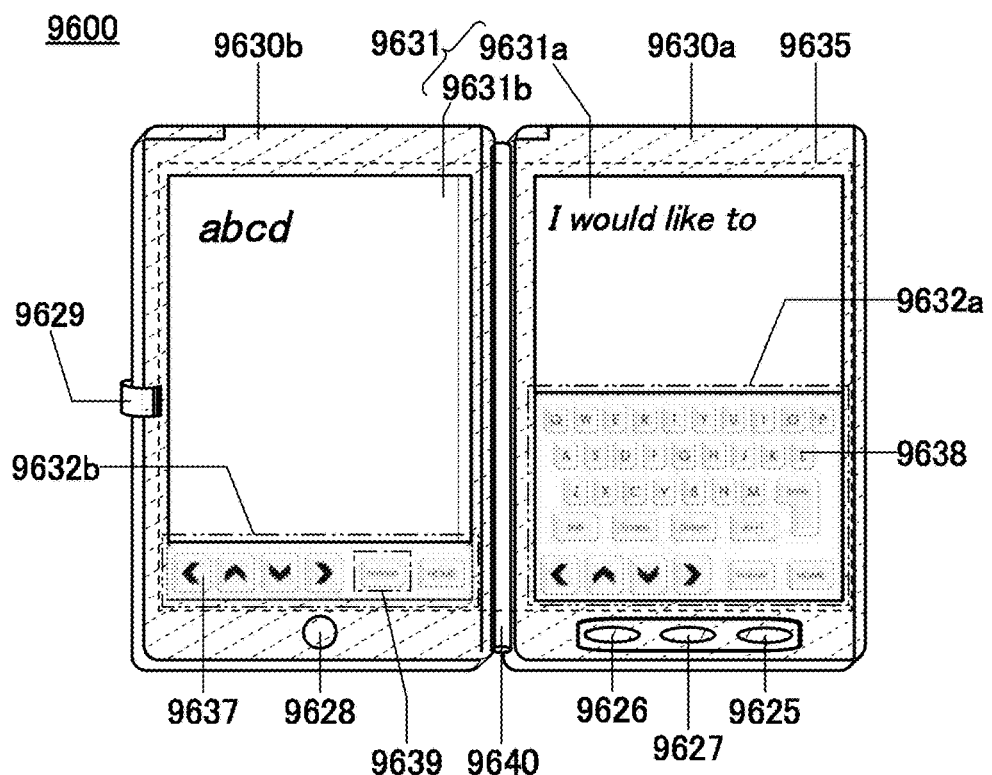
FIGS. 32A to 32C illustrate an example of an electronic device.
Figure 32B:
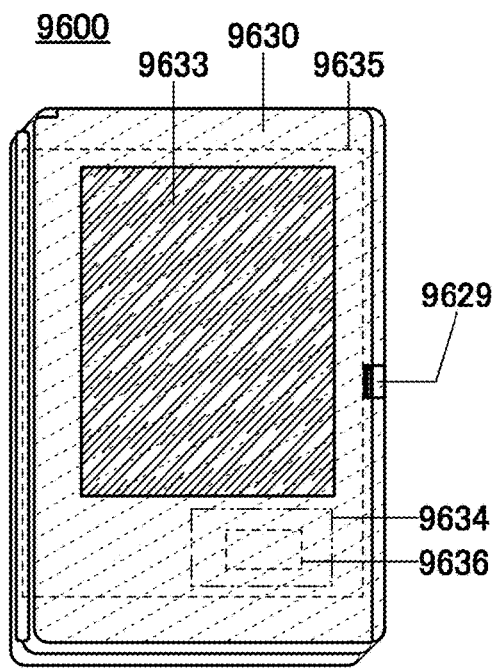

FIGS. 32A and 32B illustrate an example of a tablet terminal that can be folded in half. A tablet terminal 9600 illustrated in FIGS. 32A and 32B includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628 FIG. 32A illustrates the tablet terminal 9600 that is opened, and FIG. 32B illustrates the tablet terminal 9600 that is closed.

The tablet terminal 9600 includes a secondary battery 9635 inside the housings 9630a and 9630b. The secondary battery 9635 is provided across the housings 9630a and 9630b, passing through the movable portion 9640.

Part of the display portion 9631a can be a touch panel region 9632a, and data can be input by touching operation keys 9638 that are displayed. Note that FIG. 32A shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display a keyboard and serve as a touch panel while the display portion 9631b can be used as a display screen.

As in the display portion 9631a, part of the display portion. 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same area in FIG. 32A, one embodiment of the present invention is not limited to this example. The display portion 9631a and the display portion 9631b may have different areas or different display quality. For example, one of the display portions 9631a and 9631b may display higher definition images than the other.

The tablet terminal is closed in FIG. 32B. The tablet terminal includes the housing 9630, a solar cell 9633, and a charge and discharge control circuit 9634 including a DC-DC converter 9636. The secondary battery of one embodiment of the present invention is used as the secondary battery 9635.

The tablet terminal 9600 can be folded such that the housings 9630a and 9630b overlap with each other when not in use. Thus, the display portions 9631a and 9631b can be protected, which increases the durability of the tablet terminal 9600. In addition, the secondary battery 9635 of one embodiment of the present invention has flexibility and can be repeatedly bent without a large decrease in charge and discharge capacity. Thus, a highly reliable tablet terminal can be provided.

The tablet terminal illustrated in FIGS. 32A and 32B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the secondary battery 9635 can be charged efficiently. The use of the secondary batters of one embodiment of the present invention as the secondary battery 9635 can inhibit decrease in discharge capacity caused by repeated charge and discharge, thus, a tablet terminal that can be used over a long period of time can be provided.

Figure 32C:
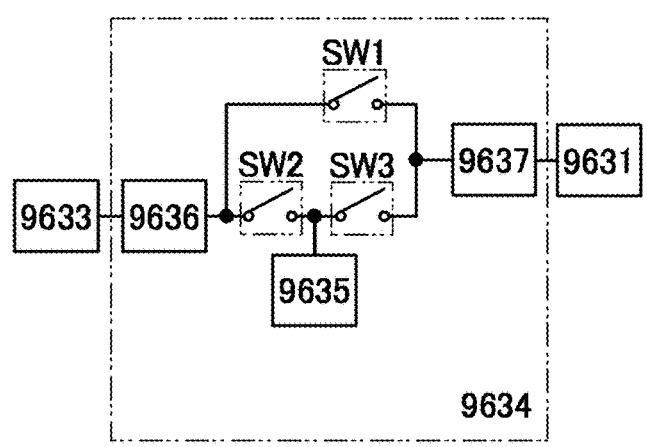

The structure and operation of the charge and discharge control circuit 9634 illustrated in FIG. 32B is described with reference to a block diagram of FIG. 32C. The solar cell 9633, the secondary battery 9635, the DC-DC converter 9636, a convener 9637, switches SW1 to SW3, and the display portion 9631 are illustrated in FIG. 32C, and the secondary battery 9635, the DC-DC converter 9636, the converter 9637, and the switches SW1 to SW3 correspond to the charge and discharge control circuit 9634 in FIG. 32B.

First, an example of operation in the case where electric power is generated by the solar cell 9633 using external light will be described. The voltage of electric power generated by the solar cell is raised or lowered by the DC-DC converter 9636 to a voltage for charging the secondary battery 9635. When the display portion 9631 operates with the electric power from the solar cell 9633. The switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the secondary battery 9635 can be charged.

Note that the solar cell 9633 is described as an example of a power generation means; however, one embodiment of the present invention is not limited to this example. The secondary battery 9635 may be charged using another power generation means such as a piezoelectric element or a thermoelectric conversion element (Peltier element). For example, the secondary battery 9635 may be charged with a non-contact power transmission module capable of performing charging by transmitting and receiving electric power wirelessly (without contact), or any of the other charge means used in combination.

Figure 33A:
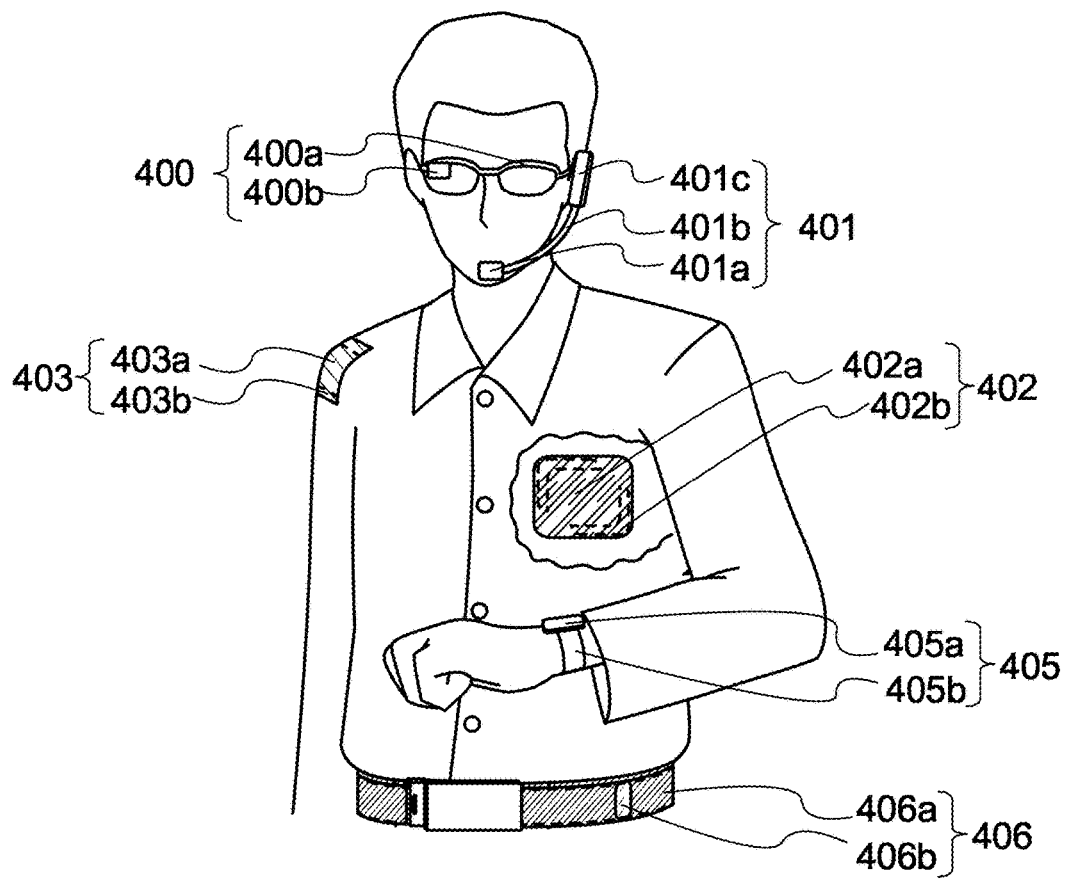
FIGS. 33A to 33C illustrate examples of electronic devices.
Figure 33B:
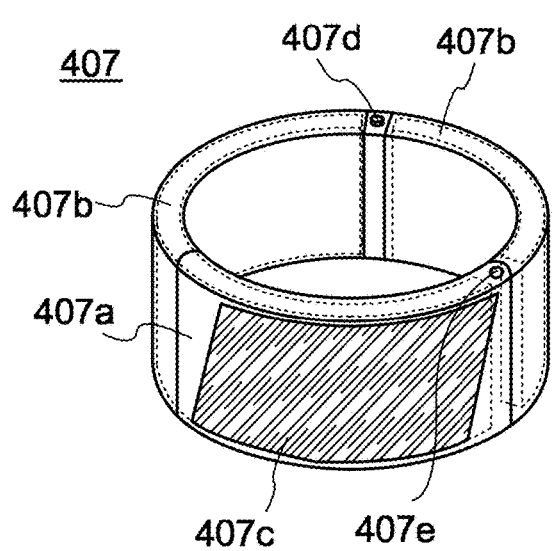
Figure 33C:
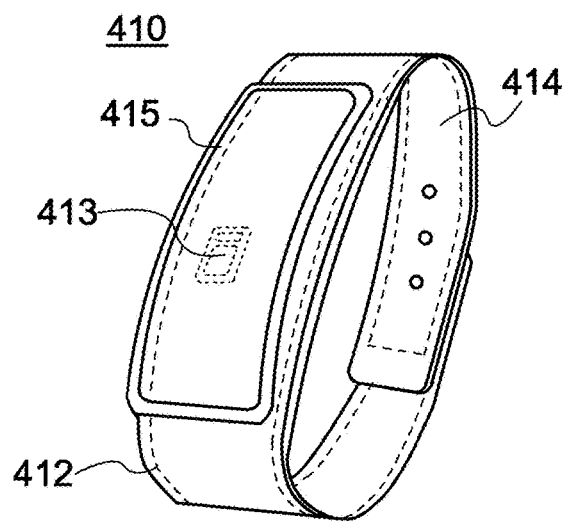

The secondary barters described in Embodiment 1 can be provided in wearable devices illustrated in FIGS. 33A to 33C.

For example, the secondary battery can be provided in a glasses-type device 400 illustrated in FIG. 33A. The glasses-type device 400 includes a frame 400a and a display portion 400b. The secondary battery is provided in a temple of the frame 400a having a curved shape, whereby the glasses-type device 400 can have a well-balanced weight and can be used continuously for a long time.

The secondary battery can be provided in a headset-type device 401. The headset-type device 401 includes at least a microphone portion 401a, a flexible pipe 401b, and an earphone portion 401c. The secondary battery can be provided in the flexible pipe 401b and the earphone portion 401c.

Furthermore, the secondary battery can be provided in a device 402 that can be attached directly to a body. A secondary battery 402b can be provided in a thin housing 402a of the device 402.

Furthermore, the secondary battery can be provided in a device 403 that can be attached to clothes. A secondary battery 403b can be provided in a thin housing 403a of the device 403.

Furthermore, the secondary battery can be provided in a watch-type device 405. The watch-type device 405 includes a display portion 405a and a belt portion 405b, and the secondary battery can be provided in the display portion 405a or the belt portion 405b. Note that between first and second portions for generating an electromotive force in the secondary battery described in the above embodiment, a third portion including lead electrodes is provided. Such a secondary battery is used in the belt portion 405b; thus, lead electrodes of the secondary battery can be close to the display portion 405a. Therefore, the secondary battery 7104 can be provided without extension or addition of a wiring.

Furthermore, the secondary battery can be provided in a belt-type device 406. The belt-type device 406 includes a display portion 406a and a wireless power feeding and receiving portion 406b, and the secondary battery can be provided inside the belt portion 406a.

The secondary battery described in Embodiment 1 can be provided in a wristband device 407 illustrated in FIG. 33B. The wristband device 407 includes two curved secondary, batteries 407b in a case 407a. A curved display portion 407c is provided over a surface of the case 407a. For the display portion that can be used for the display portion 407c, the description of the display portion in FIG. 30 can be referred to. The wristband device 407 includes a connection portion 407d and a hinge portion 407e. A portion between the connection portion 407d and the hinge portion 407e can be flexibly moved using the hinge portion 407e as an axis. Charging or the like through an external terminal provided in the connection portion 407d is also possible.

The secondary battery described in the above embodiment can be provided in a wearable device 410 illustrated in FIG. 33C. The wearable device 410 includes a sensor portion 413, a display portion 415, and a band portion 414 and can be worn on a wrist or the like, for example. A curved secondary battery 412 is provided in the band portion 414. For the display portion that can be used for the display portion 415, the description of the display portion in FIG. 30 can be referred to.

The secondary battery described in the above embodiment is used as the secondary battery 412, thus, even in the case where the secondary battery 412 is changed in form when the wearable device 410 is worn or removed, it is possible to reduce the possibility that, for example, a crack is generated in an exterior body. Accordingly, the wearable device 410 can be highly reliable.

Note that between first and second portions for generating an electromotive force in the secondary battery described in the above embodiment, a third portion including lead electrodes is provided. Such a secondary battery is used as the secondary battery 412; thus, lead electrodes of the secondary battery 412 can be Close to the sensor portion 413 and the display portion 415. Therefore, the secondary battery 412 can be provided without extension or addition of a wiring.

Figure 34:
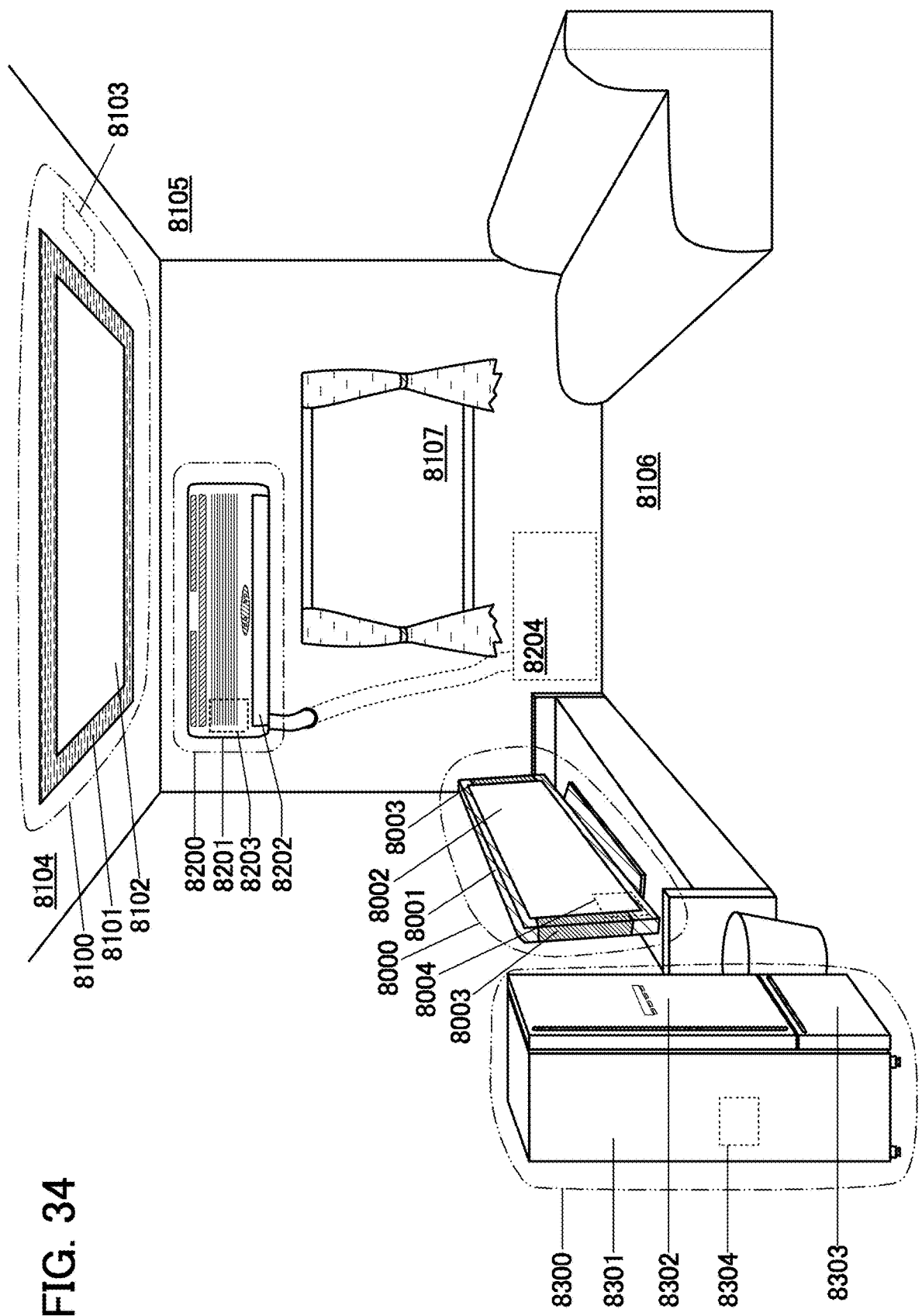
FIG. 34 illustrates examples of electronic devices.

FIG. 34 illustrates other examples of electronic devices. In FIG. 34, a display device 8000 is an example of an electronic device including a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply. Alternatively, the display device 8000 can use electric power stored in the secondary battery 8004. Thus, the display device 8000 can operate with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 34, an installation lighting device 8100 is an example of an electronic device including a secondary battery 8103 of one embodiment of the present invention. Specifically, the lighting device 8100 includes a housing 8101, a light source 8102, the secondary battery 8103, and the like. Although FIG. 34 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply. Alternatively, the lighting device 8100 can use electric power stored in the secondary battery 8103. Thus, the lighting device 8100 can operate with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 34 as an example, the secondary battery of one embodiment of the present invention can be used in an installation lighting device provided in, for example, a wall 8105, a floor 8106, or a window 8107 other than the ceiling 8104. Alternatively, the secondary battery of one embodiment of the present invention can be used in a tabletop lighting device or the like.

As the light source 8102, an artificial light source which emits light artificially by using electric power can be used. Specifically, on incandescent lamp, a discharge lamp such as a fluorescent lamp, and light-emitting elements such as an LED and an organic EL element are given as examples of the artificial light source.

In FIG. 34, an air conditioner including an indoor unit 8200 and an outdoor unit 8204 is an example of an electronic device including a secondary battery 8203 of one embodiment of the present invention. Specifically, the indoor unit 8200 includes a housing 8201, an air outlet 8202, the secondary battery 8203, and the like. Although FIG. 34 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the secondary battery 8203. Particularly in the case where the secondary batteries 8203 are provided in both the indoor unit 8200 and the outdoor unit 8204, the air conditioner can operate with the use of the secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 34 as an example, the secondary battery of one embodiment of the present invention can be used in an air conditioner in which the functions of an indoor unit and an outdoor unit are integrated in one housing.

In FIG. 34, an electric refrigerator-freezer 8300 is an example of an electronic device including a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided in the housing 8301 in FIG. 34. The electric refrigerator-freezer 8300 can receive electric power from a commercial power supply. Alternatively, the electric refrigerator-freezer 8300 can use electric power stored in the secondary battery 8304. Thus, the electric refrigerator-freezer 8300 can operate with the use of the secondary battery 8304 of one embodiment of the present invention as an uninterruptible power supply even when electric power cannot be supplied from a commercial power supply due to power failure or the like.

This embodiment can be implemented in appropriate combination with any of the other embodiments and example.

Embodiment 6

In this embodiment, examples of vehicles including the secondary battery described in Embodiment 1 will be described.

The use of secondary batteries in vehicles can lead to next-generation clean energy vehicles such as hybrid electric vehicles (HEVs), electric vehicles (EVs), and plug-in hybrid electric vehicles (PHEVs).

Figure 35A:
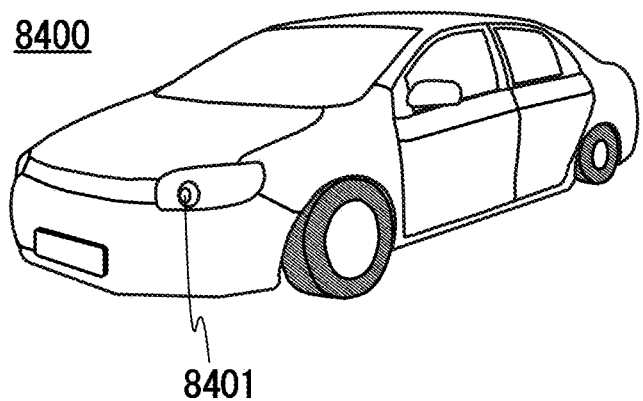
FIGS. 35A and 35B illustrate examples of electronic devices.
Figure 35B:
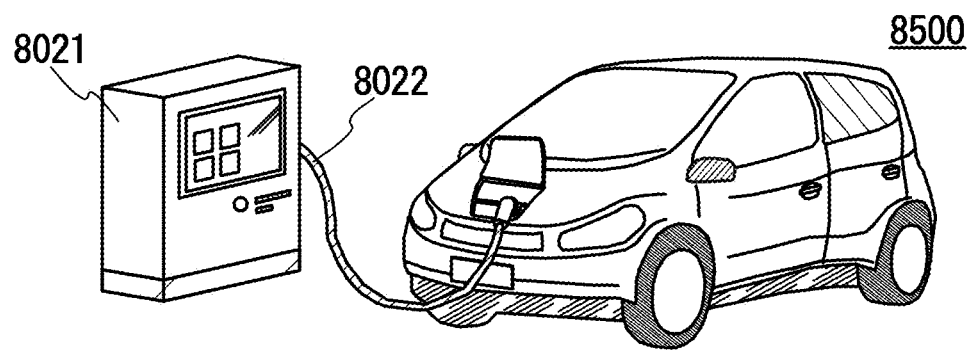

FIGS. 35A and 35B each illustrate an example of a vehicle using one embodiment of the present invention. An automobile 8400 illustrated in FIG. 35A is an electric vehicle which runs on the power of the electric motor. Alternatively, the automobile 8400 is a hybrid electric vehicle capable of driving using either the electric motor or the engine as appropriate. One embodiment of the present invention achieves a high-mileage vehicle. The automobile 8400 includes the secondary battery. The secondary battery is used not only for driving the electric motor, but also for supplying electric power to a light-emitting device such as a headlight 8401 or a room light (not illustrated).

The secondary battery can also supply electric power to a display device of a speedometer, a tachometer, or the like included in the automobile 8400. Furthermore, the secondary battery can supply electric power to a semiconductor device included in the automobile 8400, such as a navigation system.

FIG. 35B illustrates an automobile 8500 including the secondary battery. The automobile 8500 can be charged when the secondary battery is supplied with electric power through external charging equipment by a plug-in system, a contactless power feeding system, or the like. In FIG. 35B, a power storage device included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the secondary battery device included in the automobile 500 can be charged by being supplied with electric power from outside. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the secondary battery when the automobile stops or moves. To supply electric power in such a contactless manner, nit electromagnetic induction method or a magnetic resonance method can be used.

Furthermore, the secondary battery included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Example 1

In this example, stress on exterior bodies is calculated using a finite element method.

As software for the scientific calculation, ANSYS Mechanical APDL 140 is used. Calculation conditions are as follows: a material for the exterior bodies is aluminum; the Young's modulus of aluminum is $7.03 \times 10^{10}$ Pa; the Poisson's ratio is 0.345; the element type is 187 (three-dimensional 10-node tetrahedral solid), and the division width (the width of mesh used for the calculation) is 1 mm.

Figure 36A:
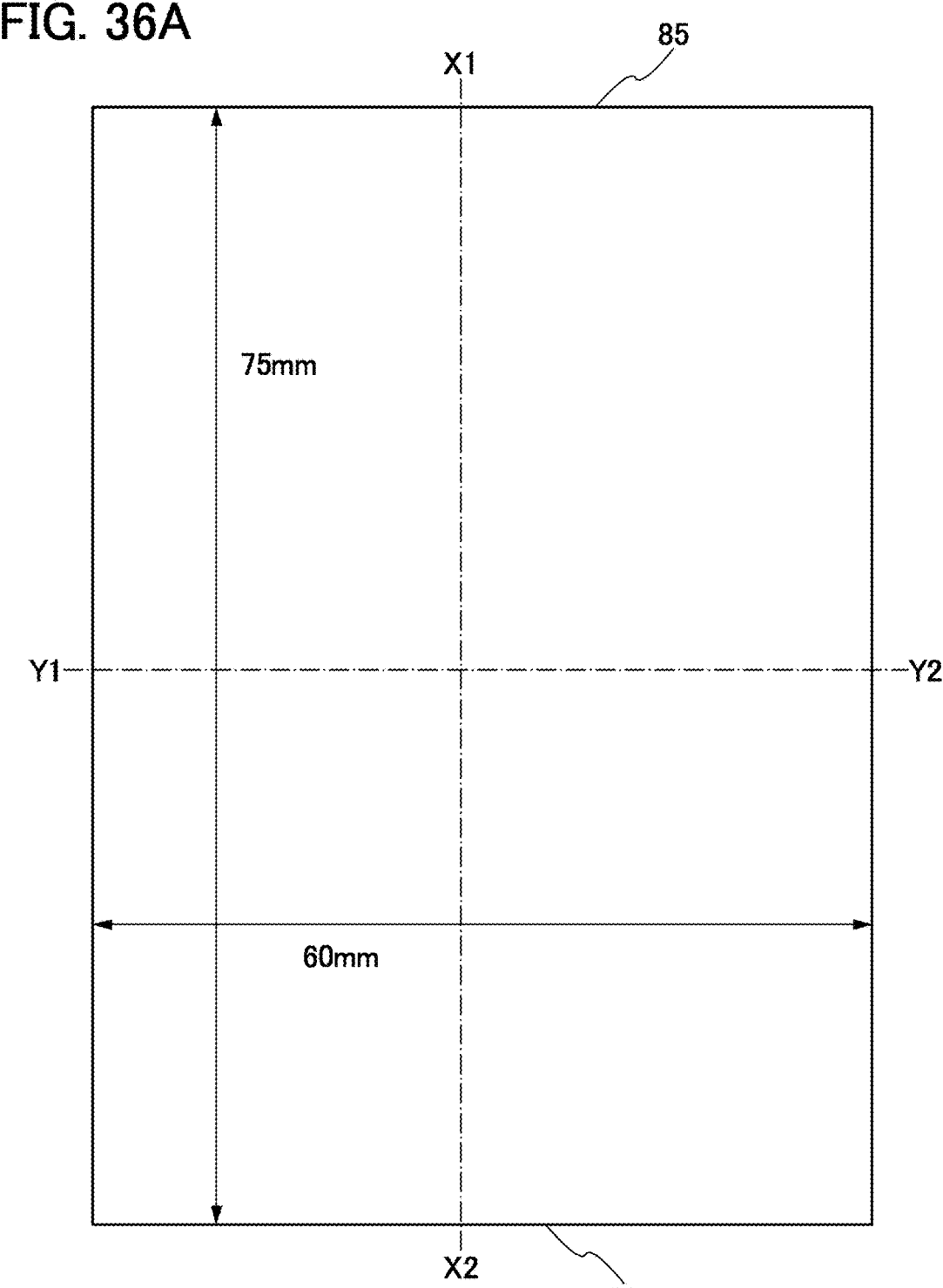
FIGS. 36A and 36B are a top view and a cross-sectional view of a secondary battery.
Figure 36B:
Figure 37A:
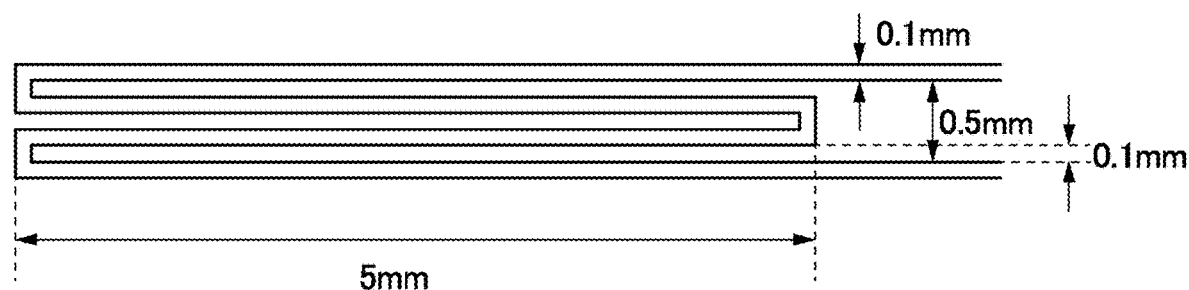
FIGS. 37A to 37C are cross-sectional views of a secondary battery.
Figure 37B:
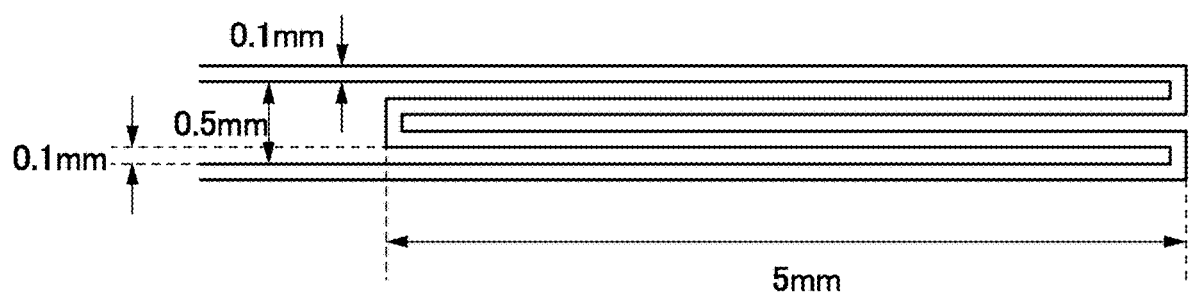
Figure 37C:
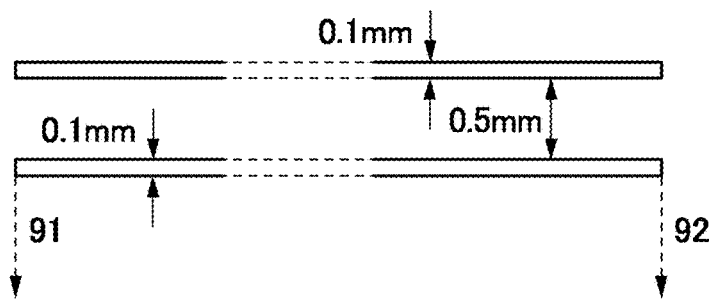

FIGS. 36A and 36B show a first structure of the exterior body used for the calculation. FIG. 36A is a top view of the exterior body. The length and the width of the exterior body seen from above are 75 mm and 60 mm, respectively. The exterior body used for the calculation has a tubular shape; FIG. 36B illustrates a cross section of the tube taken along the dashed-dotted line X1-X2 in FIG. 36A. The thickness of the outside shape of the exterior body is 0.7 mm. FIG. 37A and FIG. 37B are enlarged views of a region 81 and a region 82, respectively, which are surrounded by, the dashed lines in FIG. 36B. The thickness of the exterior body is 0.1 mm. In end portions where the exterior body is folded, the distance from the exterior body in one part to that in another part is 0.1 mm. The width of the end portions where the exterior body is folded is 5 mm. FIG. 37C is a cross-sectional view of the tube taken along the dashed-dotted line Y1-Y2. In FIG. 36A. The stress on the exterior body is calculated in such a manner that a displacement of 1 mm is applied to sides 85 and 86 in FIG. 36A in the perpendicular direction (i.e., the direction shown with arrows 91 and 92 in FIG. 37C).

Figure 38A:
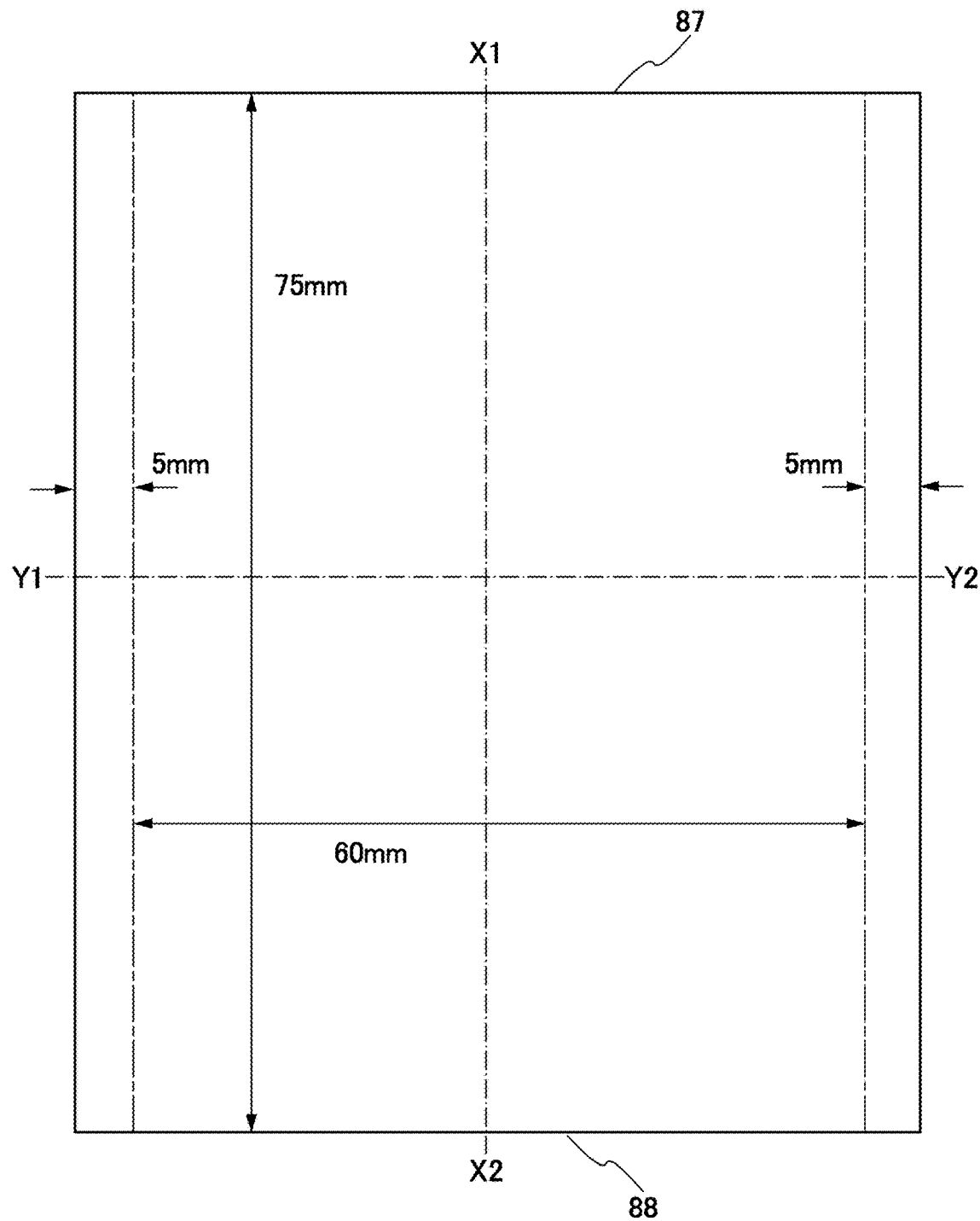
FIGS. 38A and 38B are a top view and a cross-sectional view of a secondary battery.
Figure 38B:
Figure 39A:
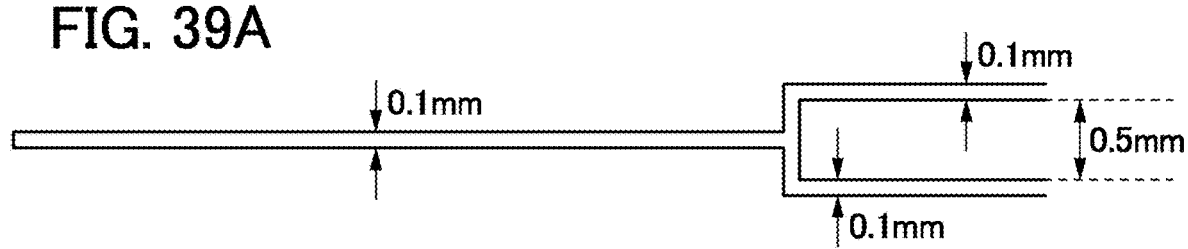
FIGS. 39A to 39C are cross-sectional views of a secondary battery.
Figure 39B:
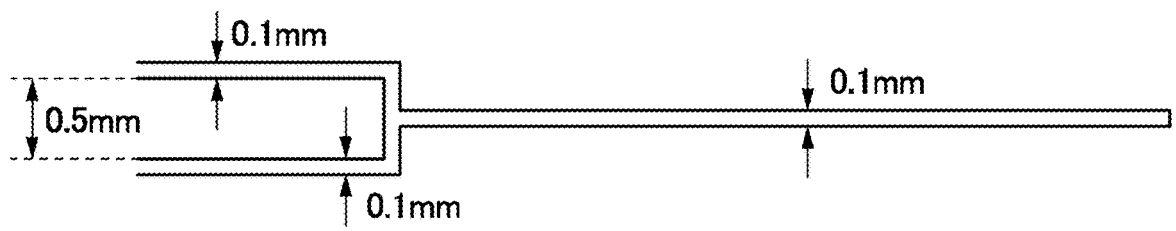
Figure 39C:
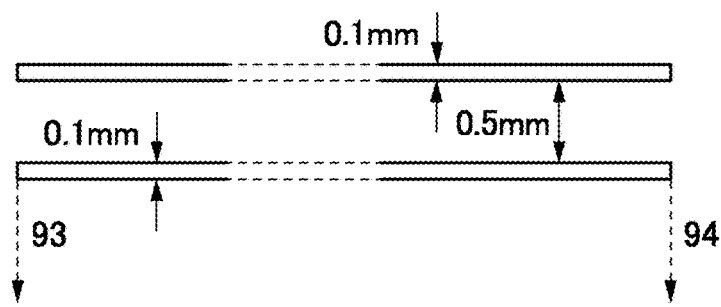

FIGS. 38A and 38B show a second structure of the exterior body used for the calculation. FIG. 38A is a top view of the exterior body. The length and the width of the exterior body seen from above are 75 mm and 70 mm (60 mm 5 mm (a sealing portion) +5 mm (a seating portion)), respectively. The sealing portion is provided on each of the left and right sides, and the width of the sealing portion is 5 mm. The exterior body used for the calculation has a tubular shape; FIG. 38B illustrates a cross section of the tube taken along the dashed-dotted line X1-X2 in FIG. 38A. The thickness of the outside shape of the exterior body is 0.7 mm. FIG. 39A and FIG. 39B are enlarged views of a region 83 and a region 84, respectively, which are surrounded by the dashed lines in FIG. 38B. The thickness of the exterior body is 0.1 mm FIG. 39C is a cross-sectional view of the tube taken along the dashed-dotted line Y1-Y2 in FIG. 38A. The stress on the exterior body is calculated in such a manner that a displacement of 1 mm is applied to sides 87 and 88 in FIG. 38A in the perpendicular direction (i.e., the direction shown with arrows 91 and 94 in FIG. 39C).

Figure 40:
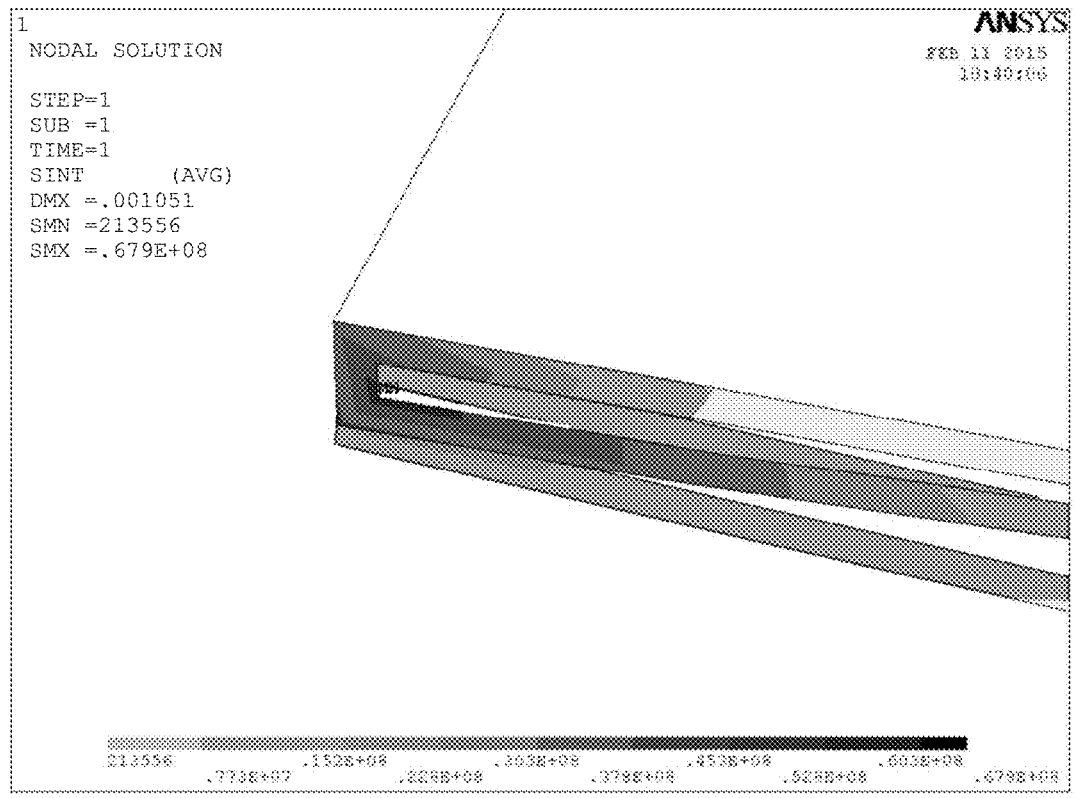
FIG. 40 shows calculation results of stress distribution in an exterior body of a secondary battery.
Figure 41:
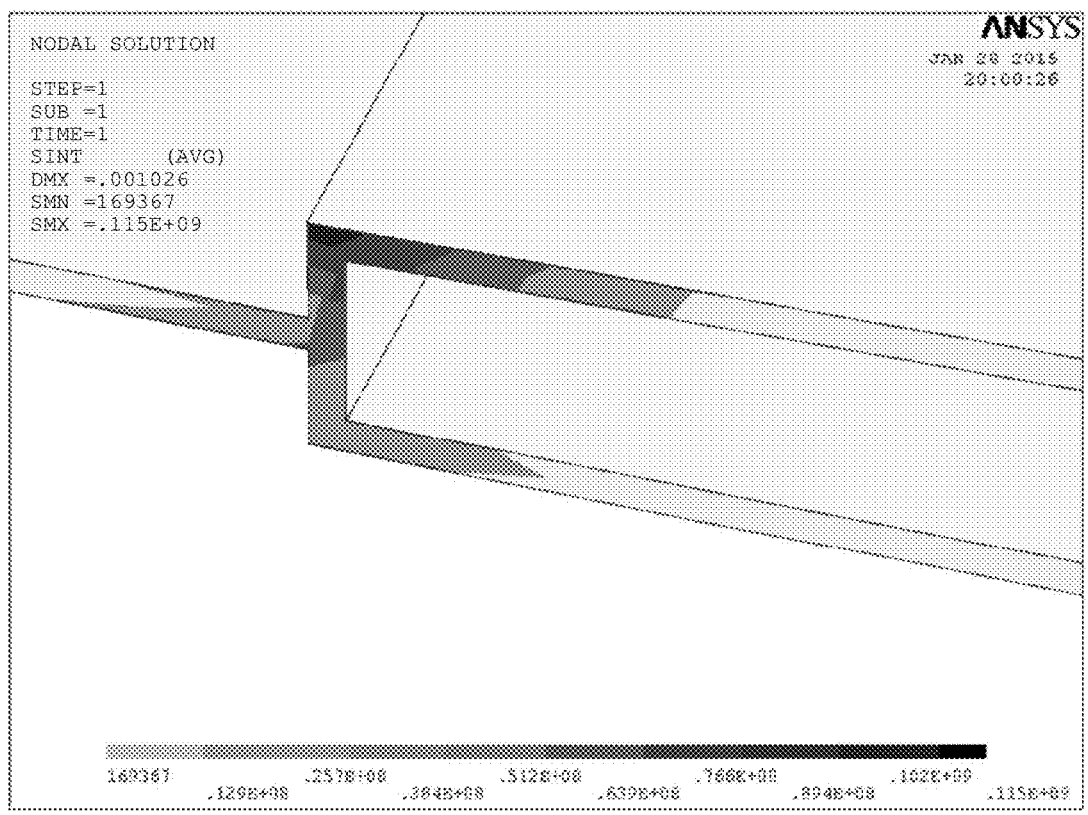
FIG. 41 shows calculation results of stress distribution in an exterior body of a secondary battery.

FIG. 40 shows the results of stress distribution in the vicinity of a corner of the exterior body having the structure illustrated in FIGS. 36A and 36B, and FIG. 41 shows the results of stress distribution in the vicinity of a corner of the exterior body having, the structure illustrated in FIGS. 38A and 38B. In FIG. 40 and FIG. 41, a darker color shows higher stress. It can be seen from FIG. 40 that high stress is applied to the inside part of the folded portion of the exterior body. It can also be seen from FIG. 41 that high stress is applied to the neck of the root of the sealing portion, the corner portion of the exterior body bent into a rectangular shape, and the like.

The maximum value of the stress was $6.79 \times 10^8$ Pa in the structure illustrated in FIGS. 36A and 36B, and was $11.5 \times 10^8$ Pa in the structure illustrated in FIGS. 38A and 38B. This indicates that the stress due to the bending of the exterior body can be lower in the structure illustrated in FIGS. 36A and 36B.

Example 2

In this example, the exterior body 107 having the shape illustrated in FIGS. 11A to 11C was formed using one member. The positive electrode lead 121 and the negative electrode lead 125 were provided in the vicinity of an end portion of the exterior body 107.

For the formation of the exterior body 107, an embossed film was used. The film is an aluminum film provided with coating layers of a resin on both surfaces. Before embossing, the thickness of aluminum was 40 µm, and the total thickness of aluminum and the coating layer was 153 µm. The conditions of the embossing were as follows; the difference in height between a projection and a depression was 0.5 mm; and the projections were positioned such that isosceles triangles each having one side of 3.5 mm and two sides of 2.5 mm were arranged.

The sealing portion 53 was provided, whereby the film was made to have a bag-like, shape, and the sealing portions 51 and 52 were provided. In this manner, the exterior body 107 was formed. The positive electrode lead 121 and the negative electrode lead 125 were positioned to be sandwiched by end portions of the film having a tubular shape, and then sealing at the sealing portion 51 was performed. Resin films were interposed between the positive electrode lead 121 and the film serving as the exterior body and between the negative electrode lead 125 and the film serving as the exterior body in order to improve adhesiveness.

Figure 44A:
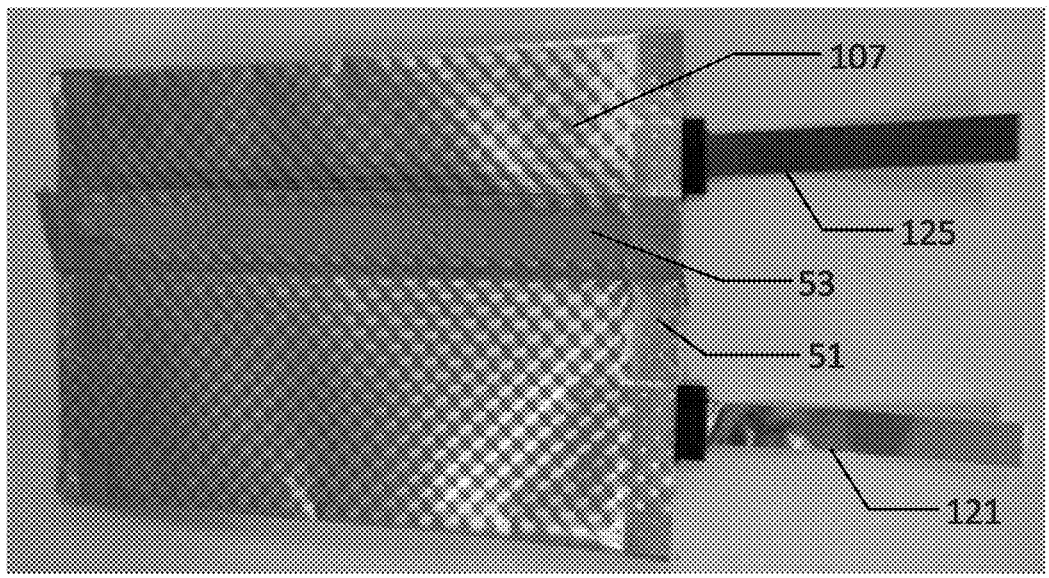
FIGS. 44A to 44C are photographs showing the appearance of a secondary battery.
Figure 44B:
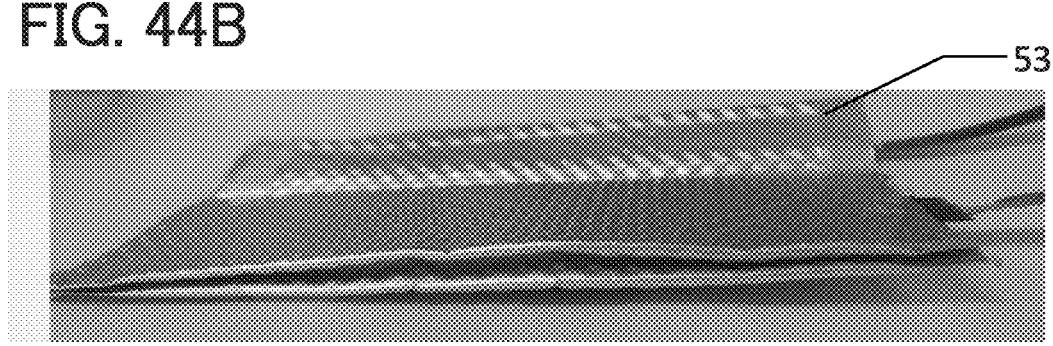
Figure 44C:
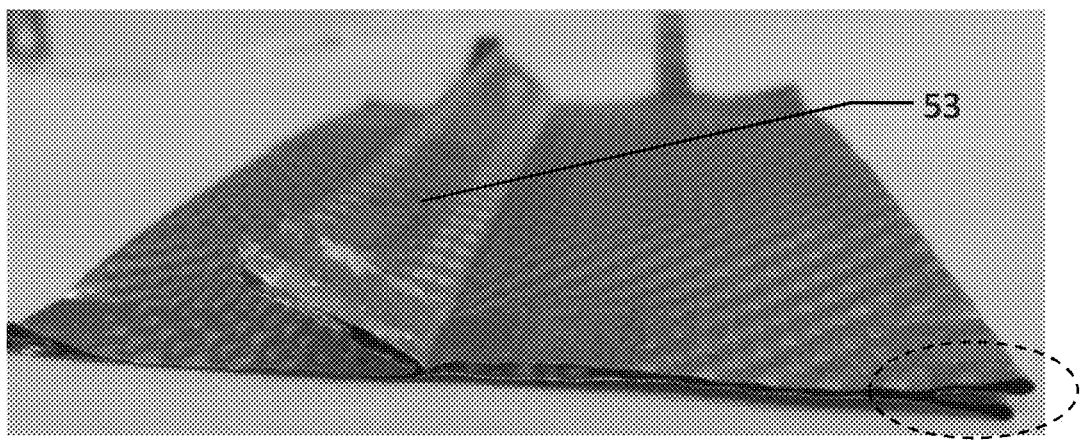

Like FIG. 11A, FIG. 44A is a perspective view of the termed exterior body 107 seen from above. Like FIG. 11B, FIG. 44B is a perspective view of the exterior body 107 seen from the right side. Like FIG. 11C, FIG. 44C is a perspective view of the exterior body 107 seen from the lower side. As shown in FIGS. 44A to 44C, the exterior body of one embodiment of the present invention can be formed using one member by providing three sealing portions.

This application is based on Japanese Patent Application serial no. 2015-0256130 filed with Japan Patent Office on Feb. 12, 2015, the entire contents of which are hereby incorporated by reference.

What is claimed is:

1. A secondary battery comprising:
an exterior body enclosing a stack of a positive electrode and a negative electrode;
a positive electrode lead electrically connected to the positive electrode; and
a negative electrode lead electrically connected to the negative electrode,
wherein:
the exterior body comprises a front surface, a back surface, a first side portion, and a second side portion,
the front surface comprises a first side, a second side, a third side, and a fourth side,
the third side and the fourth side face each other,
each of the positive electrode lead and the negative electrode lead extends to an outside of the exterior body from one of the third side and the fourth side,
the first side portion is along the first side and between the front surface and the back surface,
the second side portion is along the second side and between the front surface and the back surface,
the first side portion includes a first folding line,
the second side portion includes a second folding line,
the first folding line is closer to the second side than the first side is,
the second folding line is closer to the first side than the second side is, and
the exterior body includes a sealing portion having a region at which the front surface and the back surface are attached to each other, the region provided between the first folding line and the stack of the positive electrode and the negative electrode.

2. The secondary battery according to claim 1, wherein one member forms the front surface, the first side portion, the second side portion, and the back surface.

3. The secondary battery according to claim 1,
wherein the exterior body includes depressions or projections,
wherein the depressions or the projections are formed by embossing a surface of the exterior body, and
wherein the depressions or the projections are configured to reduce a strain caused by stress applied to the exterior body.

4. An electronic device comprising the secondary battery according to claim 1.

5. A secondary battery comprising:
an exterior body comprising a first surface, a second surface, a first side portion, a second side portion, a third side portion, and a fourth side portion;
a positive electrode and a negative electrode surrounded by the exterior body;
a positive electrode lead electrically connected to the positive electrode; and
a negative electrode lead electrically connected to the negative electrode,
wherein:
the first surface, the second surface, the first side portion, and the second side portion are continuously formed of one member,
the first surface and the second surface are sealed on the third side portion and the fourth side portion,
each of the positive electrode lead and the negative electrode lead extends to an outside of the exterior body from one of the third side portion and the fourth side portion,
in a cross section of the secondary battery:
the second surface is over the first surface,
the first side portion is between the first surface and the second surface,
the second side portion is between the first surface and the second surface,
the first side portion and the second side portion face each other,
the first side portion includes a first folding line,
the second side portion includes a second folding line,
a distance between the first folding line and the second folding line is shorter than a width of the first surface, and
the exterior body includes a sealing portion having a region at which the first surface and the second surface are attached to each other, the region provided between the first folding line and a stack of the positive electrode and the negative electrode.

6. The secondary battery according to claim 5, wherein the secondary battery has a rectangular shape in a top view of the secondary battery.

7. The secondary battery according to claim 5,
wherein the exterior body includes depressions or projections,
wherein the depressions or the projections are formed by embossing a surface of the exterior body, and
wherein the depressions or the projections are configured to reduce a strain caused by stress applied to the exterior body.

8. An electronic device comprising the secondary battery according to claim 5.

9. A secondary battery comprising:
an exterior body comprising a first side, a second side, a third side, and a fourth side; and
first and second terminals,
wherein:
each of the first terminal and the second terminal extends to an outside of the exterior body from one of the third side and the fourth side,
the exterior body includes a sealing portion having a region and a valley-folded side surface along the first side and the second side, wherein
a fold of the valley-folded side surface is formed outside of the region.

10. The secondary battery according to claim 9, wherein the secondary battery has a rectangular shape in a top view of the secondary battery.

11. The secondary battery according to claim 9,
wherein the exterior body includes depressions or projections,
wherein the depressions or the projections are formed by embossing a surface of the exterior body, and
wherein the depressions or the projections are configured to reduce a strain caused by stress applied to the exterior body.

12. An electronic device comprising the secondary battery according to claim 9.

13. The secondary battery according to claim 9, wherein the exterior body is formed of one member.

14. The secondary battery according to claim 9,
wherein the secondary battery has a sheet-like shape having a first surface, and
wherein the exterior body is sealed on the first surface.

* * * * *